(12) United States Patent
Yasuda

(10) Patent No.: US 7,565,354 B2
(45) Date of Patent: Jul. 21, 2009

(54) CONTENT ACQUISITION METHOD

(75) Inventor: Ryohei Yasuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 156 days.

(21) Appl. No.: 10/569,227

(22) PCT Filed: Sep. 14, 2004

(86) PCT No.: PCT/JP2004/013719

§ 371 (c)(1),
(2), (4) Date: Feb. 23, 2006

(87) PCT Pub. No.: WO2005/033955

PCT Pub. Date: Apr. 14, 2005

(65) Prior Publication Data

US 2006/0230120 A1    Oct. 12, 2006

(30) Foreign Application Priority Data

Sep. 30, 2003    (JP) .............................. 2003-339135

(51) Int. Cl.
*G06F 7/00* (2006.01)
(52) U.S. Cl. .......................................................... 707/10
(58) Field of Classification Search .................... 707/10
See application file for complete search history.

(56) References Cited

U.S. PATENT DOCUMENTS

| 7,117,253 B2* | 10/2006 | Nakayama et al. ........... 709/218 |
| 2004/0064507 A1* | 4/2004 | Sakata ......................... 709/205 |
| 2005/0034150 A1* | 2/2005 | Muraoka ....................... 725/31 |
| 2005/0060701 A1 | 3/2005 | Murase |
| 2005/0091679 A1 | 4/2005 | Tanaka et al. |

(Continued)

FOREIGN PATENT DOCUMENTS

WO    02/093846    11/2002

OTHER PUBLICATIONS

U.S. Appl. No. 10/526,902, filed Aug. 16, 2005, Yamashita et al.

(Continued)

*Primary Examiner*—Charles Rones
*Assistant Examiner*—Fazlul Quader
(74) *Attorney, Agent, or Firm*—Oblon, Spivak, McClelland, Maier & Neustadt, P.C.

(57) ABSTRACT

The present invention decreases the processing load of the content provision apparatus when providing the content data. An apparatus according to the present invention acquires the content-provision addresses and data-size information corresponding to the content data from the acquisition utilization information provision server 5. The apparatus then determines the division-start positions and division-end positions for the content data, based on the content-provision addresses and data-size information. The apparatus subsequently transmits to each content provision server 6A through 6N the division-part-request information including the division-start positions, the division-end positions and the content-identification information. After that, the apparatus receives each division part from the content provision servers 6A through 6N and restore the content data. In this manner, the apparatus specifies the content data, the division-start positions and the division-end positions. In response to that, each content provision apparatus transmits the division part whose data size is smaller than the content data. That reduces the processing load of the content provision apparatus.

8 Claims, 30 Drawing Sheets

U.S. PATENT DOCUMENTS

2005/0188018 A1* 8/2005 Endo et al. ............... 709/206

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.

* cited by examiner

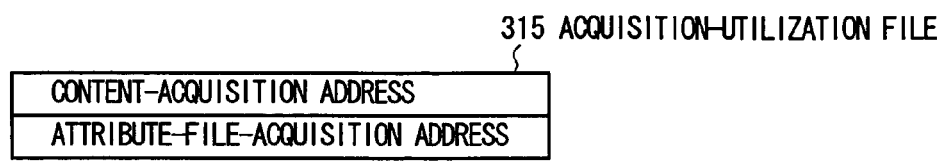

315 ACQUISITION-UTILIZATION FILE

| CONTENT-ACQUISITION ADDRESS |
| ATTRIBUTE-FILE-ACQUISITION ADDRESS |

FIG. 33

| FIRST LOG | FEE-CHARGING-STATUS-NOTIFICATION-REQUEST INFORMATION | PURCHASE-IDENTIFICATION INFORMATION<br>RETRY ADDRESS<br>POST DATA<br>REQUEST CODE |
|---|---|---|
| SECOND LOG | TRACK-FILE NAME<br>ATTRIBUTE-INFORMATION-FILE NAME | |
| THIRD LOG | ALBUM-IDENTIFICATION INFORMATION | |

FIG. 34

CONTENT ACQUISITION METHOD

TECHNICAL FIELD

The present invention relates to a content acquisition method, and is preferably applied to a case in which a client terminal acquires content data (music data, for example) from a server via a network, for example.

BACKGROUND ART

In a conventional music delivery system, a server has music data, each of which is divided into a plurality of fragments. When a player device requests the server to retrieve fragments corresponding to access codes, the server retrieves a line of fragments. And then after retrieving a predetermined number of times, the server allows the player device to download the all lines of music fragments retrieved (see Patent Document 1, for example).

Patent Document 1: Japanese Patent Publication No. 2001-175269 (Pages 1 and 3, and FIGS. 1 and 2)

However, in the above-noted music delivery system, the server manages each fragment of music data with its fragment number. The fragment number associated with a fragment indicates which part of the music data corresponds to that fragment. Each time when receiving the requests for fragments from the player device, the server retrieves the fragments and collects them in the order of the fragment number. And then after retrieving a predetermined number of times, the server provides the lines of all collected fragments to the player device. This tremendously increases the server's processing load associated with providing music.

DISCLOSURE OF THE INVENTION

The present invention has been made in view of the above points and is intended to provide a content acquisition method capable of tremendously reducing the content provision apparatus's processing load associated with providing content data.

To solve the above problem, a content acquisition method in accordance with an embodiment of the present invention comprising: a request information transmission step of transmitting request information to an external section in response to a request for content data, the request information requesting address information of a plurality of content provision apparatus capable of providing the content data, and data size information of the content data; an information reception step of receiving from the external section the address information of the plurality of content provision apparatus capable of providing the content data, and the data size information of the content data, after transmitting the request information; a division position determination step of determining division start positions and division end positions specifying division parts of the content data to request the content data in divided form from the plurality of content provision apparatus, based on the number of pieces of the address information and the data size information received by the information reception step; a division part request information transmission step of transmitting division part request information including content identification information of the content data, and the division start positions and division end positions of the division parts of the content data, such that each the division part is requested from different the content provision apparatus; a division part reception step of receiving the division parts from the plurality of content provision apparatus after transmitting the division part request information; a temporarily storing step of temporarily storing the division parts received by the division part reception step; and a data restoring step of combining the division parts temporarily stored by the temporarily storing step to restore the content data.

In this manner, in the content acquisition method in accordance with an embodiment of the present invention, content-acquisition sides specify the acquisition-target content data, and its division start positions and division end positions for the plurality of content provision apparatus. Therefore, each the content provision apparatus does not have to manage divided content data (i.e., the division part). That is to say, the content provision apparatus does not have to retrieve each division part when the content data is requested. Also, each content provision apparatus transmits to the content-acquisition sides data (i.e., the division part) smaller than the content data when the content data is requested by the content-acquisition sides.

Also, a content acquisition apparatus in accordance with an embodiment of the present invention comprising: request information transmission means for transmitting request information to an external section in response to a request for content data, the request information requesting address information of a plurality of content provision apparatus capable of providing the content data, and data size information of the content data; information reception means for receiving from the external section the address information of the plurality of content provision apparatus capable of providing the content data, and the data size information of the content data, after the request information transmission means transmits the request information; division position determination means for determining division start positions and division end positions specifying division parts of the content data to request the content data in divided form from the plurality of content provision apparatus, based on the number of pieces of the address information and the data size information received by the information reception means; division part request information transmission means for transmitting division part request information including content identification information of the content data, and the division start positions and division end positions of the division parts of the content data, such that each the division part is requested from different the content provision apparatus; division part reception means for receiving the division parts from the plurality of content provision apparatus after the division part request information transmission means transmits the division part request information; temporarily storing means for temporarily storing the division parts received by the division part reception means; and data restoring means for combining the division parts temporarily stored by the temporarily storing means to restore the content data.

In this manner, the content acquisition apparatus in accordance with an embodiment of the present invention specifies the acquisition-target content data, and its division start positions and division end positions for the content provision apparatus. Therefore, each the content provision apparatus does not have to manage divided content data (i.e., the division part). That is to say, the content provision apparatus does not have to retrieve each division part when the content data is requested. Also, each content provision apparatus transmits data (i.e., the division part) smaller than the content data when the content data is requested.

Also, in an embodiment of the present invention, a content acquisition program for causing information processing apparatus to execute: a request information transmission step of transmitting request information to an external section in response to a request for content data, the request information requesting address information of a plurality of content provision apparatus capable of providing the content data, and data size information of the content data; an information reception step of receiving from the external section the address information of the plurality of content provision apparatus capable of providing the content data, and the data size information of the content data, after transmitting the request information; a division position determination step of determining division start positions and division end positions specifying division parts of the content data to request the content data in divided form from the plurality of content provision apparatus, based on the number of pieces of the address information and the data size information received by the information reception step; division part request information transmission step of transmitting division part request information including content identification information of the content data, and the division start positions and division end positions of the division parts of the content data, such that each the division part is requested from different the content provision apparatus; a division part reception step of receiving the division parts from the plurality of content provision apparatus after transmitting the division part request information; a temporarily storing step of temporarily storing the division parts received by the division part reception step; and a data restoring step of combining the division parts temporarily stored by the temporarily storing step to restore the content data.

In this manner, in the content acquisition program in accordance with an embodiment of the present invention, the information processing apparatus specifies the acquisition-target content data, and its division start positions and division end positions for the plurality of content provision apparatus. Therefore, each the content provision apparatus does not have to manage divided content data (i.e., the division part). That is to say, the content provision apparatus does not have to retrieve each division part when the content data is requested. Also, each content provision apparatus transmits to the information processing apparatus data (i.e., the division part) smaller than the content data when the content data is requested by the information processing apparatus.

Also, in an embodiment of the present invention, a content acquisition system including a plurality of content provision apparatus providing content data and content acquisition apparatus acquiring the content data from the plurality of content provision apparatus, wherein: the content acquisition apparatus includes: request information transmission means for transmitting request information to an external section in response to a request for the content data, the request information requesting address information of the plurality of content provision apparatus capable of providing the content data, and data size information of the content data; information reception means for receiving from the external section the address information of the plurality of content provision apparatus capable of providing the content data, and the data size information of the content data, after the request information transmission means transmits the request information; division position determination means for determining division start positions and division end positions specifying division parts of the content data to request the content data in divided form from the plurality of content provision apparatus, based on the number of pieces of the address information and the data size information received by the information reception means; division part request information transmission means for transmitting division part request information including content identification information of the content data, and the division start positions and division end positions of the division parts of the content data, such that each the division part is requested from different the content provision apparatus; division part reception means for receiving the division parts from the plurality of content provision apparatus after the division part request information transmission means transmits the division part request information; temporarily storing means for temporarily storing the division parts received by the division part reception means; and data restoring means for combining the division parts temporarily stored by the temporarily storing means to restore the content data; and the content provision apparatus includes: division part request information reception means for receiving the division part request information from the content acquisition apparatus; division means for dividing the content data corresponding to the content identification information to extract the division part from between the division start position and division end position of the content data in response to the division part request information received by the division part request information reception means, the content identification information, the division start position, and the division end position being shown in the division part request information; and division part transmission means for transmitting to the content acquisition apparatus the division part divided from the content data by the division means.

In this manner, in the content acquisition system in accordance with an embodiment of the present invention, the content acquisition apparatus specifies the acquisition-target content data, and its division start positions and division end positions for the plurality of content provision apparatus. Therefore, each the content provision apparatus does not have to manage divided content data (i.e., the division part). That is to say, the content provision apparatus does not have to retrieve each division part when the content data is requested. Also, each content provision apparatus transmits to the content acquisition apparatus data (i.e., the division part) smaller than the content data when the content data is requested by the content acquisition apparatus.

According to an embodiment of the present invention, in response to the request for the content data, the content acquisition apparatus obtains from the external section; the address information of the plurality of content provision apparatus capable of providing the content data; and data size information of the content data. Based on the number of pieces of the address information and the data size information of the content data, the content acquisition apparatus determines the division start positions and division end positions of the division parts of the content data to request the content data in divided form from the plurality of content provision apparatus. The content acquisition apparatus then transmits the division part request information to the plurality of content provision apparatus such that each division part is requested from different content provision apparatus, the division part request information including; the content identification information of the content data; and the division start positions and division end positions of the content data. The content acquisition apparatus then receives each division part from the plurality of content provision servers. The content acquisition apparatus subsequently combines them to restore the content data. In this manner, the content acquisition apparatus specifies the acquisition-target content data, and its division start positions and division end positions for the plurality of content provision apparatus. Therefore, each the content provision apparatus does not have to manage divided content data (i.e., the division part). That is to say, the content provision apparatus does not have to retrieve each division part when the content data is requested. Also, each content provision apparatus transmits to the content acquisition apparatus data (i.e., the division part) smaller than the content data when the content data is requested by the content acquisition apparatus. As a result, there is provided a content acquisition method, content acquisition apparatus, content acquisition program and content acquisition system which can tremendously reduce the processing load of the content provision servers when providing the content data.

BRIEF DESCRIPTION OF THE DRAWINGS

FIG. 33 is a schematic diagram showing the configuration of acquisition-utilization file.

FIG. 34 is a schematic diagram for illustrating a log showing the proceeding status of acquisition process.

BEST MODE FOR CARRYING OUT THE INVENTION

An embodiment of the present invention will be described in detail with reference to the accompanying drawings.

(1) Overall Configuration of Data Delivery System

Figure 1:
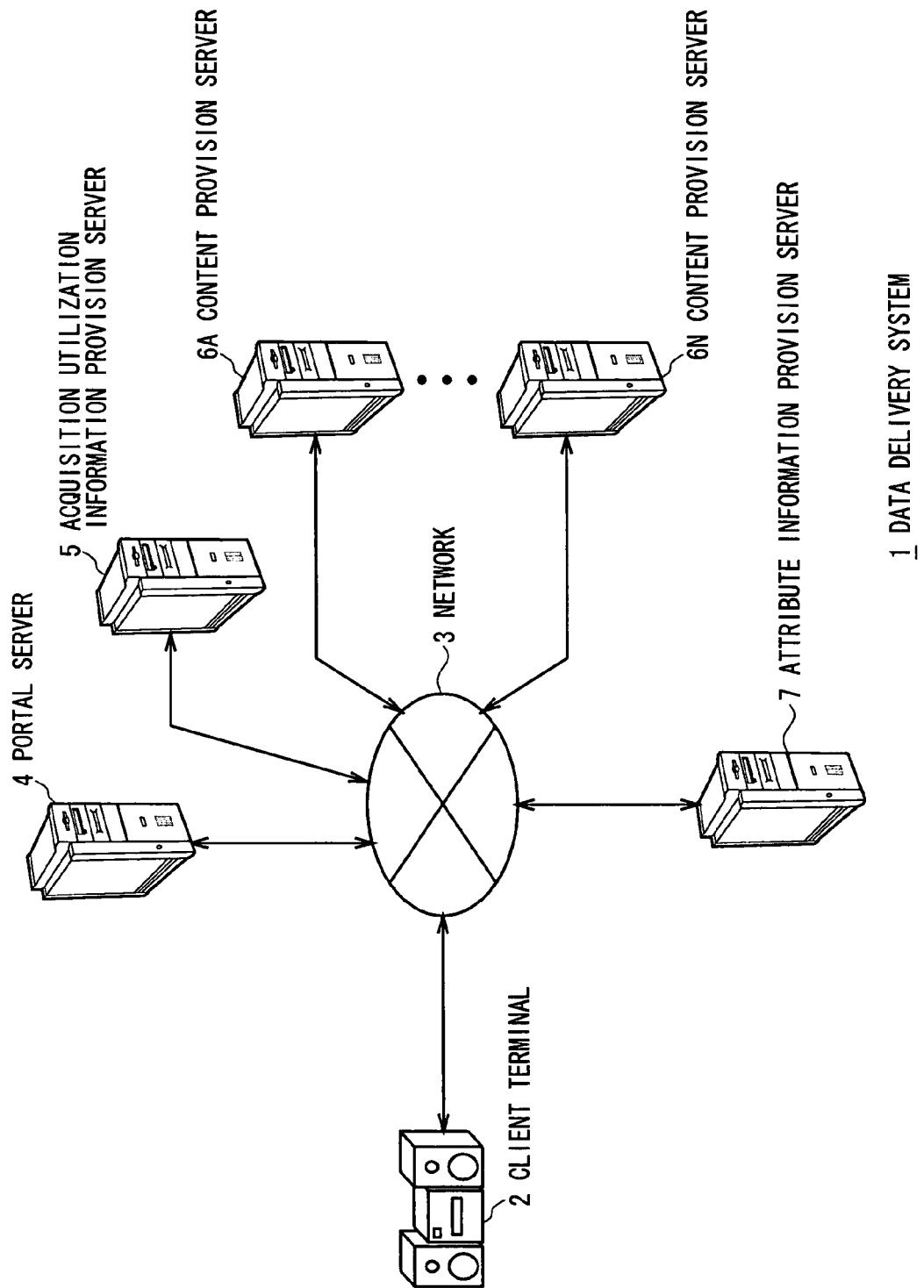
FIG. 1 is a schematic perspective view showing the overall configuration of a data delivery system in accordance with an embodiment of the present invention.

With reference to FIG. 1, the reference numeral 1 denotes a data delivery system as a whole in accordance with an embodiment of the present invention. When a user requests a client terminal 2 to purchase one or more music data using music deliver services provided through a network 3 (the Internet, for example), the client terminal 2 accesses a acquisition utilization information provision server 5 via a server 4 operating a portal site. The server 4 will be referred to as a "portal server". By the way, the portal server 4 and the acquisition utilization information provision server 5 are equivalent to computers. The client terminal 2 then acquires from the acquisition utilization information provision server 5 an acquisition-utilization file. The acquisition-utilization file is utilized for acquiring content data which is equivalent to his/her purchase target music data, and content-attribute information corresponding to the content data. This content-attribute information is used for changing an attribute associated with the playback of the content data and the like.

The client terminal 2 follows the contents of the acquisition-utilization file to acquire each division part of the content data from content provision servers 6A through 6N, and then combines them to form the content data. By the way, the content provision servers 6A through 6N are equivalent to computers, and are capable of offering the same content data. The client terminal 2 also follows the contents of the acquisition-utilization file to acquire from an attribute information provision server 7 a content-attribute file including content-attribute information corresponding to the content data. By the way, the attribute information provision server 7 is equivalent to computers.

In this manner, the client terminal 2 acquires the content data and the content-attribute file in response to the request for purchasing music. And then when a user requests the client terminal 2 to reproduce the music, the client terminal 2 follows the content-attribute information of the content-attribute file to reproduce the corresponding content data. In this way, the client terminal 2 allows a user to listen to his/her requested music.

(1-1) Configuration of the Portal Server 4

Figure 2:
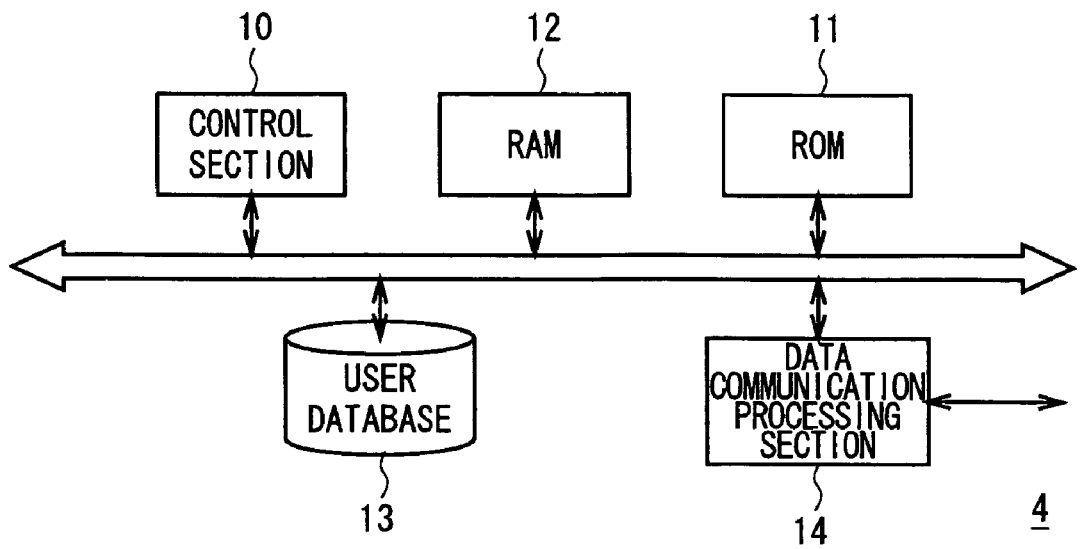
FIG. 2 is a block diagram showing the circuit configuration of a portal server.

In the portal server 4 shown in FIG. 2, a control section 10 which is equivalent to Central Processing Unit (CPU) runs basic programs such as Operating System (OS), and application programs such as a fee-charging-state-notification program and a content-deliver-service program, by using a Read Only Memory (ROM) 11 and a Random Access Memory (RAM) 12. The control section 10 takes overall control of the server 4 based on these programs, and performs various kinds of processes.

The control section 10 stores personal information in a user database 13. The personal information includes identification information of each user who is authorized to use the data delivery system 1, and corresponding password. By the way, the identification information will be referred to as "user ID". When a user requests to purchase one or more music, the client terminal 2 transmits music-purchase-request data. The control section 10 receives the music-purchase-request data via a data communication processing section 14. The control section 10 then performs authentication processes using his/her user ID and password included in the music-purchase-request data, and the personal information stored in the user database 13.

After the user who requests to purchase music is authenticated, the control section 10 generates an acquisition-process-identification-information-notification data. The acquisition-process-identification-information-notification data includes acquisition-process-identification information identifying an acquisition process of acquiring content data and content attribute files. The client terminal 2 performs this acquisition process in response to requests for purchasing music. For example, the acquisition-process-identification information is like identification information identifying a fee-charging process which is executed at the time when the user requests to purchase music. The control section 10 then transmits the acquisition-process-identification-information-notification data via the data communication processing section 14 to the client terminal 2. The control section 10 also controls the client terminal 2 to let the user confirm whether he/she really purchases the music.

When the user determines to purchase the music, the client terminal 2 transmits an acquisition-utilization-information-request data. The control section 10 receives the acquisition-utilization-information-request data via the data communication processing section 14. In response to the receiving, the control section 10 generates a file-request data. The generated file-request data includes identification information identifying purchase-target content data (music, in this case), and acquisition-process-identification information included in the acquisition-utilization-information-request data. In this case, this identification information identifying purchase-target content data has been included in the above-noted music-purchase-request data. This identification information will be referred to as "content ID". The control section 10 then transmits the file-request data via the data communication processing section 14 to the acquisition utilization information provision server 5. In response to that, the acquisition utilization information provision server 5 transmits the acquisition-utilization file. The control section 10 receives the acquisition-utilization file via the data communication processing section 14, and then transmits the acquisition-utilization file via the data communication processing section 14 to the client terminal 2.

After transmitting the acquisition-utilization file to the client terminal 2, the control section 10 stores in the user database 13 the acquisition-process-identification information and a file name of the acquisition-utilization file such that they are associated with the personal information of the user who requests to purchase the music.

By the way, there is a possibility that the client terminal 2 suddenly breaks off communication through the network 3 while performing the acquisition process. In this case, when the client terminal 2 starts to communicate through the network 3 again, it transmits an acquisition-utilization-information-re-request data. The control section 10 receives the acquisition-utilization-information-re-request data via the data communication processing section 14. Based on the acquisition-process-identification information included in the acquisition-utilization-information-re-request data, the control section 10 then retrieves from the user database 13 the file name of the acquisition-utilization file used by the halted acquisition process (this process was halted since the client terminal 2 broke off the communication).

The control section 10 generates a file-re-request data. The generated file-re-request data includes the acquisition-process-identification information included in the acquisition-utilization-information-re-request data received from the client terminal 2. This file-re-request data also includes the file name that is retrieved based on the acquisition-process-identification information from the user database 13. The control section 10 then transmits the file-re-request data via the data communication processing section 14 to the acquisition utilization information provision server 5. In response to that, the acquisition utilization information provision server 5 transmits the acquisition-utilization file. The control section 10 then receives the acquisition-utilization file via the data communication processing section 14, and then transmits the acquisition-utilization file via the data communication processing section 14 to the client terminal 2 again. Accordingly, the control section 10 allows the client terminal 2 to restart the acquisition process which was being halted since the client terminal 2 broke off communication through the network 3.

(1-2) Configuration of the Acquisition Utilization Information Provision Server 5

Figure 3:
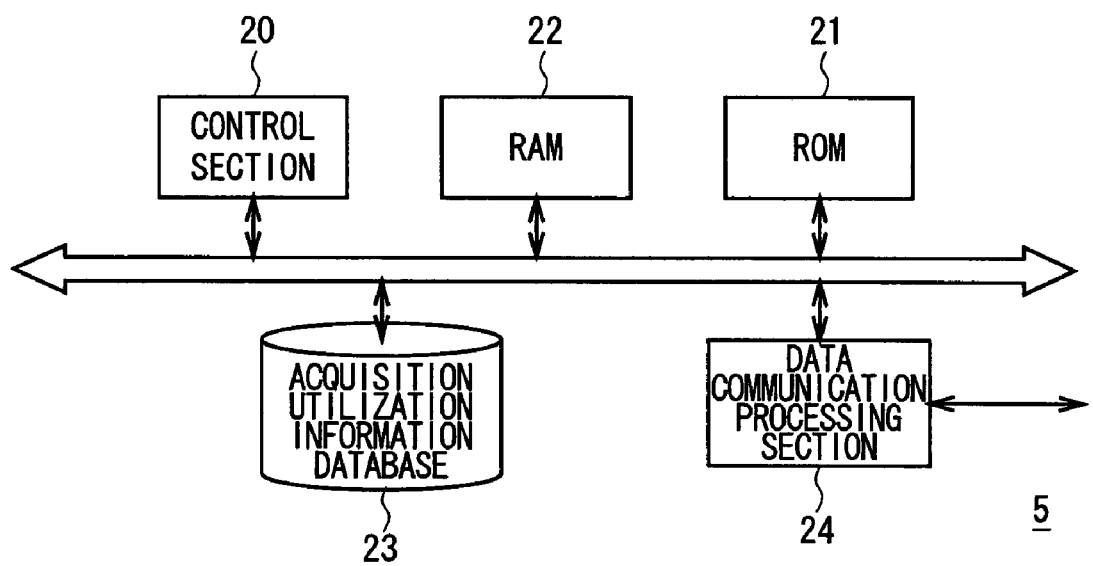
FIG. 3 is a block diagram showing the circuit configuration of an acquisition utilization information provision server.

In the acquisition utilization information provision server 5 shown in FIG. 3, a control section 20 which is equivalent a CPU runs basic programs such as OS, and application programs such as an acquisition-utilization-information-provision program, by using a ROM 21 and a RAM 22. The control section 20 takes overall control of the server 5 based on the programs to perform various kinds of programs.

The control section 20 stores in an acquisition utilization information database 23 the following items of each content data such that they are associated with one another: a content ID of content data; homepages' Uniform Resource Locators (URLs) of each content provision server 6A through 6N, the homepages (referred to as "content-provision homepage") being utilized for providing the content data; a homepage's URL of the attribute information provision server 7, the homepage (referred to as "attribute-file-provision homepage") being utilized for providing the content-attribute file corresponding to the content data; and data size information showing the data size of the content data. By the way, URL will be also referred to as "address".

When receiving the file-request data from the portal server 4 via a data communication processing section 24, the control section 20 retrieves the following items from the acquisition utilization information database 23 based on the content ID included in the file-request data: addresses of all the content-provision homepages associated with the content ID (these addresses will be also referred to as "content-provision addresses"); an address of the attribute-file-provision homepage associated with the content ID (this address will be also referred to as "attribute-file-provision address"); and the data size information associated with the content ID.

Figure 4:
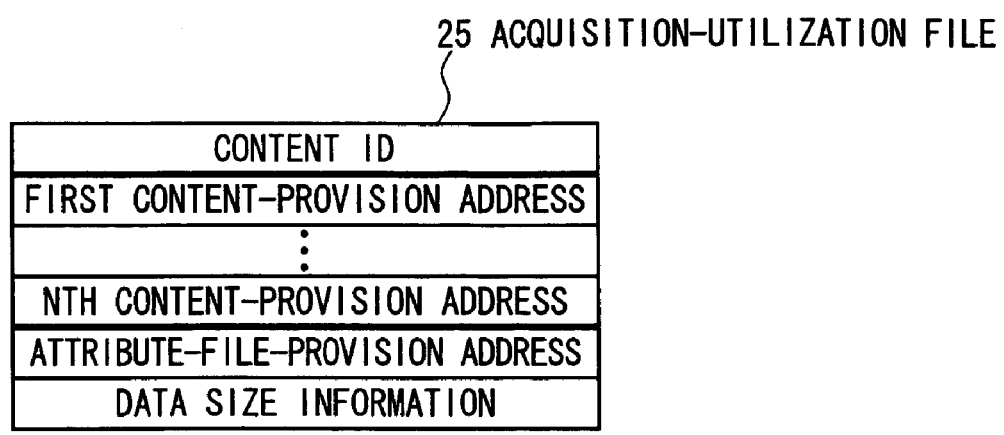
FIG. 4 is a schematic diagram showing the configuration of an acquisition utilization file.

As shown in FIG. 4, the control section 20 then put together the following items of each requested music to form the acquisition-utilization information: a content ID included in the file-request data; first through Nth content-provision addresses corresponding to the content ID, which were retrieved from the acquisition utilization information database 23 based on the content ID; the attribute-file-provision address; and the data size information. The control section 20 then generates the acquisition-utilization file 25 including the acquisition-utilization information. The control section 20 subsequently transmits the acquisition-utilization file 25 via the data communication processing section 24 and the portal server 4 to the client terminal 2.

After transmitting the acquisition-utilization file 25 via the portal server 4 to the client terminal 2, the control section 20 saves in the acquisition utilization information database 23 the transmitted acquisition-utilization file 25, its file name, and the acquisition-process-identification information included in the file-request data such that they are associated with one another.

By the way, when the client terminal 2 starts again to communicate through the network 3 after breaking up the communication, the portal server 4 transmits the file-re-request data. The control section 20 receives the file-re-request data via the data communication processing section 24. Based on the acquisition-process-identification information and the file name included in the file-re-request data, the control section 20 retrieves from the acquisition utilization information database 23 the acquisition-utilization file 25 corresponding to the file name. That is to say, this acquisition-utilization file 25 is the one used by the acquisition process of client terminal 2 that was being halted since it broke up the communication.

And then the control section 20 compares contents of the retrieved acquisition-utilization file 25 with information stored in the acquisition utilization information database 23. Based on the comparison result, the control section 20 determines whether or not content-provision addresses and attribute-file-provision addresses in the acquisition-utilization file 25 have changed. If the control section 20 determines that the content-provision addresses and the attribute-file-provision addresses have not changed, the control section 20 transmits the acquisition-utilization file 25 via the data communication processing section 24 and the portal server 4 to the client terminal 2 without changing the contents of acquisition-utilization file 25.

By contrast, if the control section 20 determines that the content-provision addresses and the attribute-file-provision addresses have changed, the control section 20 updates the contents of the acquisition-utilization file 25 retrieved from the acquisition utilization information database 23. And then the control section 20 transmits the updated acquisition-utilization file 25 via the data communication processing section 24 and the portal server 4 to the client terminal 2.

Therefore, based on the contents of the acquisition-utilization file 25, the control section 20 allows the client terminal 2 to acquire the content data and content-attribute file corresponding to the music requested by the user without fault, when the client terminal 2 restarts the temporarily halted acquisition process.

(1-3) Configuration of Content Provision Servers 6A through 6N

Figure 5:
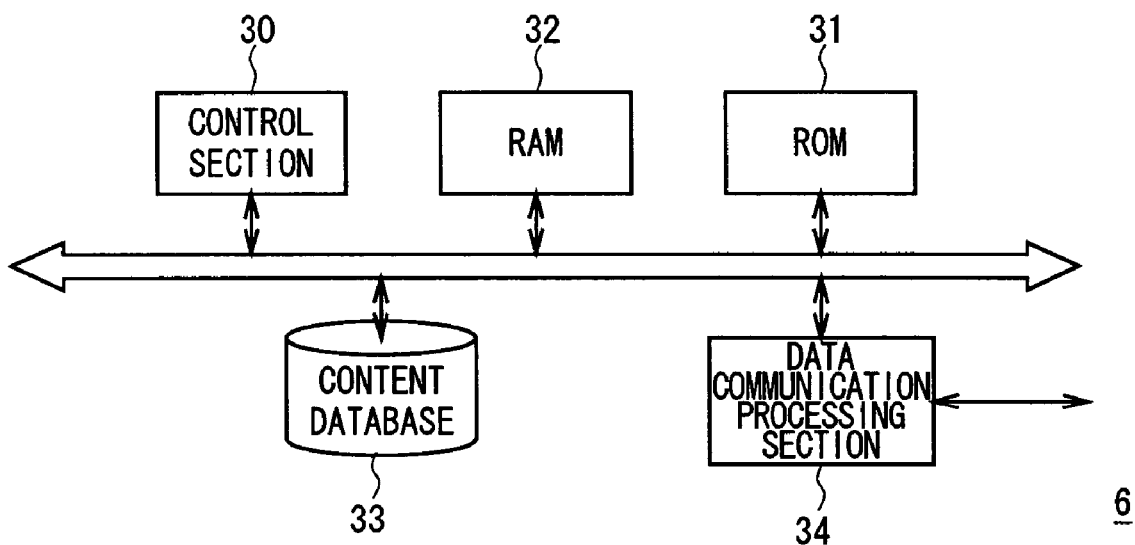
FIG. 5 is a block diagram showing the circuit configuration of a content provision server.

As shown in FIG. 5, the content provision servers 6A through 6N have the same configuration. In the content provision servers 6A through 6N, a control section 30 which is equivalent to a CPU runs basic programs such as an OS, and various kinds of application programs such as a content-provision program by using a ROM 31 and a RAM 32. The control section 30 takes overall control of the servers based on the programs, and performs various kinds of processes.

The control section 30 stores in a content data base 33 a number of content data along with their content IDs such that they are associated with one another. When the client terminal 2 accesses the content-provision homepage based on the content-provision address in the acquisition-utilization file 25 and transmits a division-part-request data, the control section 30 receives the division-part-request data via a data communication processing section 34. The division-part-request data includes the content ID included in that acquisition-utilization file 25 and division-part-specification information. The division-part-specification information includes a division-start position and division-end position of the content data corresponding to that content ID.

The control section 30 then retrieves from the content database 33 the content data corresponding to the content ID included in the division-part-request data. The control section 30 subsequently divides the retrieved content data based on the division-part-specification information included in the division-part-request data to obtain a division-part data located between the division-start position and the division-end position. The division-start position and the division-end position were specified by the client terminal 2. The control section 30 then transmits the division-part data via the data communication processing section 34 to the client terminal 2.

(1-4) Configuration of Attribute Information Provision Server 7

Figure 6:
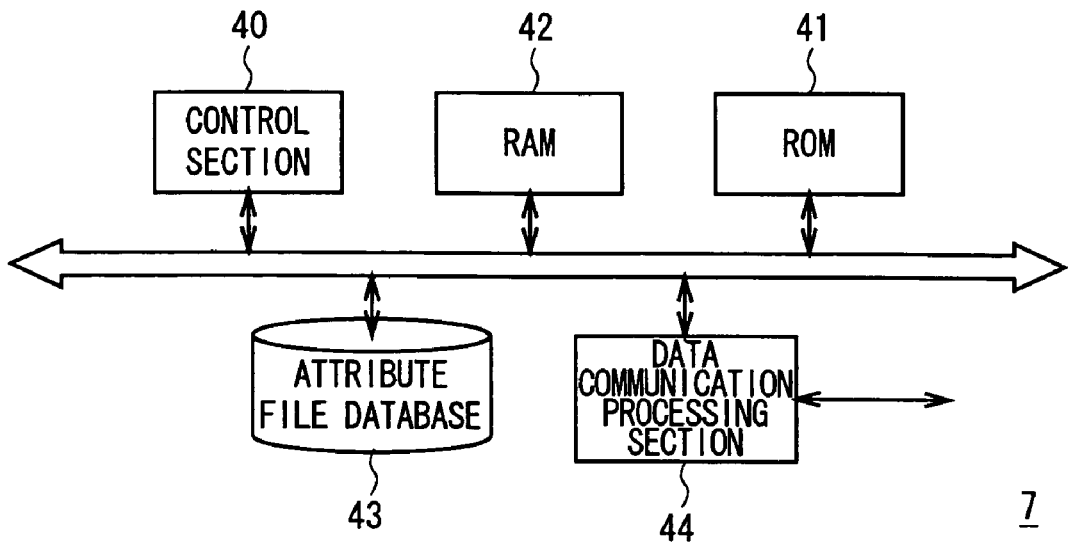
FIG. 6 is a block diagram showing the circuit configuration of an attribute information provision server.

As shown in FIG. 6, in the attribute information provision server 7, a control section 40 which is equivalent to a CPU runs basic programs such as an OS, and various kinds of application programs such as an attribute-information-provision program and fee-charging-state-management program, by using a ROM 41 and RAM 42. The control section 40 takes overall control of the server 7 based on the programs, and performs various kinds of processes.

The control section 40 stores in an attribute file database 43 the following items such that they are associated with one another: a content-attribute file; and an attribute-file-provision address of the attribute-file-provision homepage which provides that content-attribute file. When the client terminal 2 accesses the attribute-file-provision homepage based on the attribute-file-provision address included in the acquisition-utilization file 25, the control section 40 retrieves from the attribute file database 43 the content-attribute file that is to be provided through the accessed attribute-file-provision homepage. And then the control section 40 transmits the retrieved content-attribute file via a data communication processing section 44 to the client terminal 2.

Figure 7:
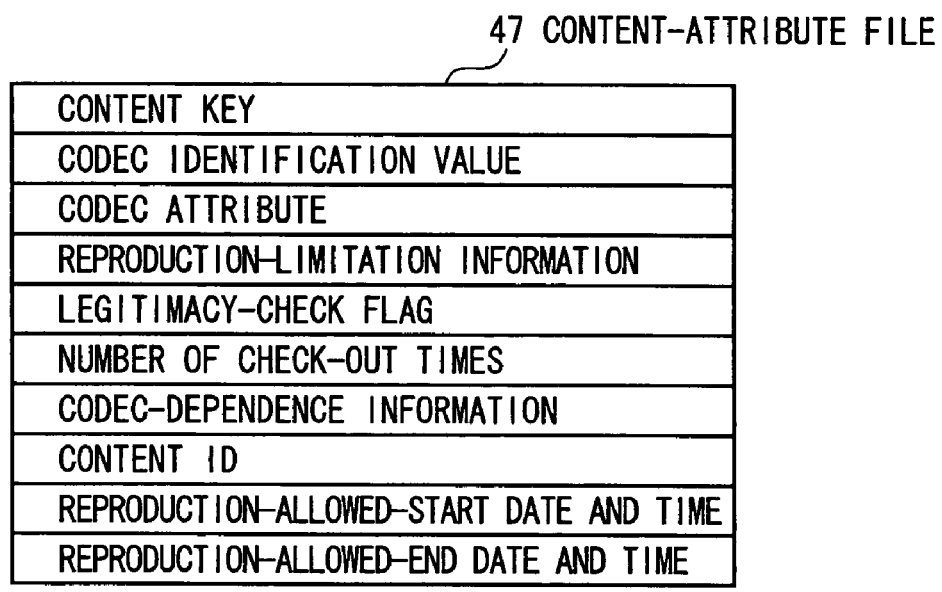
FIG. 7 is a schematic diagram showing the configuration of a content attribute file.

As shown in FIG. 7, the content-attribute file 47 has the following items as the content-attribute information to change the attributes of corresponding content data: a content key, which is utilized by the client terminal 2 to decipher the cipher-coded content data; a codec-identification value and codec attribute, which is utilized to decode the compression-coded content data (the compression-coded content data is obtained by deciphering the cipher-coded content data, and the compression-coded content data is generated by a transmission system); reproduction-limitation information, which stipulates the usage right for the content data, showing the number of times the content data can be reproduced; a legitimacy-check flag, which is utilized to check the legitimacy of the content data; number of check-out times, which limits the number of times the content data is copied from the client terminal 2 to external storage media; codec-dependence information; a content ID of the corresponding content data; and, reproduction-allowed-start date and time and reproduction-allowed-end date and time, which stipulates the usage right for the content data, showing the length of the period that the content data can be reproduced.

As FIG. 7 reveals, the client terminal 2 cannot decipher and decode the (cipher-coded and compression-coded) content data to reproduce it, if the client terminal 2 has not received the content-attribute file 47 corresponding to the content data. In this manner, the control section 40 uses the content-attribute file 47 to process the content data. That prevents outsiders from using the content data improperly, even if they obtain content data.

(1-5) Configuration of Client Terminal 2

Figure 8:
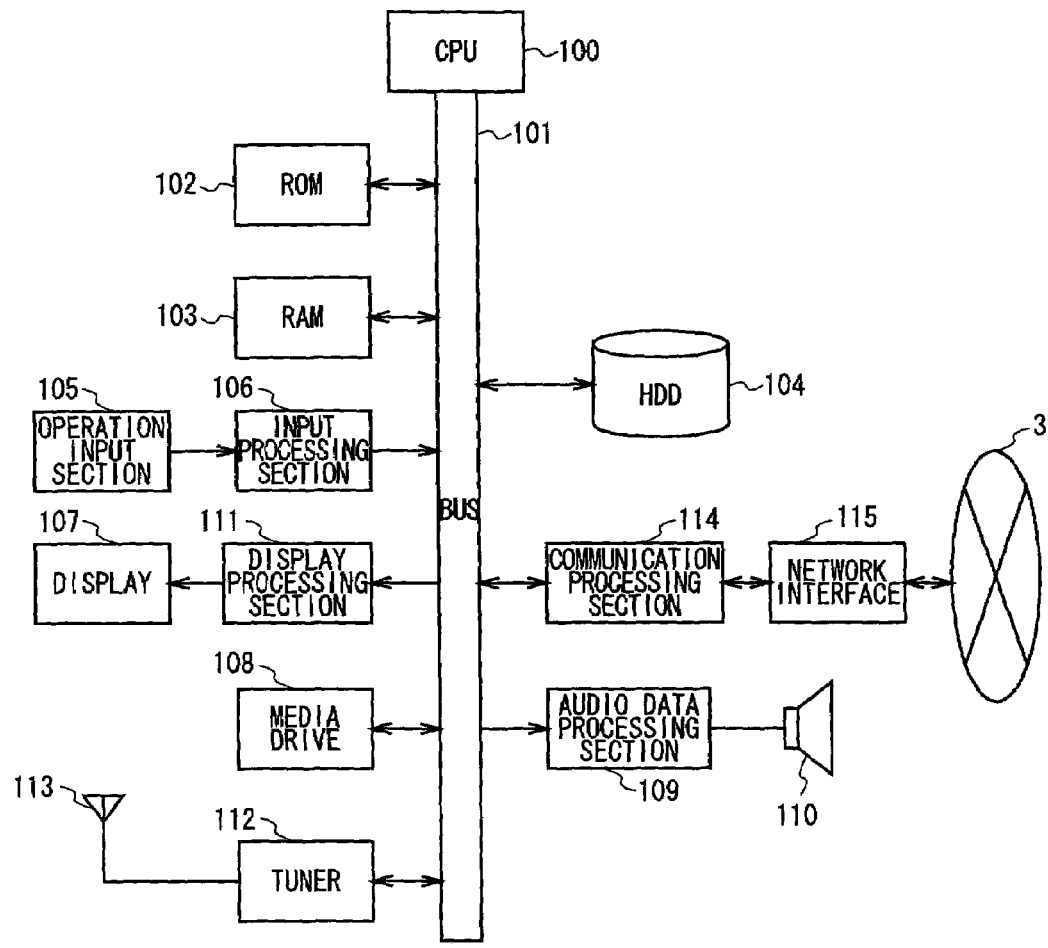
FIG. 8 is a block diagram showing the circuit configuration of a client terminal.

As shown in FIG. 8, a CPU 100 of the client terminal 2 is connected with a ROM 102 via a bus 101. The CPU 100 reads out from the ROM 102 basic programs such as an OS, and various kinds of application programs. The CPU 100 then loads them into a RAM 103. Based on these programs, the CPU 100 takes overall control of the client terminal 2, and performs a predetermined arithmetic processes. For example, the CPU 100 performs the following processes: process for communicating via the network 3 to purchase music; process for accepting user's input-output operation; process for playing back the content data stored in media; process for storing in a hard disk drive (HDD) 104 the content data and content-attribute files 47 downloaded from radio stations or obtained by music-purchase process; and process for managing the content data stored in the hard disk drive 104.

An operation input section 105 includes various kinds of buttons and keys on the surface of a main unit and a remote controller (not shown). The operation input section 105 supplies to an input processing section 106 input information corresponding to user's operation for the buttons and keys. The input processing section 106 performs prescribed process for the input information to generate operation commands, and transmits the operation commands to the CPU 100. The CPU 100 performs process in response to the operation commands.

For example, a display 107 is a display device such as a liquid crystal display. The display 107 may be directly or externally disposed on the main unit surface. The display 107 displays processing results of the CPU 100, and various kinds of information.

A media drive 108 for example plays back the data stored in media. The media include a Compact Disc (CD) and a MEMORY STICK (Registered Trademark of Sony Corporation) including flash memories. The media drive 108 then supplies to an audio data processing section 109 the data reproduced from the media. The audio data processing section 109 performs analog-to-digital conversion for the data, and then outputs sound from a 2-channel speaker 110.

When the CPU 100 reads out music data (content data) via the media drive 108 from the media, the CPU 100 can store in the hard disk drive 104 the music data as an audio data file.

The CPU 100 can read out still images via the media drive 108 from the MEMORY STICK (Registered Trademark of Sony Corporation), and display them as the slide show on the display 107 via a display processing section 111.

The CPU 100 also randomly reads out a plurality of music data from the hard disk drive 104, and plays back them in user's desired order as if a juke box.

A tuner section 112 for example is an AM/FM radio tuner. The tuner section 112 under the control of the CPU 100 demodulates the broadcast signals received by an antenna 113 to generate broadcast sounds, and output them via the audio data processing section 109 from the speaker 110.

A communication processing section 114 under the control of the CPU 100 encodes data, and transmits it via a network interface 115 and the network 3 to external network-support devices (various kinds of servers, for example). The communication processing section 114 receives data such as content data via the network interface 115 from external network-support devices (various kinds of servers, for example), and decodes it. The communication processing section 114 then supplies the decoded data to the CPU 100.

(1-6) Directory Management of Content Data

Figure 9:
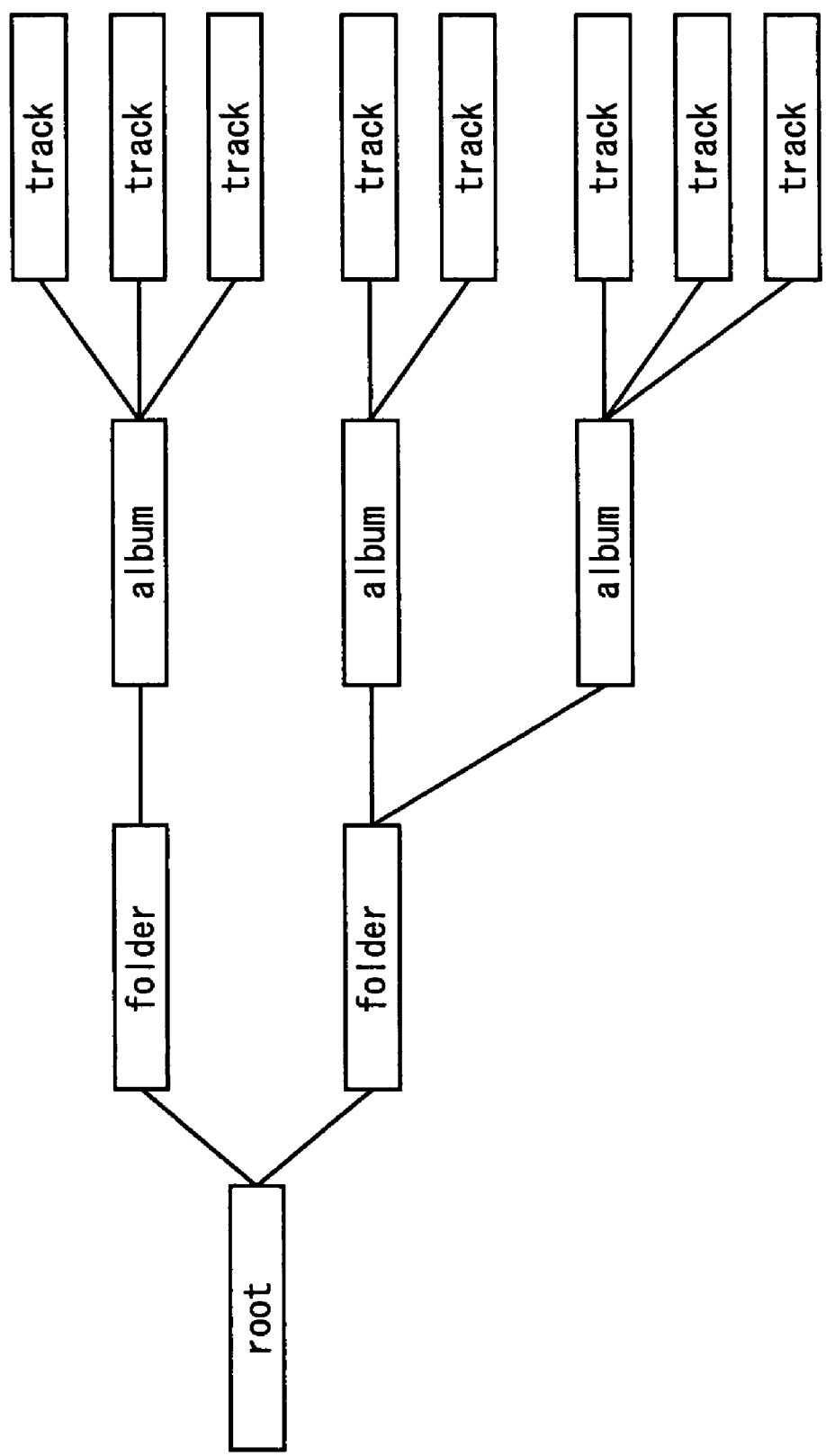
FIG. 9 is a schematic diagram for illustrating directory management of content data.

The CPU 100 of the client terminal 2 manages content data stored in the hard disk drive 104 using a directory structure as shown in FIG. 9. One or more "folder" directories are created under a "root" directory. Specifically, the number of the "folder" directories created under the "root" directory is limited. The created "folder" directories for example correspond to genres of content data, or users who own the client terminal 2.

One or more "album" directories are created under a "folder" directory. Specifically, the number of the "album" directories created under a "folder" directory is limited. Each "album" directory for example corresponds to an album title. One or more "track" files are disposed under an "album" directory, so as to belong to the "album". Each "track" file corresponds to a piece of music, i.e., a content data.

The directory management of content data is performed based on data base files stored in the hard disk drive 104.

(1-7) Program Module Configuration of Client Terminal 2

Figure 10:
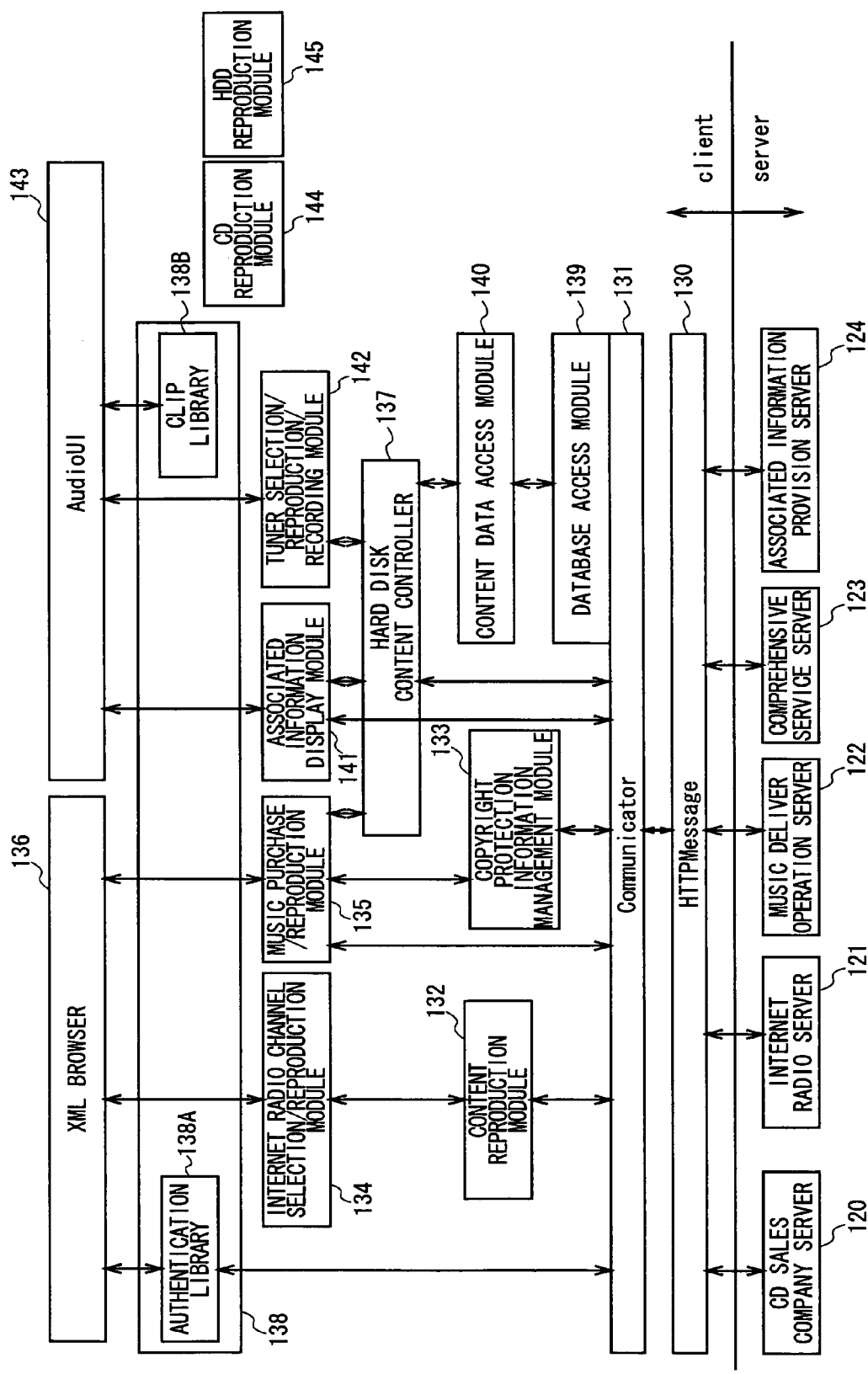
FIG. 10 is a schematic diagram showing program modules of the client terminal.

As shown in FIG. 10, the program modules of client terminal 2 operate on OS. The program modules interchange with various kinds of servers, such as a CD sales company server 120 for selling CDs, an Internet radio server 121, the above-noted acquisition utilization information provision server 5, a music deliver operation server 122 (including the content provision servers 6A through 6N and the attribute information provision server 7), a comprehensive service server 123 (including the above-noted portal server 4), an associated information provision server 124 which provides via the network 3 to the client terminal 2 the information (music information) associated with the music broadcast from radio stations.

A Hyper Text Transfer Protocol (HTTP) message program 130 interchanges in HTTP communication with various kinds of servers, such as the CD sales company server 120, the Internet radio server 121, the music deliver operation server 122, the comprehensive service server 123 providing various kinds of comprehensive services, and the associated information provision server 124. A communicator program 131 interchanges data with the HTTP message program 130.

A content reproduction module 132 and a copyright protection information management module 133 are disposed above the communicator program 131. The content reproduction module 132 interprets the codec of contents, and reproduces them. The copyright protection information management module 133 deals with information relating to copyright protection. The copyright protection information includes the usage right. An Internet radio channel selection/reproduction module 134 and a music purchase/reproduction module 135 are disposed on the content reproduction module 132 and the copyright protection information management module 133 respectively. The Internet radio channel selection/reproduction module 134 selects channels of Internet radio and plays the selected channels. The music purchase/reproduction module 135 controls the purchase of music and the reproduction of demo music based on the content-attribute file 47.

An Extensible Markup Language (XML) browser 136 is disposed above the Internet radio channel selection/reproduction module 134 and the music purchase/reproduction module 135. The XML browser 136 interprets XML files received from various servers, and then displays images on the display 107.

For example, a user selects a piece of music using the XML browser 136 to purchase it. At that time, the music purchase/reproduction module 135 acquires the acquisition-utilization file 25. After that, the music purchase/reproduction module 135 and the copyright protection information management module 133 acquires a content data and a content-attribute file 47, and stores them in the hard disk drive 104 through a hard disk content controller 137.

The communicator program 131 connects with an authentication library 138A of a library 138. The authentication library 138A performs authentication processes for the comprehensive service server 123 and various kinds of servers.

A database access module 139, a content data access module 140, and the hard disk content controller 137 are disposed above the communicator program 131.

The database access module 139 accesses various kinds of databases disposed in the hard disk drive 104. The content data access module 140 accesses the content data and content-attribute files 47 stored in the hard disk drive 104. The hard disk content controller 137 manages the content data and content-attribute files 47 stored in the hard disk drive 104.

An associated information display module 141 and a tuner selection/reproduction/recording module 142 are disposed above the hard disk content controller 137. The associated information display module 141 performs processes for displaying a title and artist name of music broadcast from radio stations. The tuner selection/reproduction/recording module 142 tunes in on radio stations. The tuner selection/reproduction/recording module 142 also records content data (music) received from a radio station on the hard disk drive 104.

For example, a user selects a radio station using an audio user interface 143 to receive music from the radio station. The received music is supplied via the content data access module 140 to the hard disk drive 104. The hard disk drive 104 then stores it.

The associated information display module 141 receives via the HTTP message 130 from the associated information provision server 124 the associated information by using the tuner selection/reproduction/recording module 142. The associated information includes the artist name and title of music currently broadcast from a radio station. The associated information display module 141 then displays it on the display 107 via the audio user interface 143.

The associated information, displayed on the display 107 through the audio user interface 143, may be temporarily stored in a clip library 138B of the library 138. In response to user's instruction, the associated information is finally transferred via the database access module 139 to the hard disk drive 104, and then stored in the hard disk drive 104.

In addition, the program modules of client terminal 2 include a CD reproduction module 144 for playing back CDs, and a HDD reproduction module 145 for playing back the hard disk drive 104. The CD reproduction module 144 and the HDD reproduction module 145 output playback data via the audio data processing section 109 to the speaker 110.

(2) Music Purchase Process

When a user requests to purchase music, the client terminal 2 and various kinds of servers perform a music purchase process. The music purchase process will be described hereinafter.

The music purchase process described below includes two kinds of processes: a normal music purchase process, which is executed when the client terminal 2 runs normally; and, a restart music purchase process, which is executed in association with a restart process that restarts the acquisition process of client terminal 2. The normal music purchase process and the restart music purchase process will be described in that order.

(2-1) Normal Music Purchase Process

A plurality of the content provision servers 6A through 6N may be able to provide the same content data to the client terminal 2 via each content-provision homepage, which is published by each server 6A through 6N. In this case, the client terminal 2 accesses each content-provision homepage, and then requests different part of the acquisition-target content data from each content provision server 6A through 6N.

When some or all of the content provision servers 6A through 6N can provide the same content data, the client terminal 2 selects one of the following methods in response to user's selection to perform acquisition process: a first division-part-request method, a second division-part-request method, and a third division-part-request method. The first division-part-request method recognizes the number of the content-provision addresses that can provide the same content data as a content-division number (based on the content-division number, the content data will be divided). In this case, the number of the content-provision addresses is notified by the acquisition-utilization file 25, and will be referred to as a "notified-address number". And then the first division-part-request method requests different divided part (division-part data) of the content data from each content provision server 6A through 6N. The second division-part-request method allows a user to choose the number of addresses to acquire the same content data, regardless of the notified-address number. By the way, the number of addresses chosen by a user will be referred to as a "chosen-address number". The second division-part-request method then recognizes the chosen-address number as the content-division number, and requests different divided part of the content data from each content provision server 6A through 6N. The third division-part-request method requests different divided part of the content data from each content provision server 6A through 6N. However, the third division-part-request method stops to receive the division-part data from low processing-power content provision servers 6A through 6N, but requests the rest of it from other content provision servers 6A through 6N.

(2-1-1) Normal Music Purchase Process with First Division-Part-Request Method

With reference to sequence charts shown in FIG. 11 through FIG. 13, the normal music purchase process with the first division-part-request method will be described hereinafter. In this case, a user chooses the first division-part-request method using the client terminal 2.

Figure 11:
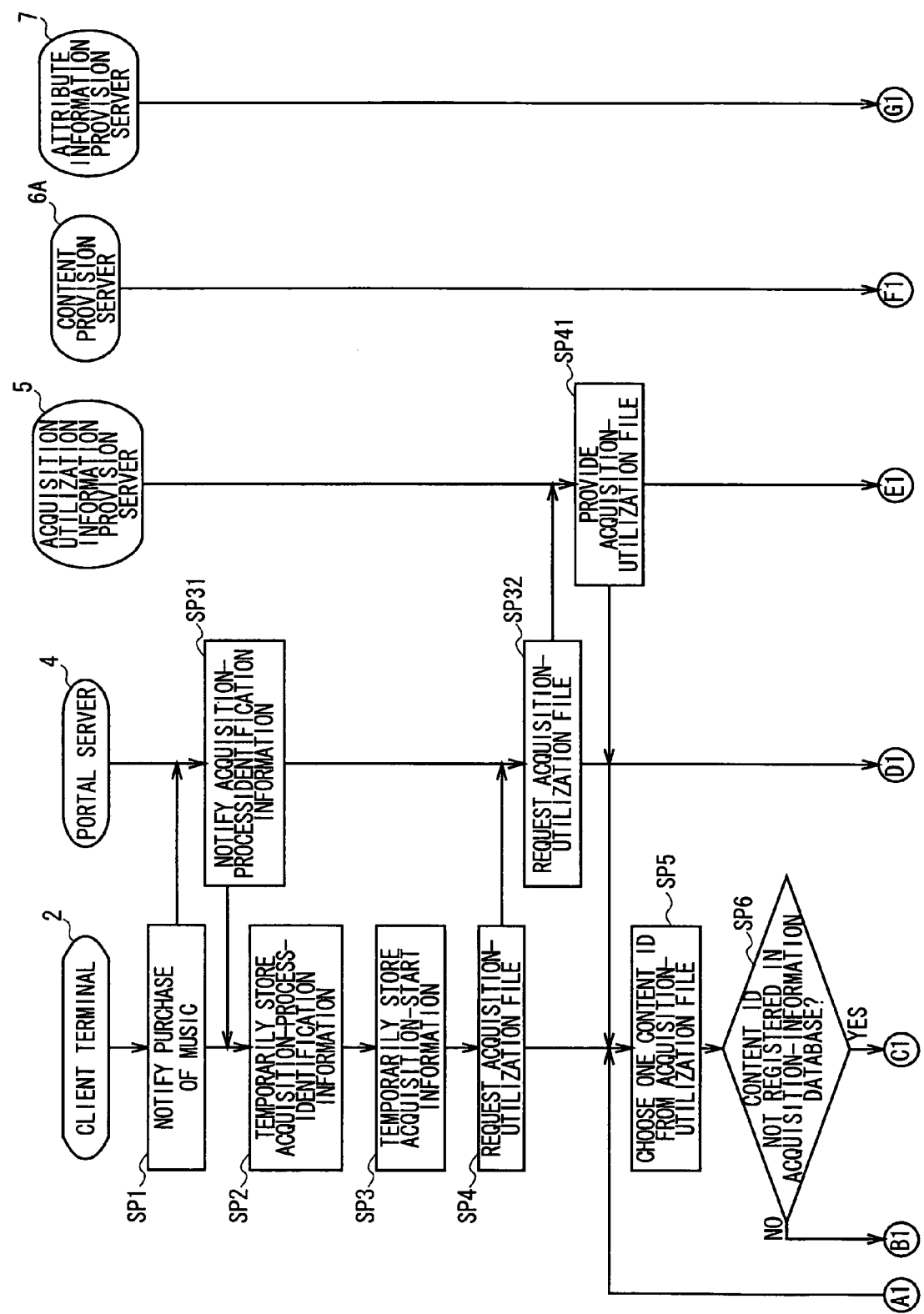
FIG. 11 is a sequence chart showing a normal music purchase process with a first division-part-request method (1).
Figure 12:
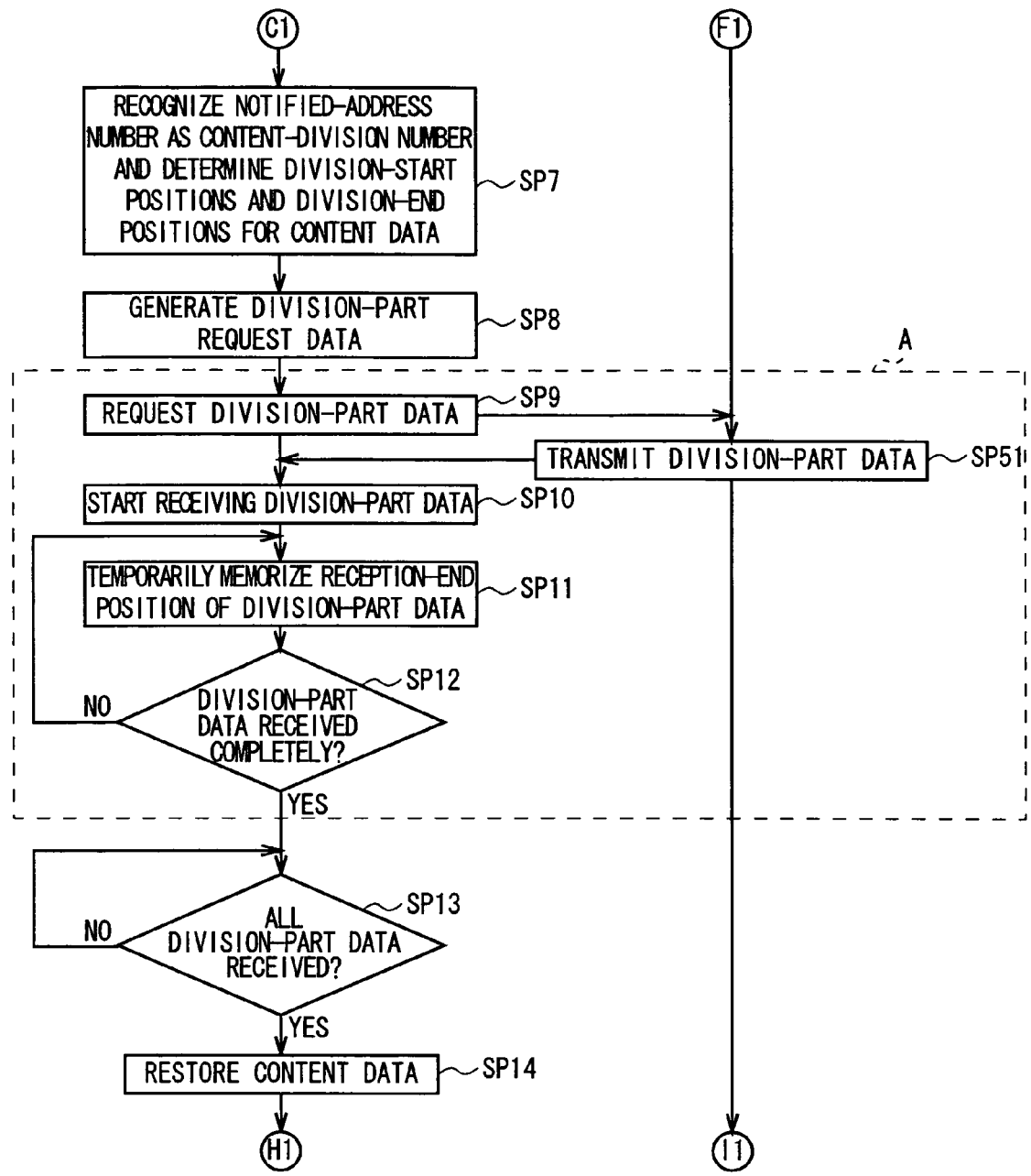
FIG. 12 is a sequence chart showing a normal music purchase process with a first division-part-request method (2).
Figure 13:
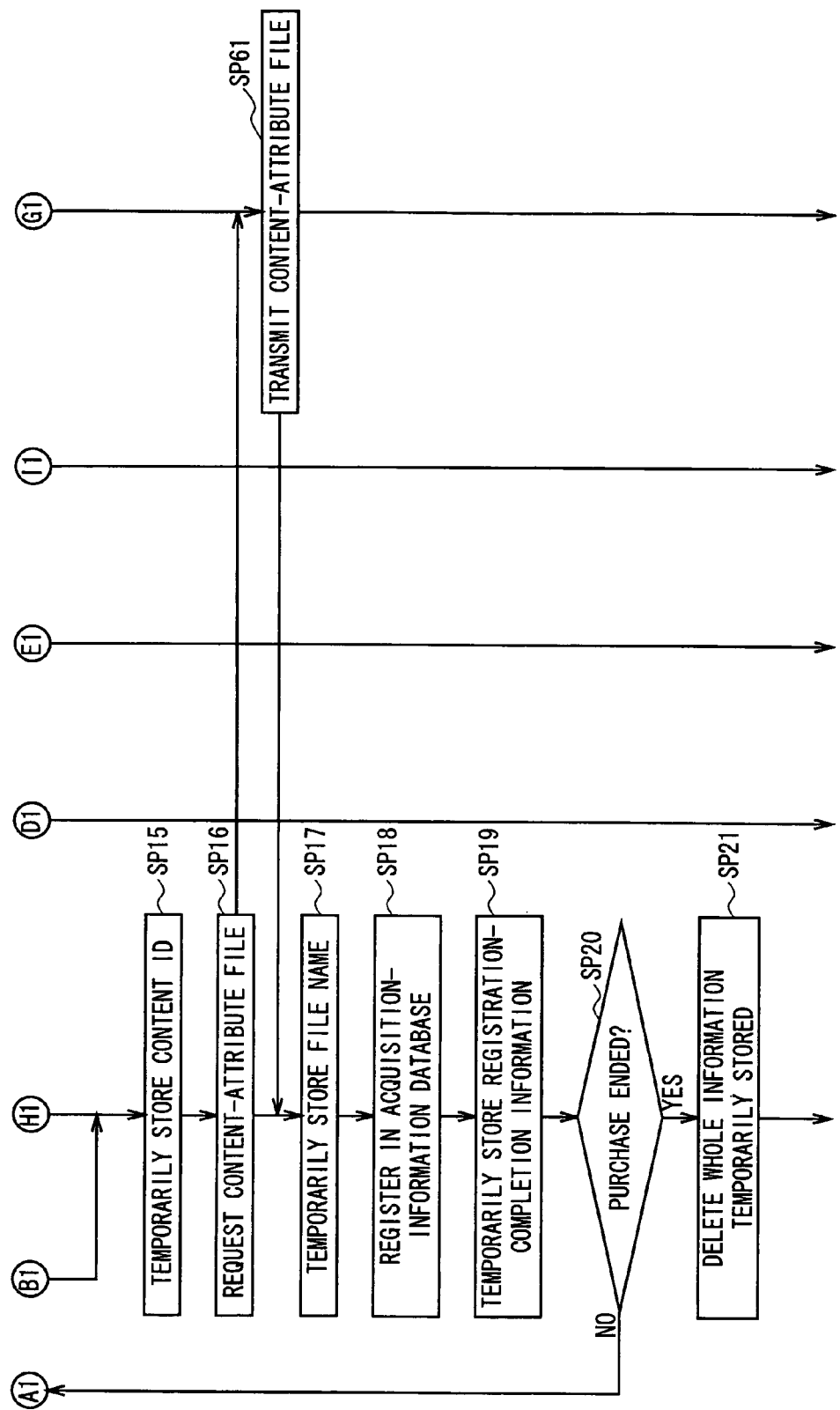
FIG. 13 is a sequence chart showing a normal music purchase process with a first division-part-request method (3).

As shown in FIG. 11 through FIG. 13, when a user requests to purchase one or more music after choosing the first division-part-request method, the client terminal 2 at step SP1 generates the music-purchase-request data including the user's user ID, password, and a content ID corresponding to the purchase-target music. The client terminal 2 then transmits the music-purchase-request data to the portal server 4, and proceeds to next step SP2.

And then, the portal server 4 at step SP31 performs personal authentication process for the user, based on the music-purchase-request data received from the client terminal 2. The portal server 4 then transmits to the client terminal 2 the acquisition-process-identification information as the acquisition-process-identification-information-notification data. The acquisition-process-identification information is utilized by the client terminal 2 to identify the acquisition process that will be performed this time. The portal server 4 subsequently proceeds to step SP32.

Therefore, when receiving the acquisition-process-identification information, the client terminal 2 at step SP2 temporarily stores it in a hard disk of the hard disk drive 104 as process-status information explaining the status of this acquisition process. And then the client terminal 2 proceeds to next step SP3.

The client terminal 2 at step SP3 confirms whether or not the user has the intention to purchase the music, through a prescribed screen. When the client terminal 2 confirms that the user really has the intention to purchase the music, the client terminal 2 temporarily stores in the hard disk acquisition-start information as the process-status information. This acquisition-start information notifies the start of the acquisition process, which is started in response to the music purchase request. And then the client terminal 2 proceeds to next step SP4.

The client terminal 2 at step SP4 generates the acquisition-utilization-information-request data including the user ID and the acquisition-process-identification information. The client terminal 2 then transmits the acquisition-utilization-information-request data to the portal server 4, and proceeds to next step SP5.

When receiving the acquisition-utilization-information-request data, the portal server 4 at step SP32 generates the file-request data including the acquisition-process-identification information and the content ID corresponding to the purchase-target music. And then the portal server 4 transmits the file-request data to the acquisition utilization information provision server 5.

The acquisition utilization information provision server 5 at step SP41 generates the acquisition-utilization file 25 illustrated by FIG. 4, based on the file-request data received from the portal server 4. The acquisition utilization information provision server 5 then transmits the acquisition-utilization file 25 via the portal server 4 to the client terminal 2. The acquisition utilization information provision server 5 also stores in the acquisition utilization information database 23 the acquisition-process-identification information (that is included in the file-request data) and the acquisition-utilization file 25 (that was transmitted to the client terminal 2) such that they are associated with one another.

The client terminal 2 at step SP5 receives the acquisition-utilization file 25 from the acquisition utilization information provision server 5 via the portal server 4, and temporarily stores it in the hard disk. The client terminal 2 then selects one of the content IDs shown in the acquisition-utilization file 25. By the way, this selected content ID is utilized to request a content data, and will be referred to as a "request-content ID". The client terminal 2 also stores in the hard disk this selected request-content ID as the process-status information, and then proceeds to next step SP6.

In this case, the client terminal 2 generates the "album" directory (FIG. 9) to store and manage the content data and content-attribute file 47, which are acquired in response to the music purchase request.

Each time when the client terminal 2 acquires the content data (purchase-target music) and the content-attribute file 47, the client terminal 2 stores the following items in database format such that they are associated with one another, to generate an acquisition-information database: a music title; a content ID; a name of "album" directory; memory addresses of the hard disk for the content data and the content-attribute file 47; and the like.

Accordingly, the client terminal 2 at step SP6 compares the one request-content ID chosen at step SP5 with content IDs stored in the acquisition-information database. Based on the comparison result, the client terminal 2 determines whether or not the request-content ID has not been registered in the acquisition-information database yet.

Affirmative result at step SP6 means that the one request-content ID chosen at step SP5 has not been registered in the acquisition-information database in the hard disk yet. That is to say, this affirmative result means that it is first time for this acquisition process to acquire a content data corresponding to the request-content ID. Therefore, the client terminal 2 proceeds to step SP7.

The client terminal 2 at step SP7 obtains the notified-address number corresponding to the request-content ID chosen at step SP5 from the acquisition-utilization file 25. The client terminal 2 also obtains the data-size information of the content data corresponding to the request-content ID from the acquisition-utilization file 25.

And then the client terminal 2 determines the division-start positions and the division-end positions based on the notified-address number and the data-size information. The determined division-start positions and division-end positions allows to divide the content data corresponding to the request-content ID by the content-division number that corresponds to the notified-address number, to generate almost the same size of division-part data. In this manner, the client terminal 2 determines the division-start positions and the division-end positions for each division-part data, and then recognizes the division-part-specification information including the division-start positions and the division-end positions as the process-status information. The client terminal 2 subsequently associates the request-content ID temporarily stored in the hard disk as the process-status information, with the division-part-specification information recognized this time as the process-status information, and then stores them temporarily in the hard disk. The client terminal 2 then proceeds to step SP8.

The client terminal 2 at step SP8 generates the division-part-request data, each of which requests different division-part data, to acquire all division-part data. Each division-part-request data includes the request-content ID chosen at step SP5 and the division-part-specification information. And then the client terminal 2 proceeds to next step SP9.

The client terminal 2 performs the process of step SP9, SP10, SP11 and SP12 (these processes are shown in FIG. 12 by surrounding them with a broken line A) for each content provision server 6A through 6N, which is able to provide the same content data. In this case, the client terminal 2 performs the process for each server 6A through 6N at the same time as if simultaneous parallel processing. As a matter of convenience, only the process of step SP9, SP10, SP11 and SP12 with the content provision server 6A will be described hereinafter.

The client terminal 2 at step SP9 selects one of the content-provision addresses corresponding to the request-content IDs chosen at step SP5 from the acquisition-utilization file 25. The client terminal 2 then accesses a content-provision homepage based on the selected content-provision address. While being connected to the content-provision homepage, the client terminal 2 transmits to the content provision server 6A one of the division-part-request data generated at step SP8, and then proceeds to next step SP10.

In response to the request from the client terminal 2, the content provision server 6A at step SP51 divides the content data identified by the request-content ID to extract a division-part data from between the division-start position and the division-end position. The content provision server 6A then transmits to the client terminal 2 the division-part data extracted from the content data.

The client terminal 2 at step SP10 starts to receive the division-part data from the content provision server 6A, and store the received division-part data. And then the client terminal 2 proceeds to next step SP11.

The client terminal 2 at step SP11 recognizes information about reception-end position of the division-part data that the client terminal 2 started to receive at step SP10, as process-status information. In this case, the information about reception-end position shows how much of the division-part data have been received, i.e., it shows the status of the acquisition process. By the way, the information about reception-end position will be referred to as "reception-end-position information". And then the client terminal 2 associates the reception-end-position information recognized this time as process-status information, with the request-content ID temporarily stored as process-status information at step SP5 and the division-part-specification information temporarily stored as process-status information at step SP7, and stores them temporarily in the hard disk. By the way, this division-part-specification information is the one specifying the division-part data that the client terminal 2 started to receive at step SP10. The client terminal 2 subsequently proceeds to step SP12.

The client terminal 2 at step SP12 determines whether or not this division-part data has been received completely, based on the reception-end-position information corresponding to this division-part data (which the client terminal 2 started to receive at step SP10) and the division-end position shown by the division-part-specification information associated with this reception-end-position information.

Negative result at step SP12 means that the reception-end position, which corresponds to the division-part data that the client terminal 2 started to receive at step SP10, has not reached the division-end position yet. That is to say, this negative result means that the client terminal 2 has not received the whole division-part data yet. Therefore, the client terminal 2 retunes to step SP11.

And then the client terminal 2 repeats the process of step SP11 to SP12 as if circulating through them, until affirmative result is obtained at step SP12. In this manner, the client terminal 2 records the change of the reception-end position as the change of the reception status every moment. By the way, this reception-end position corresponds to the division-part data that client terminal 2 started to receive at step SP10.

Affirmative result at step SP12 means that the reception-end position, which corresponds to the division-part data that the client terminal 2 started to receive at step SP10, has reached the division-end position. That is to say, this affirmative result means that the client terminal 2 has received the whole division-part data. In this case, the client terminal 2 deletes the division-part-specification information and reception-end-position information corresponding to this division-part data, and then proceeds to next step SP13.

As mentioned above, the client terminal 2 performs the process of step SP9, SP10, SP11 and SP12 for each content provision server 6A through 6N. Generally, the communication speed between the client terminal 2 and each server 6A through 6N varies according to traffic on the communication lines, and the processing load of each server 6A through 6N is different. That may cause big time differences between each server 6A through 6N to transmit the division-part data after receiving the request for it.

Therefore, the client terminal 2 at step SP13 confirms whether or not the client terminal 2 has received all the division-part data from each content provision server 6A through 6N (from which the client terminal 2 has requested the division-part data).

Negative result at step SP13 for example means that the client terminal 2 is still receiving the division-part data from one or some of the content provision servers 6A through 6N (from which the client terminal 2 has requested the division-part data). Therefore, the client terminal 2 remains at step SP13 to receive the rest of the division-part data from the content provision servers 6A through 6N.

Affirmative result at step SP13 means that the client terminal 2 has received all the division-part data, i.e., it has completely received the one content data which the client terminal 2 requested from the content provision servers 6A through 6N. In this case, the client terminal 2 deletes the division-part-specification information and reception-end-position information corresponding to all the division-part data, and then proceeds to next step SP14.

As mentioned above, generally, the communication speed between the client terminal 2 and each server 6A through 6N varies according to traffic on the communication lines, and the processing load of each server 6A through 6N is different. That may cause big time differences to completely receive each division-part data from each server 6A through 6N after requesting them. Therefore, the client terminal 2 may receive the division-part data from the content provision servers 6A through 6N in the order that is different from the sequence of division-part data in the original content data.

In this case, the client terminal 2 temporarily stores in the hard disk the division-part data received from each content provision server 6A through 6N. The order of the temporarily-stored memory addresses may be also different from the sequence of division-part data in the original content data.

Accordingly, the client terminal 2 at step SP14 changes the temporarily-stored memory addresses where all the division-part data are stored, such that the division-part data can be reproduced in the order corresponding to the sequence of division-part data in the original content data. In this manner, the client terminal 2 integrates all the division-part data on the hard disk to restore the original content data. And then the client terminal 2 sets the new temporarily-stored memory addresses to the formal one, so that the temporarily-stored division-part data are formally stored in the hard disk. The client terminal 2 subsequently proceeds to next step SP15.

By the way, Negative result at noted-above step SP6 means that the request-content ID chosen at step SP5 has already been registered in the acquisition-information database in the hard disk. That is to say, this negative result means that the client terminal 2 has already acquired the content data corresponding to the request-content ID before this acquisition process. Therefore the client terminal 2 copies the content data already received to the "album" directory created by this acquisition process, such that this content data belongs to the "album" directory as a "track" file. And then the client terminal 2 proceeds to step SP15.

The client terminal 2 at step SP15 sets the content ID of the copied content data or restored content data to a stored-content ID. This stored-content ID is equivalent to the request-content ID chosen at step SP5 from the acquisition-utilization file 25, and identifying the content data already stored. By the way, the restored content data means the one restored on the hard disk, and the copied content data means the one copied as a "track" file. And then the client terminal 2 temporarily stores in the hard disk the stored-content ID as process-status information, and proceeds to next step SP16.

The client terminal 2 at step SP16 selects from the acquisition-utilization file 25 the attribute-file-provision address corresponding to the request-content ID chosen at step SP5. The client terminal 2 subsequently accesses the attribute-file-provision homepage based on the attribute-file-provision address, and then proceeds to next step SP17.

At this time, the attribute information provision server 7 at step SP61 transmits to the client terminal 2 a content-attribute file 47 corresponding to the attribute-file-provision homepage accessed by the client terminal 2.

Therefore, the client terminal 2 at step SP17 receives the content-attribute file 47 from the attribute information provision server 7. After having received the whole content-attribute file 47, the client terminal 2 temporarily stores in the hard disk the file name of content-attribute file 47 (which is equivalent to content-attribute-identification information) as process-status information, and then proceeds to next step SP18.

The client terminal 2 at step SP18 associates the following items with one another to generate registration information: the request-content ID chosen at step SP5; the hard disk's memory addresses that store the content data, which being made up of the plurality of division-part data that the client terminal 2 acquired; the hard disk's memory addresses that store the content-attribute file 47. The client terminal 2 subsequently registers the registration information in the acquisition-information database in the hard disk, and then proceeds to next step SP19. By the way, the hard disk's memory addresses that store the content data have been changed from the temporarily-stored memory addresses, when the content data was restored from the plurality of division-part data at step SP14.

The client terminal 2 at step SP19 temporarily stores in the hard disk registration-completion information as process-status information, and then proceeds to next step SP20. This registration-completion information means that the registration information has been registered in the acquisition-information database.

The client terminal 2 at step SP20 confirms whether or not the client terminal 2 has acquired all the content data and content-attribute files 47, which correspond to the plurality of pieces of music (or, a piece of music) that the user requested to purchase this time. That is to say, the client terminal 2 confirms whether or not the client terminal 2 has purchased all the purchase-requested music.

Negative result at step SP20 means that the client terminal 2 has not yet received all the content data and content-attribute files 47, since the user this time requested to purchase an album including a plurality of pieces of music (songs) and the client terminal 2 has just acquired one or some of them. Therefore, the client terminal 2 retunes to step SP5. And then the client terminal 2 repeats the process of step SP5, SP6, SP7, SP8, SP9, SP10, SP11, SP12, SP13, SP14, SP15, SP16, SP17, SP18, SP19 and SP20 as if circulating through them, until affirmative result is obtained at step SP20 (especially, the client terminal 2 performs the process of step SP9, SP10, SP11 and SP12 for each content provision server 6A through 6N (that can provide the same content data) at the same time as if simultaneous parallel processing). In this manner, the client terminal 2 acquires from the content provision servers 6A through 6N and attribute information provision server 7 all the content data and content-attribute files 47, which correspond to the music that the user requested to purchase.

By contrast, affirmative result at step SP20 means that the client terminal 2 has acquired all the content data and content-attribute file(s) 47, which correspond to all pieces of music stored in the album (or one piece of music) that the user this time requested to purchase. In this case, the client terminal 2 proceeds to step SP21.

The client terminal 2 at step SP21 deletes the whole process-status information that were sequentially recorded on the hard disk as for example log files by this acquisition process. And then the client terminal 2 ends this acquisition process.

Figure 14:
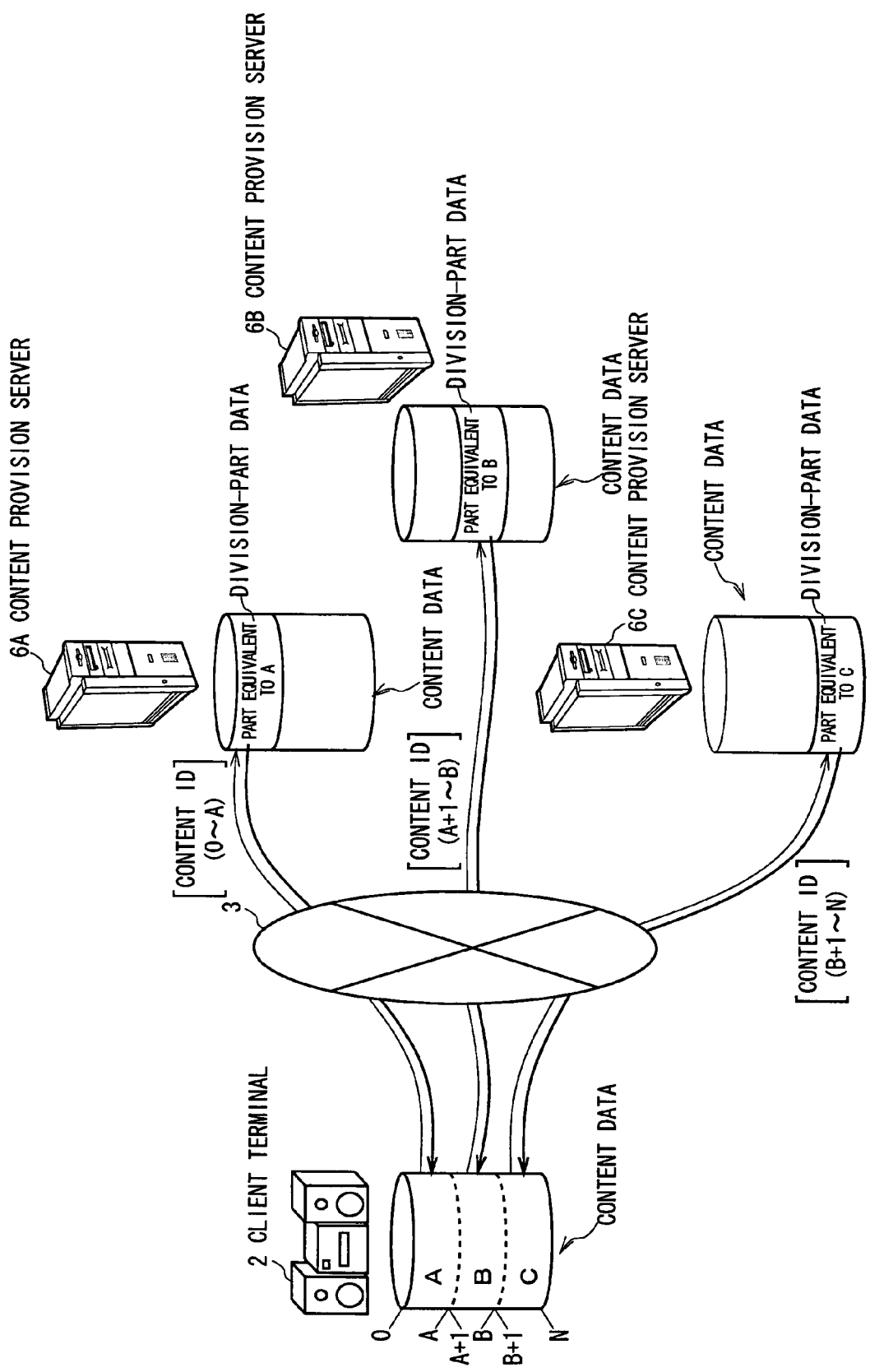
FIG. 14 is a schematic diagram for illustrating the acquisition of content data when a content-division number is equal to a notified-address number.

As shown in FIG. 14, when there is a plurality of content provision servers 6A through 6C that can provide the same content data, and the client terminal 2 has set the notified-address number to the content-division number because the first division-part-request method was selected, the client terminal 2 requests each division-part data of the one content data from different content provision server 6A through 6C (that can provide the same content data) just one time. After having received each division-part data from the content provision servers 6A through 6C, the client terminal 2 integrates them. In this way, the client terminal 2 restores the acquisition-target content data from the division-part data. In this manner, the client terminal 2 acquires the acquisition-target content data.

(2-1-2) Normal Music Purchase Process with Second Division-Part-Request Method

With reference to sequence charts shown in FIG. 15 through FIG. 18, the normal music purchase process with the second division-part-request method will be described hereinafter. In this case, a user chooses the second division-part-request method using the client terminal 2.

As shown in FIG. 15 through FIG. 18 (FIG. 15 through FIG. 18 use the same symbols and marks for the corresponding parts of FIG. 11 through FIG. 13), when a user requests to purchase one or more music after choosing the second division-part-request method, the client terminal 2 sequentially performs the same processes of step SP1 through SP6 as the above noted first division-part-request method. The client terminal 2 proceeds to next step SP71, when affirmative result is obtained at step SP6.

The client terminal 2 at step SP71 obtains from the acquisition-utilization file 25 a notified-address number of the content-provision addresses corresponding to the request-content ID chosen at step SP5. The client terminal 2 also obtains from the acquisition-utilization file 25 the data-size information of the content data corresponding to the request-content ID. And then the client terminal 2 compares the notified-address number with the chosen-address number to determine whether or not the chosen-address number is equal to the notified-address number.

Affirmative result at step SP71 means that the chosen-address number that was previously chosen by the user is equal to the notified-address number. In this case, the client terminal 2 proceeds to the above-noted step SP7 (illustrated by FIG. 11 through FIG. 13). After that, the client terminal 2 sequentially performs the processes of step SP7 through SP21 in the same way as the above-noted first division-part-request method (illustrated by FIG. 11 through FIG. 13).

By contrast, Negative result at step SP71 means that the chosen-address number that was previously chosen by the user is not equal to the notified-address number that was notified by the acquisition-utilization file 25. In this case, the client terminal 2 proceeds to step SP72. By the way, this notified-address number shows the number of the content-provision addresses corresponding to the request-content ID.

The client terminal 2 at step SP72 confirms whether or not the chosen-address number is less than the notified-address number.

Affirmative result at step SP72 means that the chosen-address number is less than the notified-address number. That is to say, this affirmative result means that the client terminal 2 will request from one or some of the content provision servers 6A through 6N division-part data, each of which being generated by dividing the content data corresponding to the request-content ID by the content-division number that is less than the number of the content provision servers 6A through 6N capable of providing the same content data (that is to say, the content-division number is equal to the chosen-address number). In this case, the client terminal 2 proceeds to next step SP73.

The client terminal 2 at step SP73 determines the division-start positions and the division-end positions based on the data-size information and the chosen-address number that is less than the notified-address number. The determined division-start positions and division-end positions allows to divide the content data corresponding to the request-content ID by the content-division number that corresponds to the chosen-address number, to generate almost the same size of division-part data. In this manner, the client terminal 2 determines the division-start positions and the division-end positions for each division-part data, and then recognizes the division-part-specification information including the division-start positions and the division-end positions as process-status information. The client terminal 2 subsequently associates the request-content ID temporarily stored as process-status information at step SP5, with the division-part-specification information recognized this time as process-status information, and then stores them temporarily in the hard disk. After that, the client terminal 2 performs the process of step SP8, and then proceeds to step SP74.

The client terminal 2 at step SP74 obtains from the acquisition-utilization file 25 all content-provision addresses corresponding to the request-content ID chosen at step SP5.

In this case, the number of content provision servers from which the client terminal 2 will request the division-part data this time is less than the number of content provision servers capable of providing this content data (corresponding to the request-content ID). That is to say, the client terminal 2 for example excludes the following addresses from the content provision addresses obtained from the acquisition-utilization file 25: the user-specified content provision addresses of the content provision servers, which being under heavy processing loads; the user-specified content provision addresses of the content provision servers, which often causes communication delay; the content provision addresses randomly specified by the user; and the like. In this manner, the client terminal 2 selects some of the content provision addresses obtained from the acquisition-utilization file 25 such that the number of the selected addresses is equal to the content-division number (i.e., the chosen-address number), and then proceeds to next step SP9.

The client terminal 2 then sequentially performs the processes of step SP9 through SP21 in the same way as the above-noted first division-part-request method.

By the way, Negative result at step SP72 means that the notified-address number is greater than the chosen-address number. That is to say, this negative result means that the client terminal 2 will request from each content provision server 6A through 6N division-part data, each of which being generated by dividing the content data corresponding to the request-content ID by the content-division number that is greater than the number of the content provision servers 6A through 6N capable of providing the same content data (that is to say, the content-division number is equal to the chosen-address number). In this case, the client terminal 2 proceeds to next step SP75.

The client terminal 2 at step SP75 determines the division-start positions and the division-end positions based on the data-size information and the chosen-address number that is greater than the notified-address number. The determined division-start positions and division-end positions allows to divide the content data corresponding to the request-content ID by the content-division number that corresponds to the chosen-address number, to generate almost the same size of division-part data. In this manner, the client terminal 2 determines the division-start positions and the division-end positions for each division-part data, and then recognizes the division-part-specification information including the division-start positions and the division-end positions as process-status information. The client terminal 2 subsequently associates the request-content ID temporarily stored as process-status information at step SP5, with the division-part-specification information recognized this time as process-status information, and then stores them temporarily in the hard disk. After that, the client terminal 2 sequentially performs the process of step SP8 through SP12, and then proceeds to step SP76.

In this case, the content-division number of the content data corresponding to the request-content ID is greater than the notified-address number, which is to say the number of the division-part data is greater than the notified-address number. Therefore, the client terminal 2 at step SP76 confirms whether or not the client terminal 2 has requested from the content provision servers 6A through 6N all the division-part data that make up the content data.

Negative result at step SP76 means that the client terminal 2 has not requested yet from the content provision servers 6A through 6N one or some of the division-part data that make up the content data corresponding to the request-content ID. In this case, the client terminal 2 returns to step SP9.

Then, the client terminal 2 at step SP9 requests again the division-part data that have not been received yet, from the content provision servers 6A through 6N capable of providing the content data corresponding to the request-content ID. In this case, the client terminal 2 specifically requests them from the content provision servers 6A through 6N that have transmitted the division-part data in the order that the client terminal 2 has received. The client terminal 2 then sequentially performs the processes of step SP10 through 12 again, and proceeds to step SP76.

Affirmative result at step SP76 means that the client terminal 2 has requested from the content provision servers 6A through 6N all of the division-part data that make up the content data corresponding to the request-content ID. In this case, the client terminal 2 proceeds to step SP13. After that, the client terminal 2 sequentially performs the processes of step SP13 through step SP21.

Figure 16:
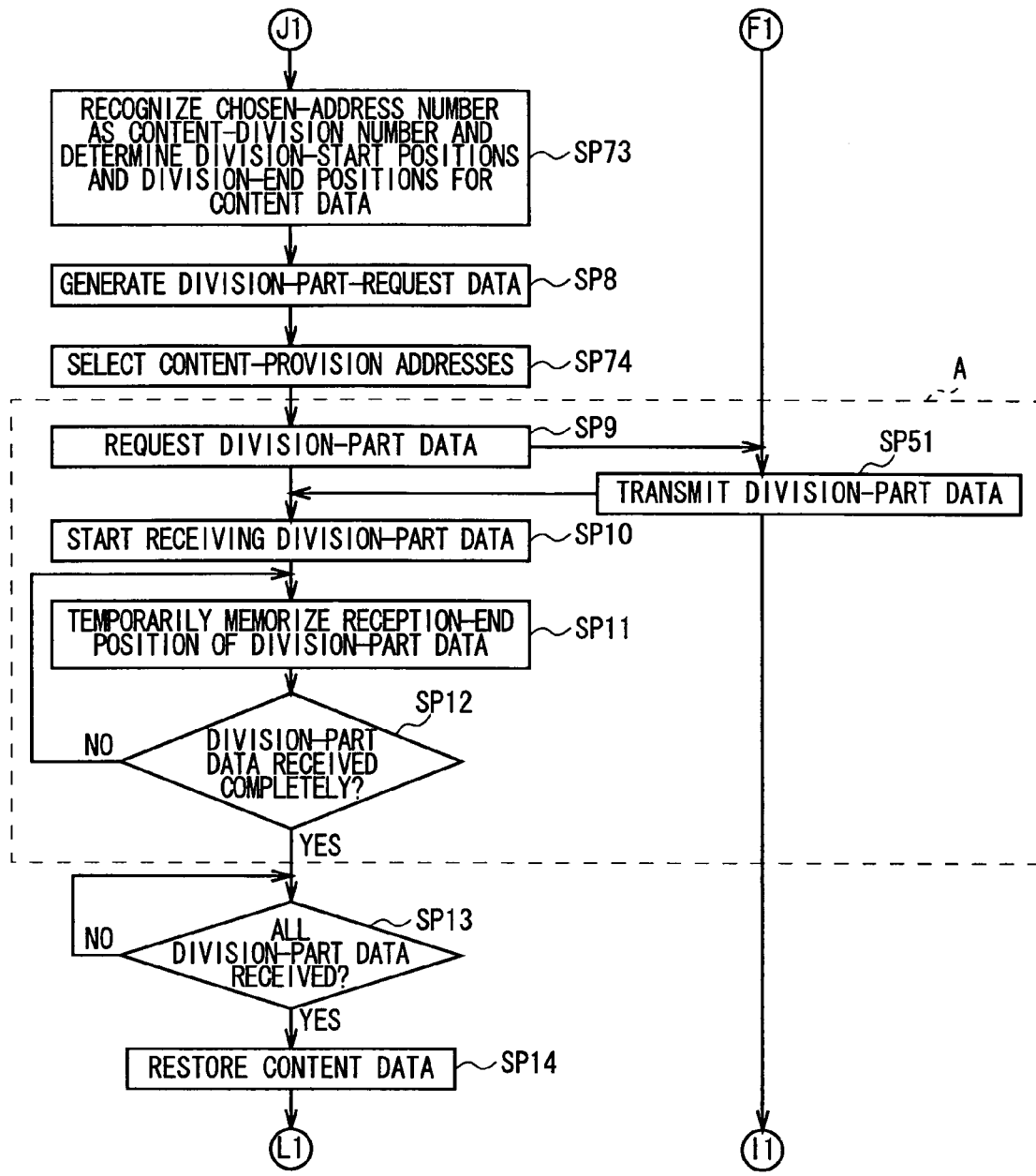
FIG. 16 is a sequence chart showing a normal music purchase process with a second division-part-request method (2).
Figure 17:
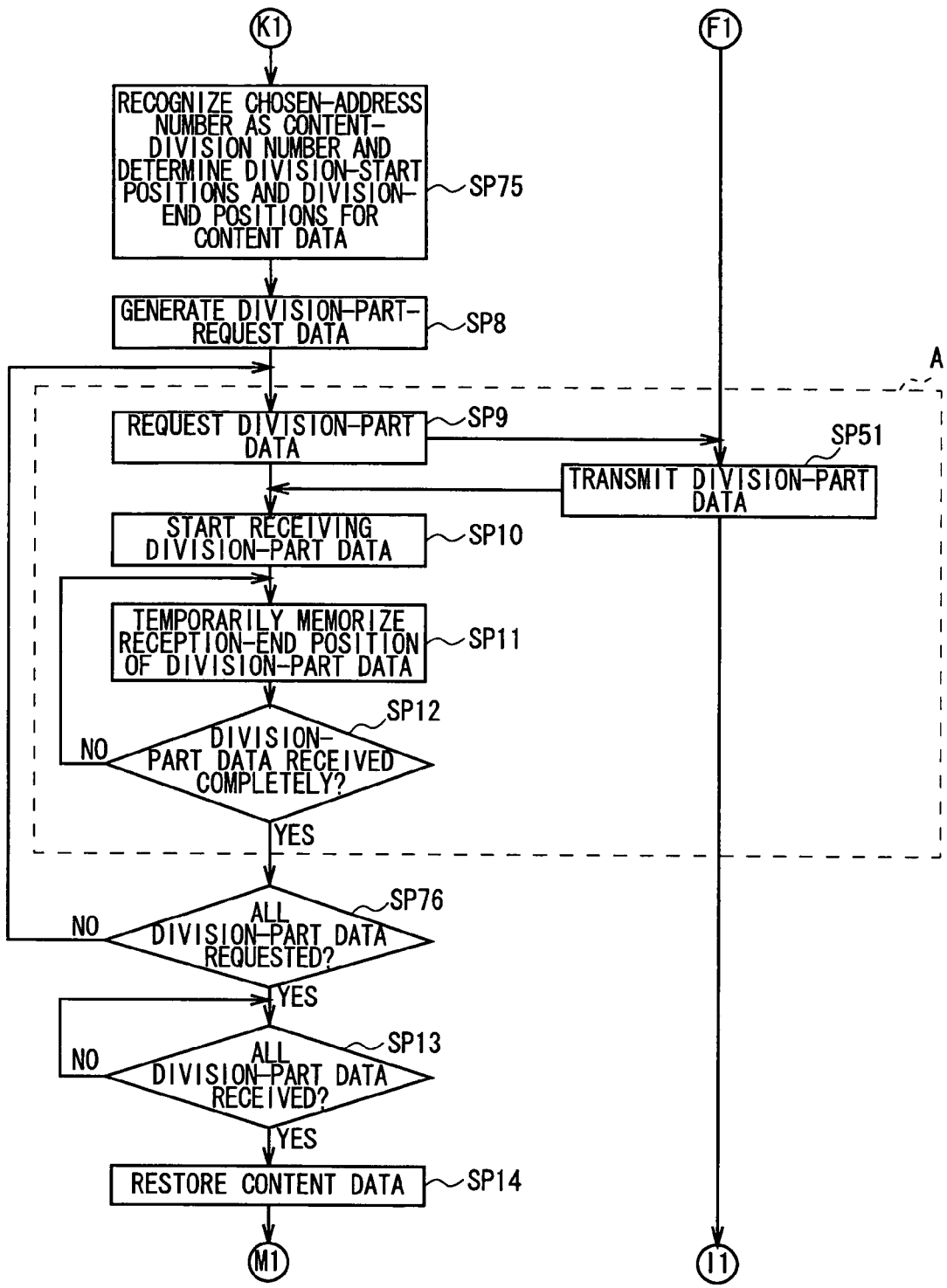
FIG. 17 is a sequence chart showing a normal music purchase process with a second division-part-request method (3).
Figure 18:
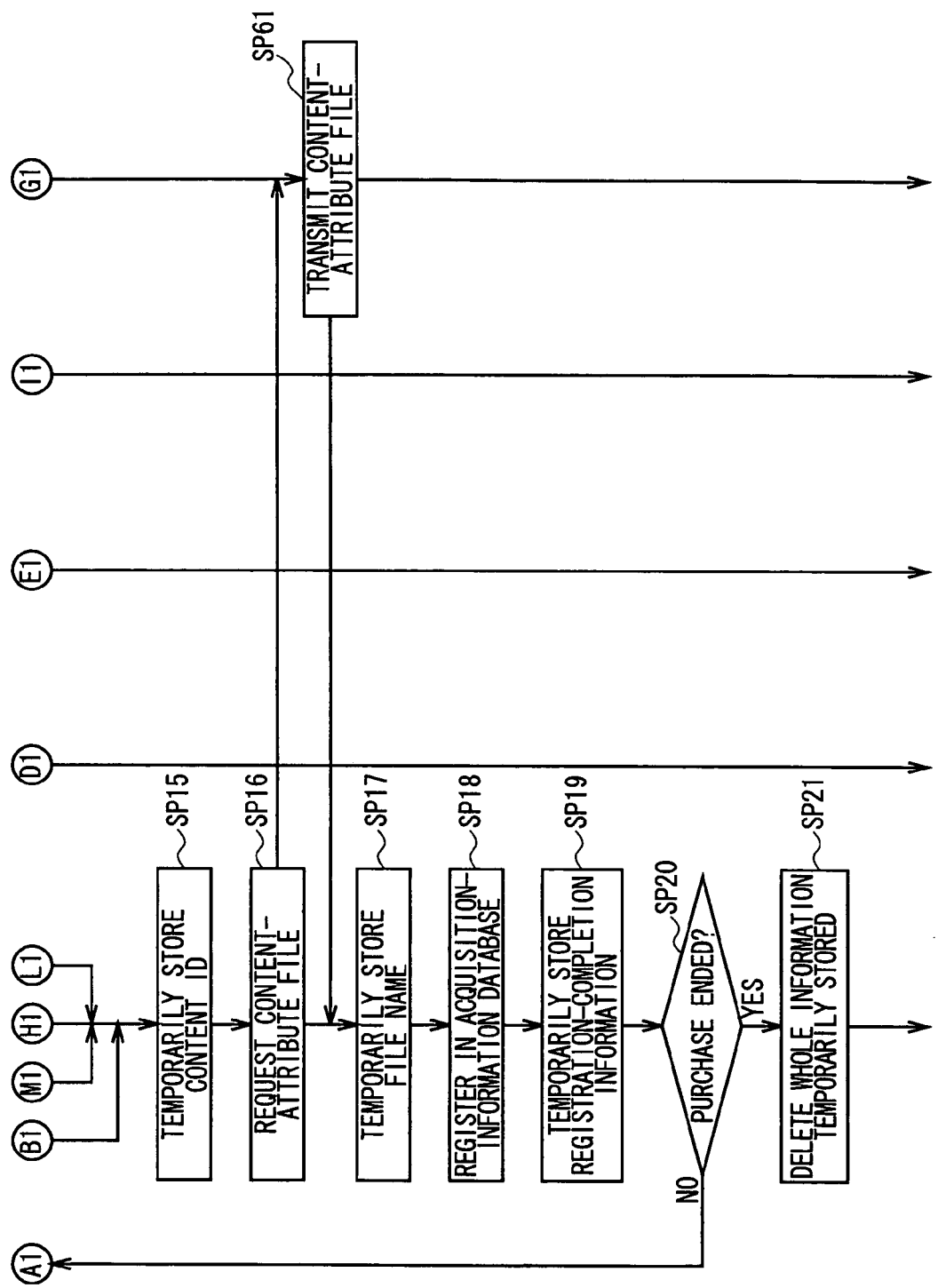
FIG. 18 is a sequence chart showing a normal music purchase process with a second division-part-request method (4).

In this manner, each time the client terminal 2 selects a request-content ID, the client terminal 2 selectively performs the above-noted sequence of processes illustrated by FIG. 12, FIG. 16 and FIG. 17, based on the notified-address number of the content-provision addresses corresponding to the request-content ID, and the chosen-address number chosen by a user. When the client terminal 2 has acquired all the purchase-requested content data (music) and all the corresponding content-attribute files 47, the client terminal 2 ends the acquisition process.

Figure 19:
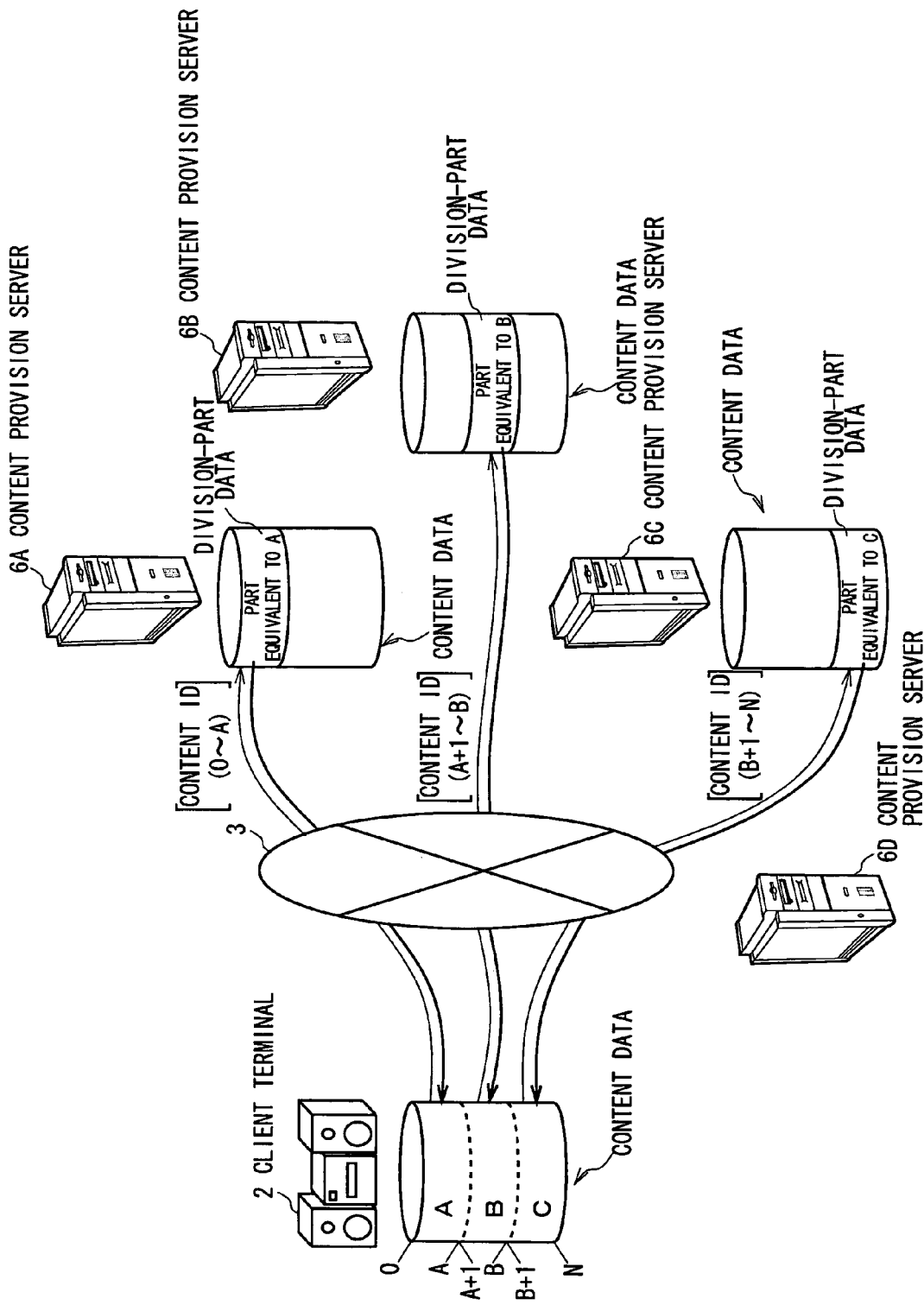
FIG. 19 is a schematic diagram for illustrating the acquisition of content data when the content-division number is less than the notified-address number.

That is to say, as shown in FIG. 19, in the case in which: there is a plurality of the content provision servers 6A through 6D capable of providing the same content data; the second division-part-request method is selected; and the content-division number is less than the notified-address number, the client terminal 2 excludes for example the content provision server 6D from the content division servers 6A through 6D capable of providing the content data because the processing load of the content division server 6D is heavy. Therefore, the client terminal 2 requests from each content provision server 6A through 6C different division-part data just one time. In this way, the client terminal 2 reduces the number of the content provision servers 6A through 6D capable of providing the same content data, and efficiently acquires the acquisition-target content data.

Figure 20:
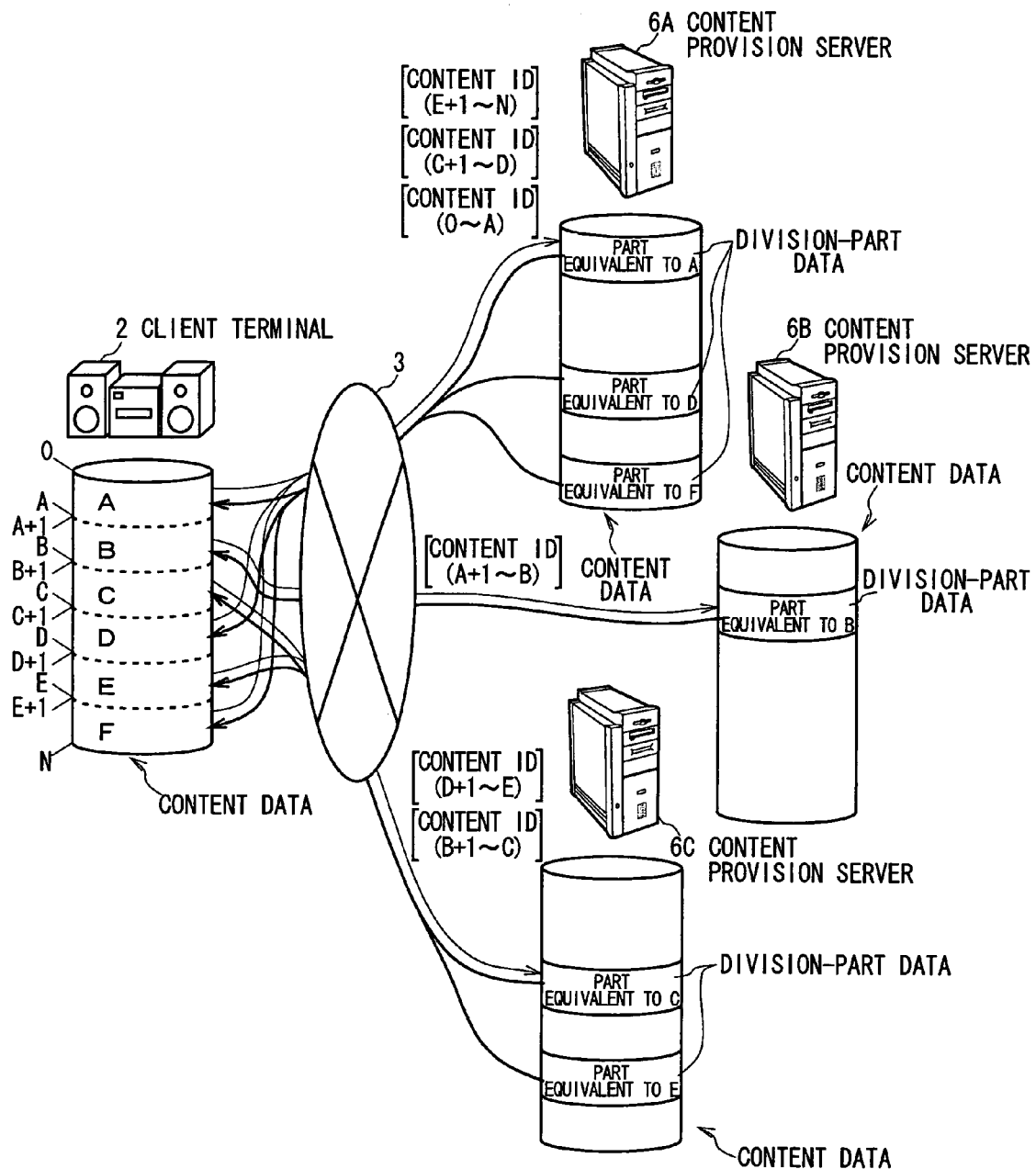
FIG. 20 is a schematic diagram for illustrating the acquisition of content data when the content-division number is greater than a notified-address number.

As shown in FIG. 20, in the case in which: there is a plurality of the content provision servers 6A through 6C capable of providing the same content data; the second division-part-request method is selected; and the content-division number is greater than the notified-address number, the client terminal 2 requests different division-part data of the one content data from all of the content provision servers 6A through 6C capable of providing the content data. When there are some of the division-part data left after having finished the first time request from each content provision servers 6A through 6C, the client terminal 2 then requests them from the low processing load (or high performance) content provision servers 6A or/and 6B prior to the content provision server 6C, because the content provision servers 6A or/and 6B can respond swiftly. Therefore, the client terminal 2 can efficiently acquire the acquisition-target content data, even if the content-division number is greater than the notified-address number.

(2-1-3) Normal Music Purchase Process with Third Division-Part-Request Method

With reference to sequence charts shown in FIG. 21 through FIG. 23, the normal music purchase process with the third division-part-request method will be described hereinafter. In this case, a user chooses the third division-part-request method using the client terminal 2.

Figure 21:
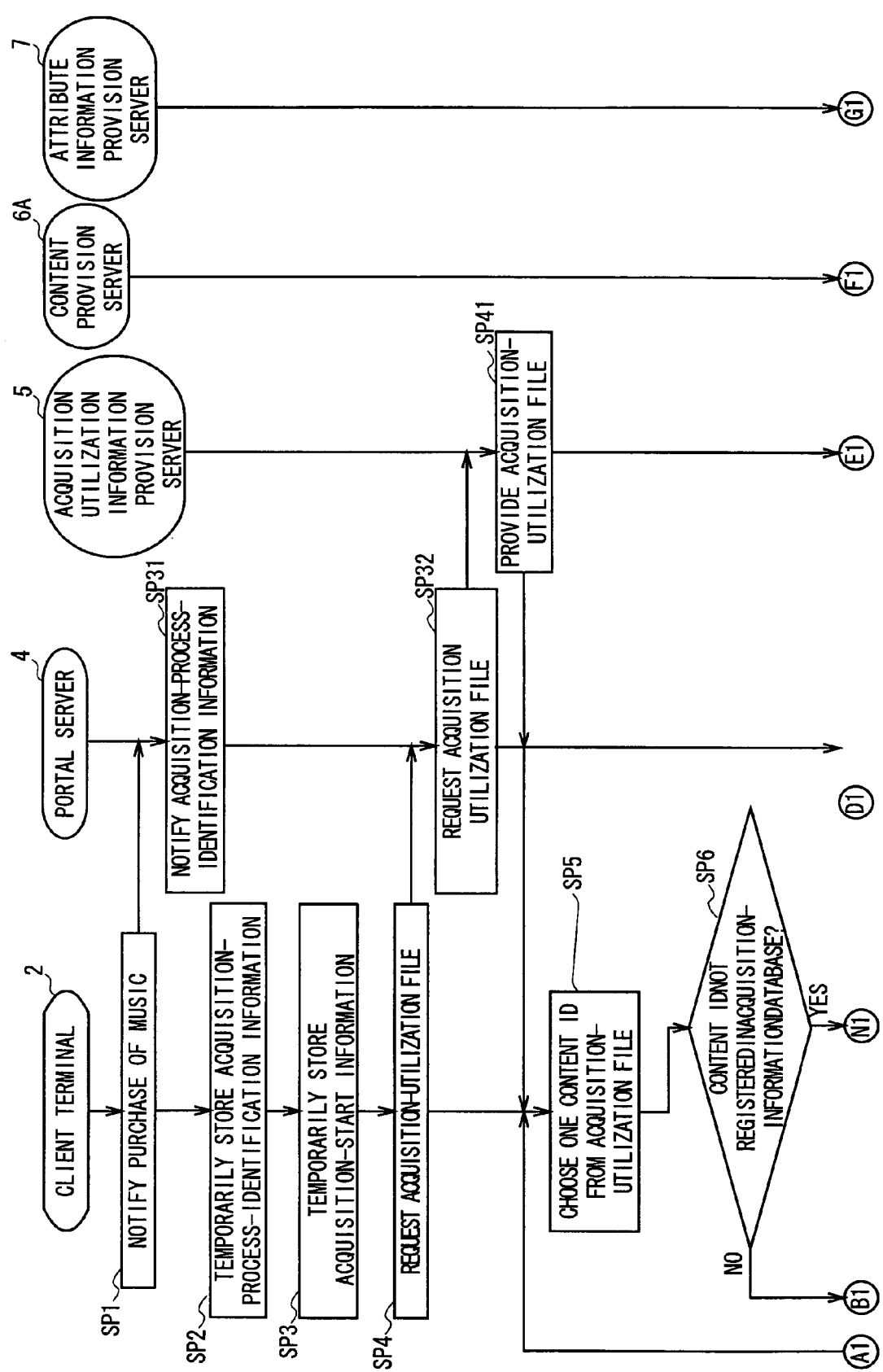
FIG. 21 is a sequence chart showing a normal music purchase process with a third division-part-request method (1).
Figure 22:
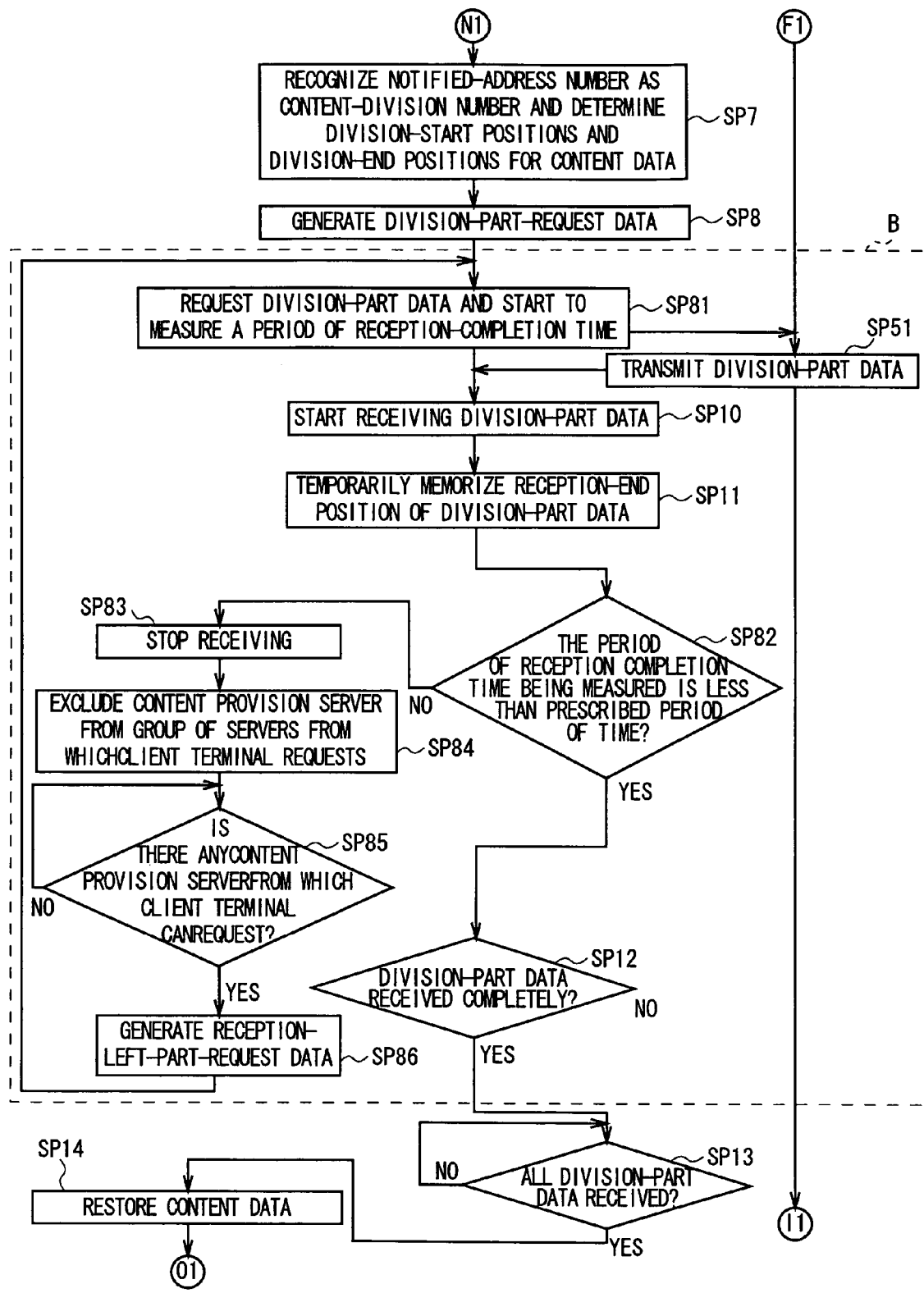
FIG. 22 is a sequence chart showing a normal music purchase process with a third division-part-request method (2).
Figure 23:
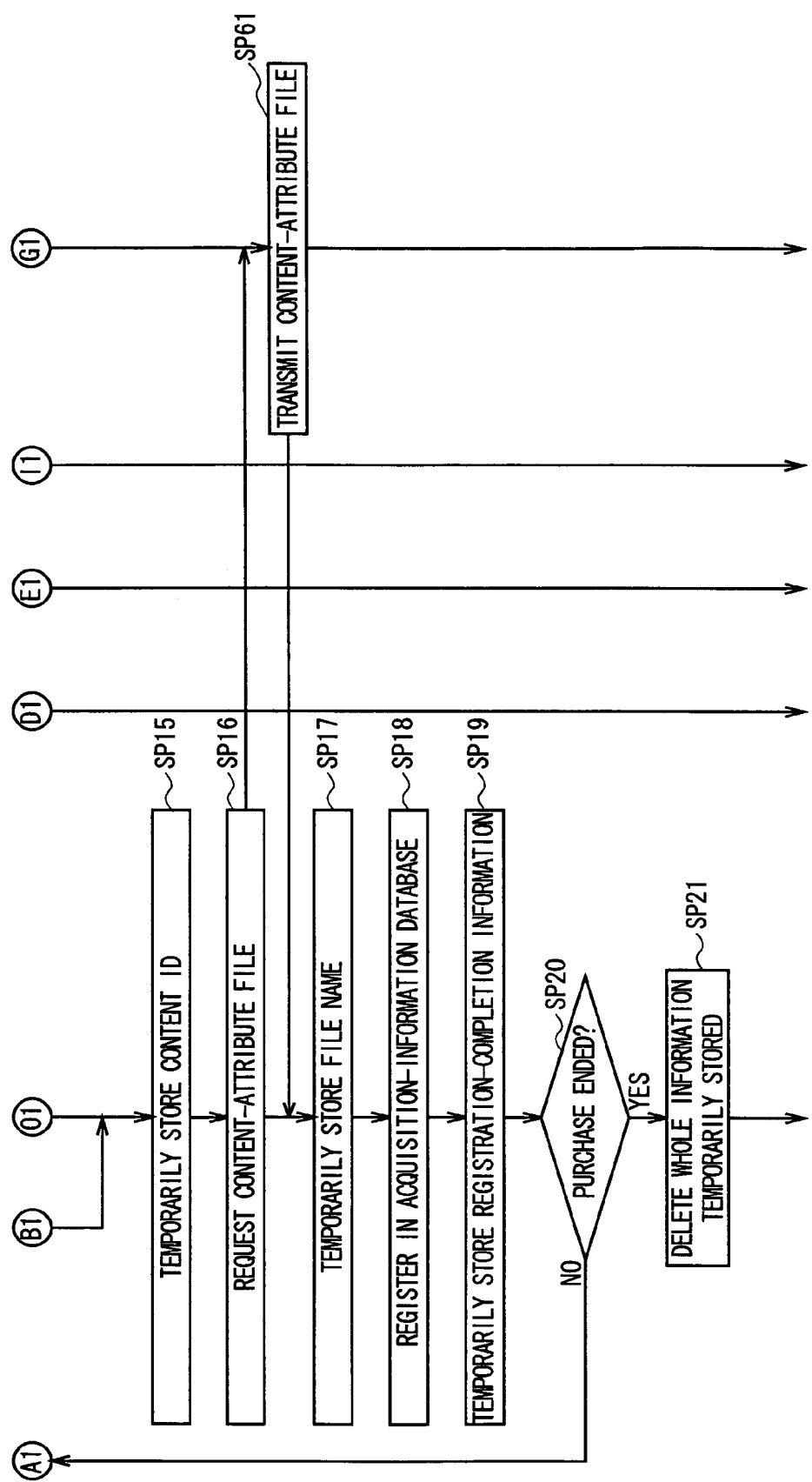
FIG. 23 is a sequence chart showing a normal music purchase process with a third division-part-request method (3).

As shown in FIG. 21 through FIG. 23 (FIG. 21 through FIG. 23 use the same symbols and marks for the corresponding parts of FIG. 11 through FIG. 13), when a user requests to purchase one or more music after choosing the third division-part-request method, the client terminal 2 sequentially performs the same processes of step SP1 through SP8 as the above noted first division-part-request method. Then, the client terminal 2 proceeds to next step SP81.

The client terminal 2 performs the process of step SP81, SP10, SP11, SP82, SP12, SP83, SP84, SP85, SP86 (these processes are shown in FIG. 22 by surrounding them with a broken line B) for each content provision server 6A through 6N, which is able to provide the same content data. In this case, the client terminal 2 performs the process for each server 6A through 6N at the same time as if simultaneous parallel processing. As a matter of convenience, only the process of step SP81, SP10, SP11, SP82, SP12, SP83, SP84, SP85, SP86 with the one content provision server 6A will be described hereinafter.

The client terminal 2 at step SP81 selects one of the content-provision addresses corresponding to the request-content IDs chosen at step SP5 from the acquisition-utilization file 25. The client terminal 2 then accesses a content-provision homepage based on the selected content-provision address. While being connected to the content-provision homepage, the client terminal 2 transmits to the content provision server 6A one of the division-part-request data generated at step SP8. In this case, the content provision server 6A is publishing this content-provision homepage.

At this time, the client terminal 2 starts to measure the period of time between the transmission of the division-part-request data to the content division server 6A and the reception of the division-part data transmitted in response to this request (this period of time will be referred to as a "reception-completion time). The client terminal 2 subsequently proceeds to next step SP10. And then the client terminal 2 sequentially performs the processes of step SP10 and SP11 in the same way as the above-noted first division-part-request method, and proceeds to next step SP82.

The client terminal 2 at step SP82 determines whether or not the measurement started at step SP81 ends. Alternatively, the client terminal 2 at step SP82 determines whether or not the reception-completion time being measured is less than a prescribed period of time, which is defined in order to not to decrease the efficiency of the acquisition of content data.

Affirmative result at step SP82 means that, with the reception of the division-part data that the client terminal 2 requested at step SP81 from the content provision server 6A, the measurement has been finished. Alternatively, this affirmative result at step SP82 means that the reception-completion time being measured is still less than the prescribed period of time. That means that the current circumstances about the client terminal 2 may not remarkably decrease the efficiency of the acquisition of content data. In this case, the client terminal 2 proceeds to next step SP12.

Negative result at step SP82 means that the reception-completion time being measured exceeds the prescribed period of time, while receiving the division-part data that the client terminal 2 requested at step SP81 from the content provision server 6A. That is to say, this negative result at client terminal 2 means that continuing to receive the division-part data may remarkably decrease the efficiency of the acquisition of content data. In this case, the client terminal 2 proceeds to step SP83.

The client terminal 2 at step SP83 stops to receive the division-part data whose the period of reception-completion time has exceeded the prescribed period of time, and then proceeds to next step SP84.

The client terminal 2 at step SP84 excludes the content division server 6A that had been transmitting the division-part data (that the client terminal 2 stopped to receive) from the group of servers from which the client terminal 2 requests division-part data this time, and proceeds to next step SP85.

The client terminal 2 at step SP85 determines whether or not there is a content provision server 6A through 6N that can provide the rest of division-part data that the client terminal 2 has not received yet (the rest of division-part data will be referred to as "reception-left-part data").

Negative result at step SP85 means that the client terminal 2 is currently receiving division-part data from one or some of the content provision servers 6B through 6N (which are different from the content provision server 6A excluded from the group of servers), which is to say one or some of the other content provision servers 6B through 6N is/are probably transmitting division-part data. That is to say, this negative result means that the client terminal 2 currently cannot request the reception-left-part data from the content provision servers 6B through 6N (which are different from the content provision server 6A excluded from the group of servers). In this case, the client terminal 2 remains at step SP85 until the client terminal 2 can request the reception-left-part data from the content provision servers 6B through 6N.

Affirmative result at step SP85 means that the client terminal 2 has already received division-part data from at least one of the content provision servers 6B through 6N (which are different from the content provision server 6A excluded from the group of servers). That is to say, this affirmative result means that the client terminal 2 can currently request the reception-left-part data from one of the content provision servers 6B through 6N. In this case, the client terminal 2 proceeds to next step SP86.

At step SP86, based on the division-part-specification information and reception-end-position information corresponding to the division-part data that the client terminal 2 stopped to receive, the client terminal 2 recognizes the reception-end position as a start position of the reception-left-part data (which will be referred to as a "reception-left-part-start position"), and the division-end position as an end position of the reception-left-part data (which will be referred to as a "reception-left-part-end position"). The client terminal 2 then generates a reception-left-part-request data including the reception-left-part-start position, the reception-left-part-end position, and the corresponding request-content ID. The client terminal 2 subsequently returns to step SP81.

When returning to step SP81 after stopping to receive the division-part data, the client terminal 2 selects from the content provision servers 6B through 6N (which are different from the content provision server 6A excluded from the group of servers) the one from which the client terminal 2 has received a division-part data completely at the earliest time.

Then, the client terminal 2 at step SP81 transmits the reception-left-part-request data to the selected content provision server 6B through 6N.

In response to the reception-left-part-request data, the content provision server. 6B through 6N transmits the reception-left-part data that makes up a part of the content data. The client terminal 2 at step SP10 starts to receive the reception-left-part data. And then the client terminal 2 sequentially performs the processes of step SP11, SP82, SP12, SP83, SP84, SP85 and SP86 to receive the reception-left-part data in the same way as receiving the division-part data.

After having received the division-part data and the reception-left-part data, the client terminal 2 proceeds to next step SP13. And then the client terminal 2 sequentially performs the processes of step SP13 through SP21 in the same way as the above-noted first division-part-request method. In this manner, the client terminal 2 receives all the purchase-requested content data (music) and content-attribute files 47, and ends the acquisition process.

Figure 24:
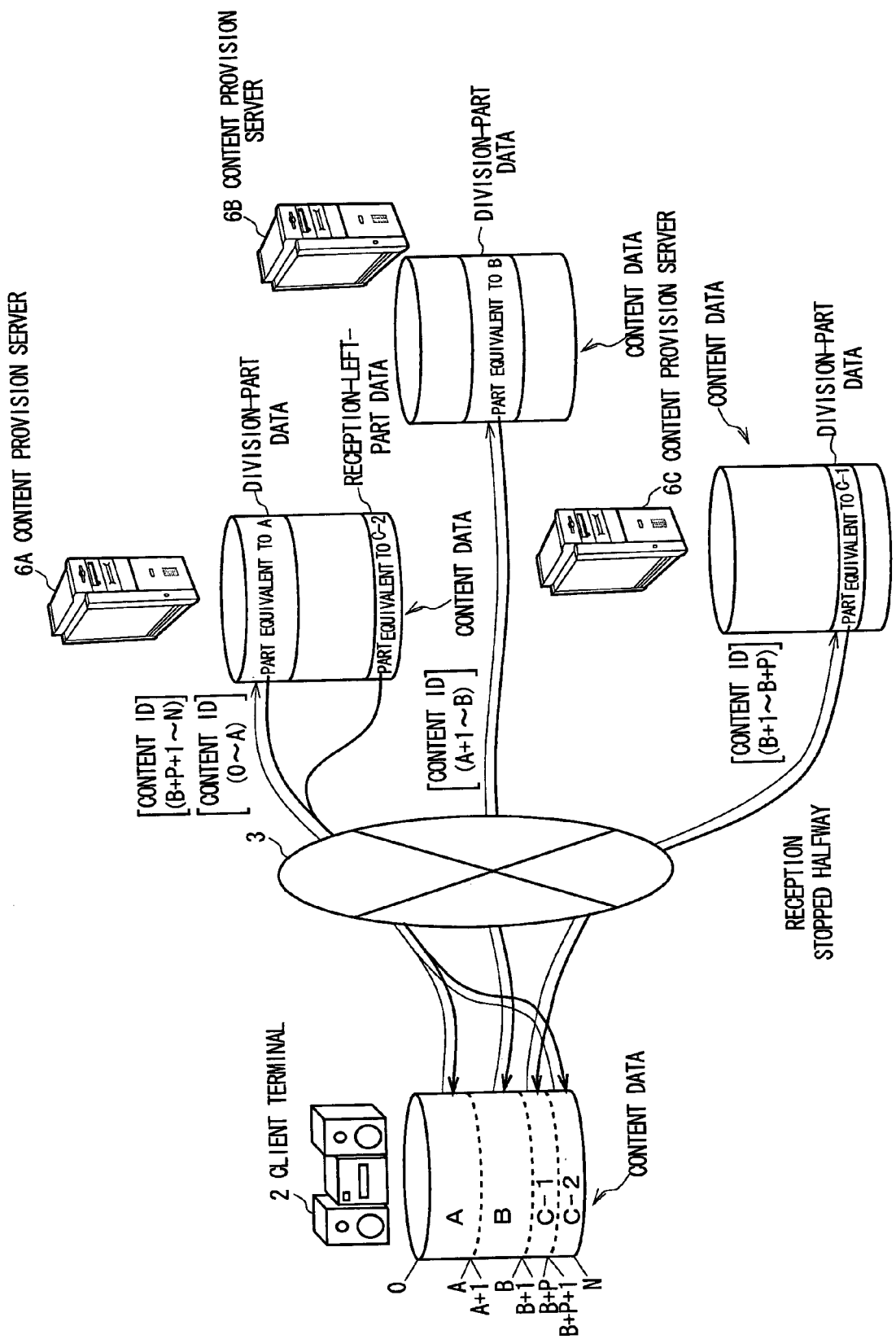
FIG. 24 is a schematic diagram for illustrating the acquisition of content data when the reception of the division-part data was stopped halfway.

Therefore, as shown in FIG. 24, in the case in which: there is a plurality of the content provision servers 6A through 6C; and the third division-part-request method is selected, the client terminal 2 requests from each content provision server 6A through 6C different division-part data, each of which make up the part of one content data. However, if it takes time to receive a division-part data from the content provision server 6C (i.e., the reception-completion time is longer), the client terminal 2 stops to receive it from the content provision server 6C because its processing load may be remarkably heavy (or its processing ability may be remarkably low).

After stopping to receive the division-part data, the client terminal 2 requests the rest of it (reception-left-part data) from the content provision server 6A, because the content provision server 6A from which the client terminal 2 has received a division-part data at the earliest time has high processing ability (or its processing load is not heavy). Therefore, the client terminal 2 can efficiently acquire the acquisition-target content data.

(2-2) Restart Music Purchase Process

There is a possibility that the client terminal 2 stop to communicate when a user carelessly plugs it off and it is powered off for example. There is also a possibility that the client terminal 2 stop to communicate when its network cable is plugged off and it is disconnected from the network 3 for example. In these cases, the above-mentioned acquisition process stops. And after starting to communicate again, the client terminal 2 performs the restart music purchase process to restart the acquisition process. With reference to sequence charts shown in FIG. 25 through FIG. 27, this restart music purchase process will be described hereinafter.

Figure 25:
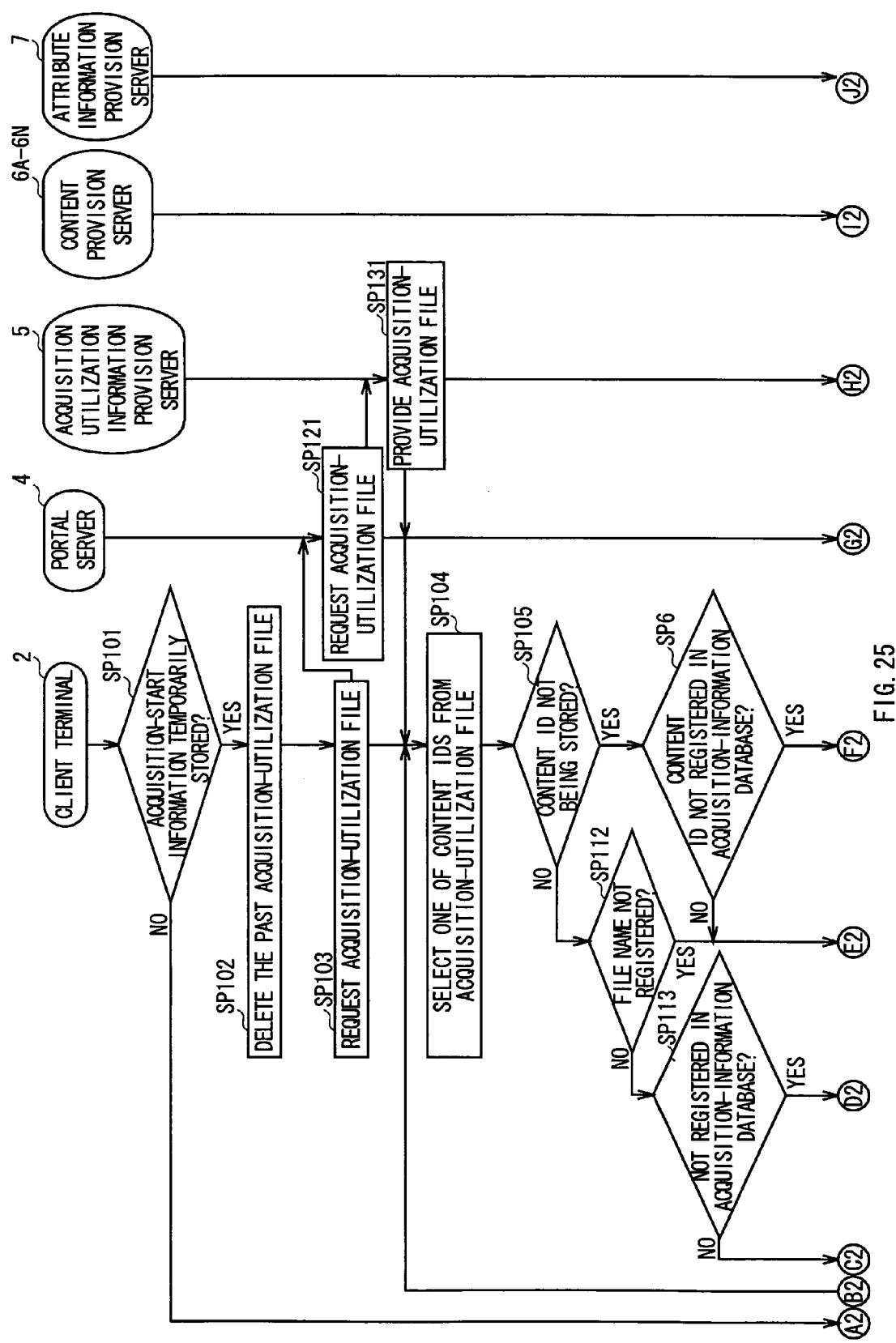
FIG. 25 is a sequence chart showing a restart music purchase process when the client terminal restarts communication (1).
Figure 26:
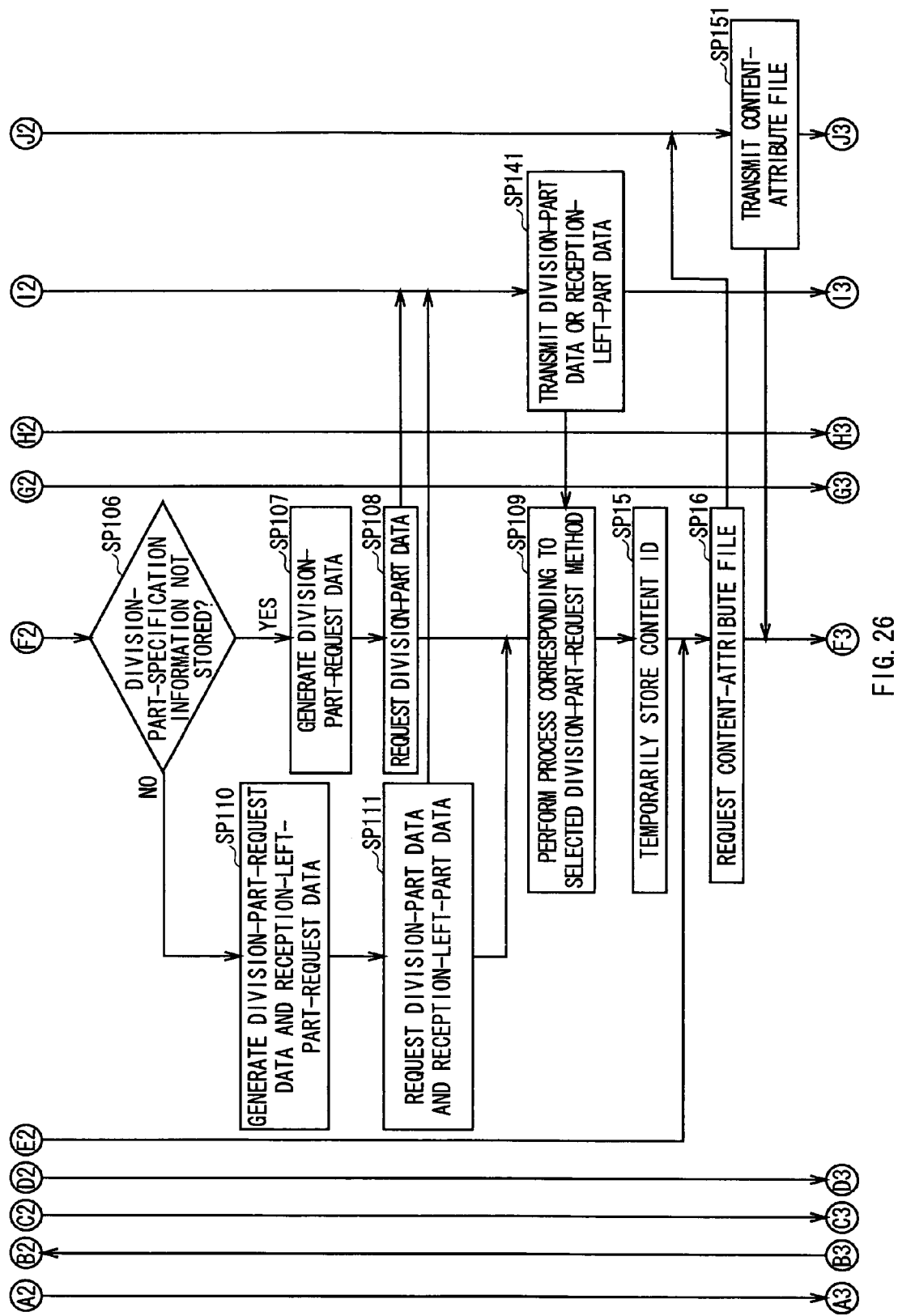
FIG. 26 is a sequence chart showing a restart music purchase process when the client terminal restarts communication (2).
Figure 27:
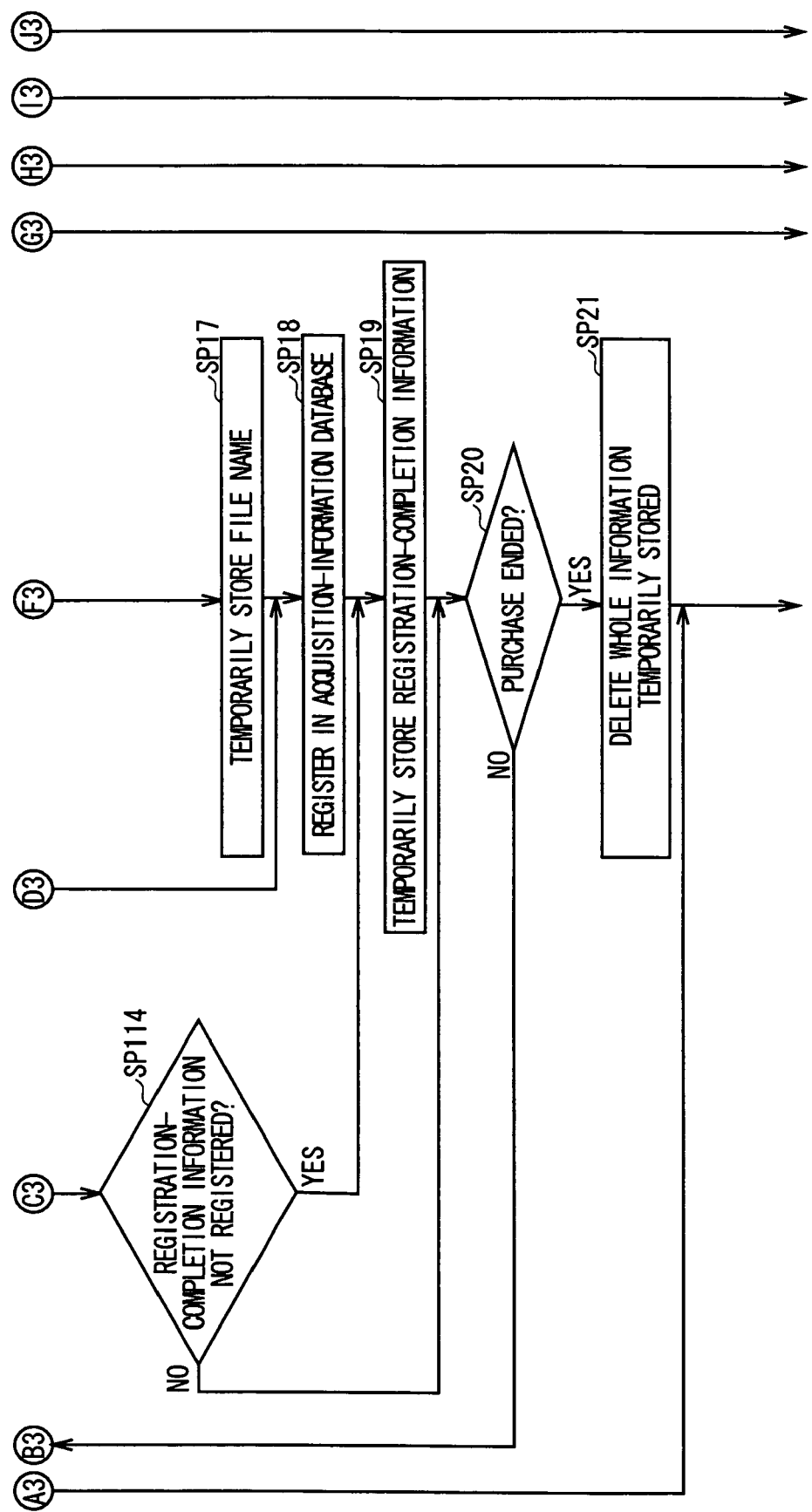
FIG. 27 is a sequence chart showing a restart music purchase process when the client terminal restarts communication (3).

As shown in FIG. 25 through FIG. 27 (FIG. 25 through FIG. 27 use the same symbols and marks for the corresponding parts of FIG. 11 through FIG. 13), the client terminal 2 at step SP101 confirms whether or not the acquisition-start information is left in the hard disk of the hard disk drive 104. In this case, the acquisition-start information may be temporarily stored in the hard disk as processing-status information.

Negative result at step SP101 means that the client terminal 2 stopped to communicate through the network 3 when not performing the acquisition process (the acquisition process starts in response to requests for the purchase of music). That is to say, this negative result means that the acquisition-start information (a part of the processing-status information) is not left in the hard disk. In this case, the client terminal 2 waits until a user requests to purchase music.

Affirmative result at step SP101 means that the acquisition process stopped halfway as the client terminal 2 suddenly stopped to communicate through the network 3. For example, this case happens when the client terminal 2 is plugged off (or its network cable is plugged off) while the client terminal 2 is performing the acquisition process (the acquisition process starts in response to requests for the purchase of music). That is to say, this affirmative result means that the acquisition-start information (a part of the processing-status information) is left in the hard disk. In this case, the client terminal 2 restarts the acquisition process, and proceeds to next step SP102.

By the way, the client terminal 2 had used and saved in the hard disk the acquisition-utilization file 25 acquired from the acquisition utilization information provision server 5, until it stopped this acquisition process halfway. The content-provision addresses and attribute-file-provision addresses included in this acquisition-utilization file 25 may have changed by a company operating the content provision servers 6A through 6N and attribute information provision server 7, while the acquisition process was being stopped.

Therefore, the client terminal 2 at step SP102 deletes the acquisition-utilization file 25 previously used by the stopped acquisition process, and then proceeds to next step SP103.

The client terminal 2 at step SP103 generates an acquisition-utilization-information-re-request data including a user's user ID, password, and the acquisition-process-identification information. This acquisition-process-identification information is the one that was temporarily stored in the hard disk as processing-status information by the stopped acquisition process. The client terminal 2 then transmits the acquisition-utilization-information-re-request data to the portal server 4, and proceeds to next step SP104.

The portal server 4 at step SP121 performs personal authentication process to authenticate the user, based on the user ID and password included in the acquisition-utilization-information-re-request data received from the client terminal 2. After that, based on the acquisition-process-identification information included in the acquisition-utilization-information-re-request data, the client terminal 2 retrieves from the user database 13 the file name of the acquisition-utilization file 25 that was previously provided to the client terminal 2 on the stopped acquisition process. And then the portal server 4 generates a file-re-request data including that file name and the acquisition-process-identification information. The portal server 4 subsequently transmits the file-re-request data to the acquisition utilization information provision server 5.

Based on the file-re-request data received from the portal server 4, the acquisition utilization information provision server 5 at step SP131 retrieves from the acquisition utilization information database 23 the acquisition-utilization file 25 that was previously provided to the client terminal 2 on the stopped acquisition process. And then the acquisition utilization information provision server 5 changes the contents of the acquisition-utilization file 25 properly, and transmits it via the portal server 4 to the client terminal 2.

Therefore, the client terminal 2 at step SP104 receives that acquisition-utilization file 25 from the acquisition utilization information provision server 5, and then temporarily stores it in the hard disk. The client terminal 2 subsequently selects one of the request-content IDs from this acquisition-utilization file 25, and proceeds to next step SP105.

The client terminal 2 at step SP105 confirms whether or not the request-content ID selected at step SP104 from the acquisition-utilization file 25 is not being stored in the hard disk as stored-content ID.

Affirmative result at step SP105 means that the request-content ID selected at step SP104 is not being stored in the hard disk as stored-content ID. That is to say, this affirmative result means that the client terminal 2 did not receive all the division-part data corresponding to that request-content ID before it stopped the acquisition process. In this case, the client terminal 2 proceeds to next step SP6. And then, when the affirmative result is obtained at step SP6, the client terminal 2 proceeds to next step SP106.

The client terminal 2 at step SP106 confirms whether or not the division-part-specification information and reception-end-position information corresponding to the request-content ID selected at step SP104 are not being stored in the hard disk as process-status information.

Affirmative result at step SP106 means that the division-part-specification information and reception-end-position information corresponding to the request-content ID selected at step SP104 are not being stored in the hard disk as process-status information. That is to say, this affirmative result means that the client terminal 2 did not determine the division-start position and division-end position about the content data corresponding to the request-content ID selected at step SP104, while it was previously performing that acquisition process. In this case, the client terminal 2 proceeds to next step SP107.

Figure 15:
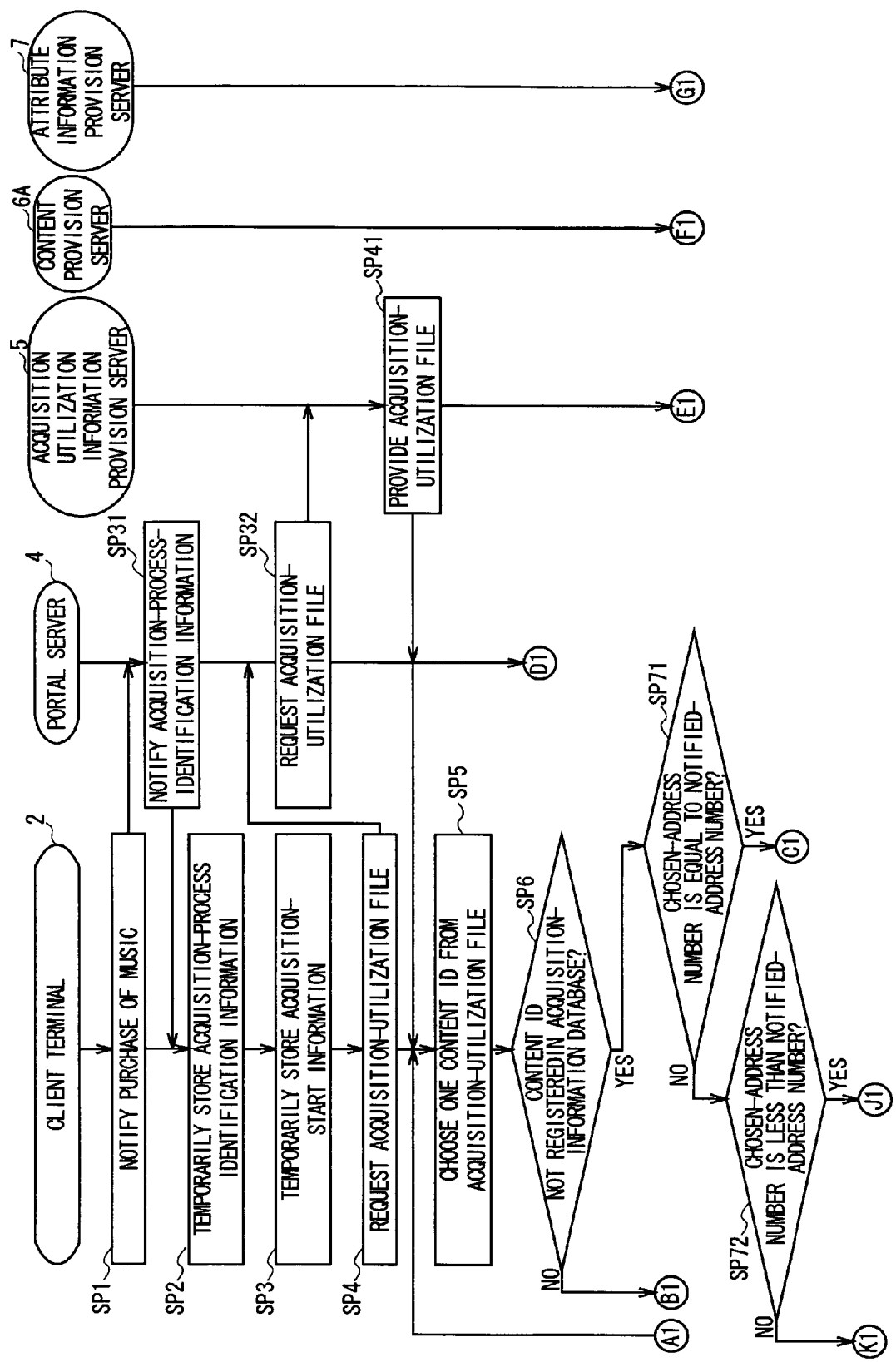
FIG. 15 is a sequence chart showing a normal music purchase process with a second division-part-request method (1).

The client terminal 2 at step SP107 performs one of the following processes in response to the user's selected division-part-request method (i.e., the first, second, or third division-part-request method) to generate a division-part-request data: the process of step SP7 and SP8 illustrated by FIG. 12 and FIG. 22; the process of step SP71, SP72, SP73 and step SP8 illustrated by FIG. 15, FIG. 16 and FIG. 17; or the process of step SP71, SP72, SP75, SP8. And then the client terminal 2 proceeds to next step SP108.

By the way, in the case in which: the second division-part-request method is selected; and the chosen-address number is less than the notified-address number, the client terminal 2 performs the process of step SP74 (illustrated by FIG. 16) after generating the division-part-request data, and then proceeds to step SP108.

The client terminal 2 at step SP108 transmits each of the division-part-request data to different content provision server 6A through 6N, such that it requests each division-part data (all of them make up the content data corresponding to the request-content ID selected at step SP104) from different content provision server 6A through 6N that can provide the content data. The client terminal 2 subsequently proceeds to next step SP109.

In FIG. 25 through FIG. 27, the processes of the content provision servers 6A through 6N are collectively described by one line. In fact, each content provision server 6A through 6N performs those processes at it's own pace, which is determined by its processing ability or processing load.

When the third division-part-request method has been selected, the client terminal 2 starts to measure the period of reception-completion time after transmitting the division-part-request data to the content provision servers 6A through 6N. The client terminal 2 subsequently proceeds to step SP109.

By the way, negative result at step SP106 means that the division-part-specification information and reception-end-position information corresponding to the request-content ID selected at step SP104 are left in the hard disk as processing-status information. That is to say, this negative result means that the client terminal 2 stopped the acquisition process halfway while requesting the content data corresponding to the request-content ID. In this case, the client terminal 2 proceeds to step SP110.

The client terminal 2 at step SP110 generates a division-part-request data based on the division-part-specification information left in the hard disk. This division-part-request data re-requests the division-part data that the client terminal 2 previously failed to request from the content provision server 6A through 6N due to the acquisition process stopped halfway. The client terminal 2 also generates a reception-left-part-request data based on the reception-end-position information left with the division-part-specification information in the hard disk. This reception-left-part-request data requests the rest of division part data (reception-left-part data) that the client terminal 2 could not receive completely because of the previous acquisition process stopped halfway. The client terminal 2 subsequently proceeds to next step SP111, after generating the division-part-request data and the reception-left-part-request data.

However, in the case in which: the second division-part-request method is selected; the chosen-address number is less than the notified-address number; and the total number of the division-part data and reception-left-part data to be requested is less than the chosen-address number, the client terminal 2 performs the process of step SP74 (illustrated by FIG. 16) after generating the division-part-request data and the reception-left-part-request data. And then the client terminal 2 proceeds to step SP111.

The client terminal 2 at step SP111 transmits each division-part-request data and each reception-left-part-request data to different content provision server 6A through 6N (that can provide the content data corresponding to the request-content ID selected at step SP104), such that it requests each division-part data and each reception-left-part data from different content provision server 6A through 6N. And then the client terminal 2 proceeds to next step SP109.

By the way, in the case in which the third division-part-request method is selected, the client terminal 2 starts to measure the period of reception-completion time after transmitting the division-part-request data and the reception-left-part-request data to the content provision servers 6A through 6N, and then proceeds to step SP109.

In this manner, the client terminal 2 requests the division-part data and the reception-left-part data from each content provision server 6A through 6N. In response to that, each content provision server 6A through 6N at step SP141 transmits the division-part data and the reception-left-part data. The client terminal 2 at step SP109 starts to receive these division-part data and reception-left-part data. And then, in response to the selected division-part-request method (i.e., the first, second or third division-part-request method), the client terminal 2 performs one of the following processes: the processes of step SP10, SP11, SP12, SP13 and SP14 illustrated by FIG. 12 and FIG. 16; the processes of step SP10, SP11, SP12, SP76, SP13 and SP14 illustrated by FIG. 17; or the processes of step SP10, SP11, SP82, SP83, SP84, SP85, SP86, SP12, SP13 and SP14 illustrated by FIG. 22. And then, the client terminal 2 restores the content data from the division-part data acquired by those processes, and then proceeds to next step SP15.

After that, the client terminal 2 sequentially performs the processes of step SP15, SP16, SP17, SP18, SP19, SP20 and SP21 in the same way as the stopped acquisition process. In this manner, the client terminal 2 sequentially acquires content data (music) requested by the user, and the content-attribute files 47 transmitted at step SP151 from the attribute information provision server 7.

By the way, negative result at step SP105 means that the request-content ID selected at step SP104 is being stored in the hard disk as stored-content ID. That is to say, this negative result means that the client terminal 2 has already acquired the content data corresponding to the request-content ID from the content provision servers 6A through 6N before it stopped the previous acquisition process. In this case, the client terminal 2 proceeds to next step SP112.

The client terminal 2 at step SP112 confirms whether or not the file name of the content-attribute file 47 corresponding to the request-content ID selected at step SP104 is not being stored in the hard disk as process-status information.

Affirmative result at step SP112 means that the file name of the content-attribute file 47 corresponding to the request-content ID selected at step SP104 is not being stored in the hard disk as process-status information. That is to say, this affirmative result means that the client terminal 2 did not acquire the content-attribute file 47 corresponding to the request-content ID from the attribute information provision server 7 before stopping the previous acquisition process. In this case, the client terminal 2 proceeds to step SP16. In this manner, the client terminal 2 this time does not acquire the content data corresponding to the request-content ID, while it acquires from the attribute information provision server 7 the content-attribute file 47 corresponding to the request-content ID.

Negative result at step SP112 means that the file name of the content-attribute file 47 corresponding to the request-content ID selected at step SP104 is being stored in the hard disk as process-status information. That is to say, this negative result means that the client terminal 2 had already acquired the content-attribute file 47 along with the content data corresponding to the request-content ID before stopping the previous acquisition process. In this case, the client terminal 2 proceeds to step SP113.

The client terminal 2 at step SP113 confirms whether or not the registration information corresponding to the request-content ID selected at step SP104 is not being stored in the acquisition-information database in the hard disk.

Affirmative result at step SP113 means that the previous acquisition process was stopped halfway before the registration information corresponding to the request-content ID selected at step SP104 was registered in the acquisition-information database, while the previous acquisition process acquired the content data and content-attribute file 47 corresponding to the request-content ID selected at step SP104. In this case, the client terminal 2 proceeds to step SP18. In this manner, the client terminal 2 registers the registration information in the acquisition-information database.

Negative result at step SP113 means that the registration information corresponding to the request-content ID selected at step SP104 had already been registered in the acquisition-information database before the client terminal 2 stopped the previous acquisition process. In this case, the client terminal 2 proceeds to step SP114.

The client terminal 2 at step SP114 confirms whether or not the registration-completion information (this information means that the registration information corresponding to the request-content ID selected at step SP104 has been already registered) is not being stored in the hard disk as process-status information.

Affirmative result at step SP114 means that the previous acquisition process was stopped halfway before the registration-completion information (this information means that the registration information corresponding to the request-content ID selected at step SP104 has been already registered) was stored in the hard disk as process-status information. In this case, the client terminal 2 proceeds to step SP19. And then the client terminal 2 temporarily stores the registration-completion information in the hard disk as process-status information.

Negative result at step SP114 means that the registration-completion information had already been stored in the hard disk as process-status information before the client terminal 2 stopped the previous acquisition process halfway (besides, the registration information corresponding to the request-content ID selected at step SP104 was already registered before storing of the registration-completion information). In this case, the client terminal 2 proceeds to step SP20. The client terminal 2 then confirms whether or not there are other content data and content-attribute files 47 that the client terminal 2 will acquire based on the acquisition-utilization file 25 re-acquired from the acquisition utilization provision server 5.

In this manner, the acquisition process restarted by the client terminal 2 does not acquire the same part of content data and content-attribute files 47 again, which the previous acquisition process had already acquired (the content data and content-attribute files 47 correspond to the purchase-requested music). Accordingly, the client terminal 2 can efficiently acquire the content data and the content-attribute files 47 (the content data and content-attribute files 47 correspond to the purchase-requested music).

In the above-noted normal music purchase process and restart music purchase process (illustrated by FIG. 11 through FIG. 27) according to the present embodiment, the client terminal 2 requests from the plurality of content provision servers 6A through 6N each division-part data that makes up the content data. However, in the case in which only one of the content provision servers 6A through 6N can provide the content data, the client terminal 2 may request whole the content data from it.

Figure 28:
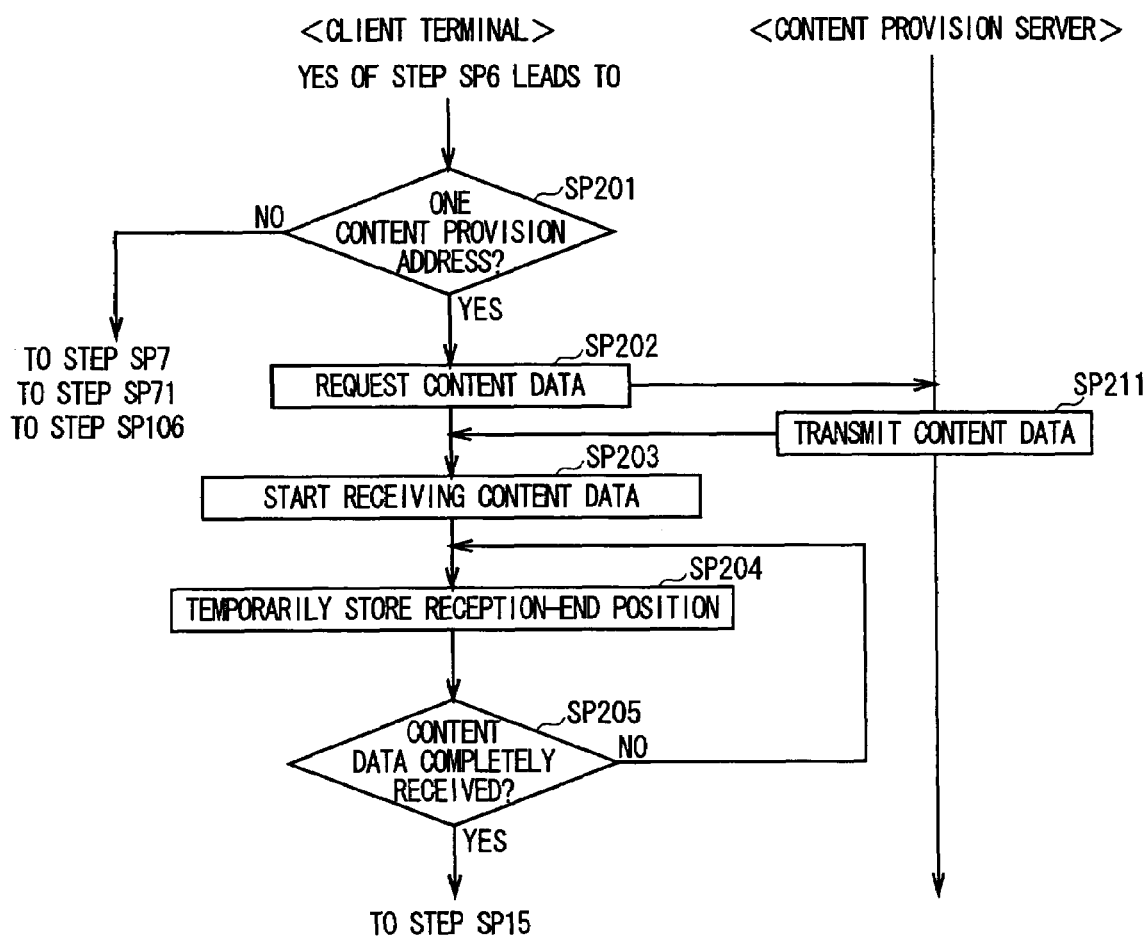
FIG. 28 is a sequence chart showing a music purchase process when the content data is acquired without being divided.

In this case, as shown in FIG. 28, when the client terminal 2 performing the above-noted normal music purchase process or restart music purchase process determines affirmatively at step SP6, it proceeds to step SP201.

The client terminal 2 at step SP201 retrieves from the acquisition-utilization file 25 the content-provision address corresponding to the request-content ID selected at step SP5 or SP104. The client terminal 2 then confirms whether or not it has retrieved only one content-provision address.

Negative result at step SP201 means that there is a plurality of content provision servers 6A through 6N capable of providing the content data corresponding to the request-content ID selected at step SP5 or SP104. In this case, the client terminal 2 proceeds to step SP7, SP71 or SP106 in the above-noted acquisition process.

Affirmative result at step SP201 means that there is only one content provision server (one of the content provision servers 6A through 6N) capable of providing the content data corresponding to the request-content ID selected at step SP5 or SP104. In this case, the client terminal 2 proceeds to next step SP202.

The client terminal 2 at step SP202 selects from the acquisition-utilization file 25 only one content-provision address corresponding to the request-content ID selected at step SP5 or SP104. The client terminal 2 then accesses the content-provision homepage corresponding to the selected content-provision address. While being connected to the content-provision homepage, the client terminal 2 transmits a content-request data including the request-content ID to the content provision server (one of the content provision servers 6A through 6N). And then the client terminal 2 proceeds to next step SP203.

In response to the request from the client terminal 2, the content provision server 6A for example transmits to the client terminal 2 the content data corresponding to the request-content ID at step SP211.

Then, the client terminal 2 at step SP203 starts to receive the content data from the content provision server 6A, and proceeds to next step SP204.

The client terminal 2 at step SP204 recognizes the end part of the content data that it started to receive at step SP203 as reception-end-position information. The client terminal 2 then recognizes the reception-end-position information as process-status information, which shows status of the reception. And then the client terminal 2 associates the request-content ID temporarily stored as process-status information at step SP5 or SP104, with the reception-end-position information recognized this time as process-status information, and temporarily stores them in the hard disk. Then the client terminal 2 proceeds to next step SP205.

The client terminal 2 at step SP205 determines whether or not it has received the content data, based on the reception-end-position information of the content data that it started to receive at step SP203, and the corresponding data-size information notified by the acquisition-utilization file 25.

Negative result at step SP205 means that the reception-end-position (of the content data that the client terminal 2 started to receive at step SP203) has not reached the end part of the content data (this end part is identified by the data-size information). That is to say, this negative result means that the client terminal 2 has not received yet the content data. In this case, the client terminal 2 returns to step SP204.

The client terminal 2 then repeats the processes of step SP204 and step SP205 until it determines affirmatively at step SP205. In the meantime, the client terminal 2 sequentially records the change of the reception-end-position (of the content data that it started to receive at step SP203) as the change of reception status.

Affirmative result at step SP205 means that the reception-end-position (of the content data that the client terminal 2 started to receive at step SP203) has reached the end part of the content data. That is to say, this affirmative result means that the client terminal 2 has received the content data. In this case, the client terminal 2 deletes the reception-end-position information recorded at step SP204, and proceeds to step SP15 in the above-noted acquisition process.

In this manner, the client terminal 2 can acquire whole the content data (the acquisition-target content data) from one of the content provision servers 6A through 6N, instead of acquiring each part of the content data (as a division-part data) separately from different content provision server 6A through 6N.

As described above, even if the client terminal 2 receives content data from only one of the content provision servers 6A through 6N, the client terminal 2 sequentially records the reception-end position that changes with time while receiving it. When the client terminal 2 stops to receive the content data halfway, it leaves the reception-end position as process-status information. And when the client terminal 2 restarts the acquisition process, it requests from the content provision server (one of the content provision servers 6A through 6N) the rest of content data identified by the left reception-end position, and receives it. After receiving the rest of it, the client terminal 2 restores the content data from the part of content data (the top-part of content data) acquired by the previous acquisition process, and the part of content data (the end-part of content data) acquired by the restarted acquisition process.

In this manner, in the case in which: the client terminal 2 requests whole the content data from only one of the content provision servers 6A through 6N; and it stops to receive the content data halfway, it does not receive the same part of the content data again when it restarts the acquisition process. Accordingly, the client terminal 2 can efficiently acquire the content data, even if it uses only one of the content provision servers 6A through 6N.

(3) Other Procedures of Music Purchase Process

With reference to sequence charts shown in FIG. 29 through FIG. 32, the other procedures of music purchase process, different from the above-noted music purchase processes, will be described.

The other procedures include: a normal music purchase process, which is performed when the client terminal 2 runs normally; and a retry music purchase process, which is retried when the client terminal 2 restarts the stopped acquisition process. The normal music purchase process and the retry music purchase process will be described one by one.

By the way, in the normal music purchase process and the retry music purchase process described below, a user interface 310 is equivalent to the XML browser 136 (illustrated by FIG. 10 as program modules). Middleware 311 is equivalent to the HTTP message program 130, the communicator program 131, the copyright protection information management module 133, the music purchase/reproduction module 135, the authentication library 138A, the hard disk content controller 137, the content data access module 140 and the database access module 139. The CPU 100 of the client terminal 2 follows the user interface 310 and the middleware 311 to perform acquisition process in the normal music purchase process or re-acquisition process in the retry music purchase process.

As a matter of convenience, in the normal music purchase process and the retry music purchase process described below, the user interface 310 and the middleware 311 will be described as if hardware (circuit blocks).

And in the normal music purchase process and the retry music purchase process described below, as a matter of convenience, there is only one content provision server (one of the content provision servers 6A through 6N). That is to say, the client terminal 2 acquires whole the content data from for example the content provision server 6A.

In addition, the control section 20 of the acquisition utilization information provision server 5 may generate the acquisition-utilization information when a user requests to purchase music, instead of previously memorizing it.

Also, the control section 30 of the content provision server 6A may previously memorize an address which the client terminal 2 uses to access the acquisition-target content data (this address will be referred to as a "content-acquisition address"), instead of publishing the content-provision homepages that are utilized for providing content data. That allows the client terminal 2 to acquire the content data. In this case, the control section 30 associates the content data with the corresponding content-acquisition addresses. Therefore, the client terminal 2 can acquire the content data without transmitting the content IDs.

In addition, the control section 40 of the attribute information provision server 7 may previously memorize an address which the client terminal 2 uses to access the acquisition-target content-attribute file 47 (this address will be referred to as an "attribute-file-acquisition address"), instead of publishing the attribute-file-provision homepages which are utilized for providing the content-attribute files 47. That allows the client terminal 2 to acquire the content-attribute files 47.

Accordingly, in the normal music purchase process and the retry music purchase process described below, the control section 20 of the acquisition utilization information provision server 5 generates the acquisition-utilization information when a user requests to purchase music. In addition, the content provision server 6A and the attribute information provision server 7 provide content data and content-attribute files 47, without using the content-provision homepages and the attribute-file-provision homepages.

In this case, the client terminal 2 can acquire content data from the content provision server 6A without transmitting content IDs. Therefore, the control section 20 of the acquisition utilization information provision server 5 generates an acquisition-utilization file 315 without using the content IDs. As shown in FIG. 33, this acquisition-utilization file 315 includes: content-acquisition addresses, which are utilized for acquiring the content data (music) requested by the user; and attribute-file-acquisition addresses, which are utilized for acquiring the corresponding content-attribute files 47. These two items of each content data (each piece of music) are associated with one another in the acquisition-utilization file 315.

The control section 30 of the content provision server 6A delivers a plurality of content data (downloadable data) in one of the following manners: an album delivery manner, in which they are delivered in album unit; and a single delivery manner, in which they are delivered in single unit. This allows a user to choose to purchase content data (one or more piece of music) in single or album unit.

In addition, in the normal music purchase process and the retry music purchase process described below, when a user purchases music, he/she is charged. Therefore, in the normal music purchase process and the retry music purchase process described below, there is a fee-charging server 320, besides the client terminal 2, the portal server 4, the acquisition utilization information provision server 5, the content provision server 6A and the attribute information provision server 7.

(3-1) Normal Music Purchase Process

Figure 29:
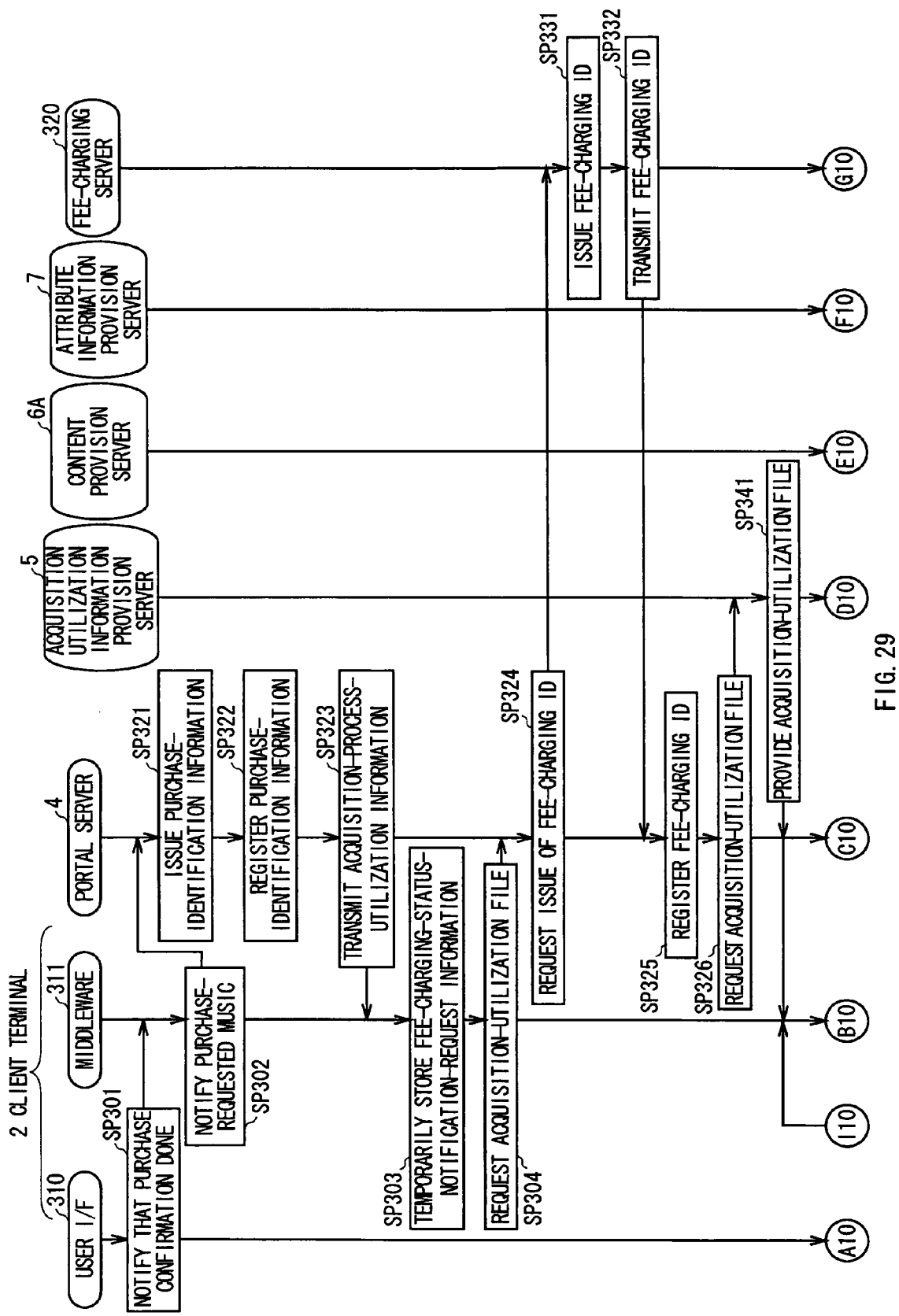
FIG. 29 is a sequence chart showing a normal music purchase process (1).
Figure 30:
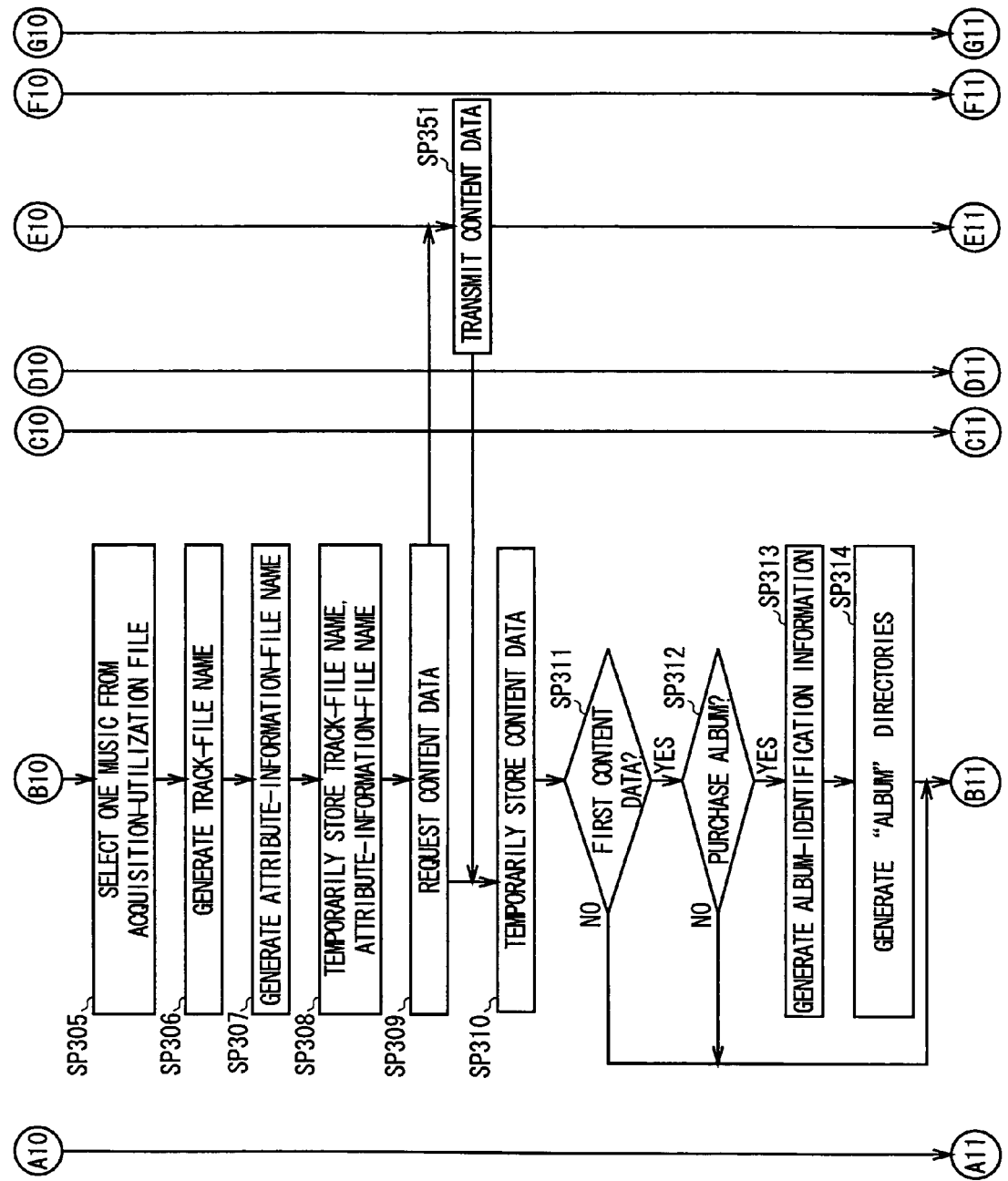
FIG. 30 is a sequence chart showing a normal music purchase process (2).
Figure 31:
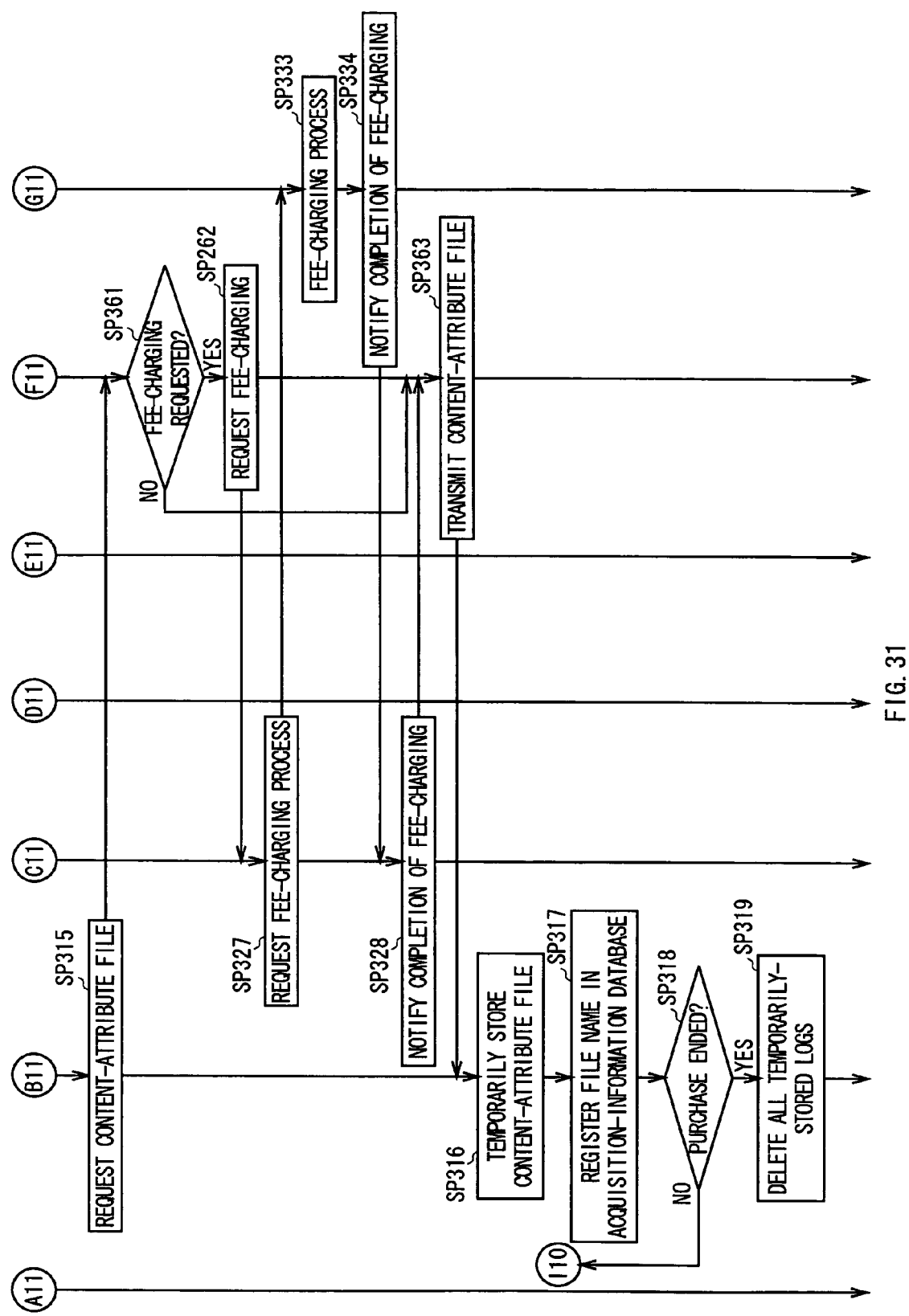
FIG. 31 is a sequence chart showing a normal music purchase process (3).

As shown in FIG. 29 through 31, the user interface 310 of the client terminal 2 starts an acquisition process of the normal music purchase process. That is to say, after a user selects one or more plurality of pieces of music in single or album unit which he/she wants to purchase, the user interface 310 of the client terminal 2 remains at step SP301 until the user checks what he/she wants to purchase. After the user checks what he/she wants to purchase, the user interface 310 notifies the middleware 311 that the user's check is done.

The middleware 311 of the client terminal 2 at step SP302 generates a purchase-music-notification data that includes: a content ID corresponding to content data (music) requested by the user; a user ID; and password. The middleware 311 then transmits the purchase-music-notification data via the communication processing section 114 and the network interface 115 to the portal server 4.

The control section 10 of the portal server 4 at step SP321 receives the purchase-music-notification data from the client terminal 2 via the data communication processing section 14. After receiving the purchase-music-notification data, the control section 10 issues purchase-identification information. The generated purchase-identification information identifies a music purchase process executed for the user who requests to purchase. This purchase-identification information for example is a unique sequential serial number. The control section 10 subsequently proceeds to next step SP322.

The control section 10 at step SP322 retrieves from the user database 13 the personal information corresponding to the user who requests to purchase music, based on the user ID and password included in the purchase-music-notification data. The control section 10 then associates the following items with one another; the retrieved personal information; the purchase-identification information; and the content ID, which corresponds to the purchase-requested content data (music) and is included in the purchase-music-notification data. The control section 10 then registers them, and proceeds to next step SP323.

The control section 10 at step SP323 generates acquisition-process-utilization information. The generated acquisition-process-utilization information is utilized for the acquisition process, which is executed for the user who requests to purchase music. The control section 10 transmits this acquisition-process-utilization information via the data communication processing section 14 to the client terminal 2.

This acquisition-process-utilization information includes: acquisition-utilization-file-request information, which is utilized to acquire the acquisition-utilization file 315; fee-charging-status-notification-request information, which is utilized to request notification of the fee-charging process status of the user after the client terminal 2 restarts a stopped acquisition process; and the like.

And the acquisition-utilization-file-request information includes a file-acquisition address and the like. This file-acquisition address is an address on the network 3. The client terminal 2 uses this file-acquisition address to access the acquisition-utilization file 315. Therefore the client terminal 2 can acquire the acquisition-utilization file 315.

The fee-charging-status-notification-request information includes; a retry address, where the client terminal 2 accesses to request the notification of the user's fee-charging status when retrying to acquire data (content data and content-attribute files 47) after restarting a stopped acquisition process; the purchase-identification information issued at step SP321, which the client terminal 2 gives to the communicating party (i.e., the portal server 4) when accessing the retry address; post data, which the client terminal 2 gives to the communicating party (i.e., the portal server 4) when accessing the retry address; a request code showing a type of the request, which the client terminal 2 gives to the communicating party (i.e., the portal server 4) when accessing the retry address; and the like.

The middleware 311 of the client terminal 2 at step SP303 receives the acquisition-process-utilization information from the portal server 4 via the network interface 115 and the communication processing section 114. The middleware 311 then obtains the fee-charging-status-notification-request information from the acquisition-process-utilization information. The middleware 311 subsequently temporarily stores for example in the hard disk of the hard disk drive 104 this fee-charging-status-notification-request information as first process-status information. This first process-status information, showing the status of this time acquisition process, will be referred to as a first log. In this case, this first process-status information indicates the start of the acquisition process. And then the middleware 311 proceeds to next step SP304.

The middleware 311 at step SP304 accesses the file-acquisition address (included in the acquisition-utilization-file-request information obtained from the acquisition-process-utilization information) to request the acquisition-utilization file 315 from the portal server 4.

In response to the request for acquisition-utilization file 315 from the client terminal 2, the control section 10 of the portal server 4 at step SP324 transmits via the data communication processing section 14 to the fee-charging server 320 a fee-charging-ID-issue-request data that requests to issue a fee-charging ID. This fee-charging ID identifies a fee-charging process executed for the user who requests to purchase music.

A control section of the fee-charging server 320 at step SP331 receives the fee-charging-ID-issue-request data from the portal server 4 via a data communication processing section. Based on the fee-charging-ID-issue-request data, the control section issues a fee-charging ID, and then proceeds to next step SP332.

The control section of the fee-charging server 320 at step SP332 transmits via the data communication processing section to the portal server 4 a fee-charging-ID-notification data showing the fee-charging ID.

The control section 10 of the portal server 4 at step SP325 receives the fee-charging-ID-notification data from the fee-charging server 320 via the data communication processing section 14. The control section 10 then obtains the fee-charging ID from the fee-charging-ID-notification data, and additionally registers the fee-charging ID in the user database 13 such that this fee-charging ID is associated with the purchase-identification information (which was already registered at step SP322). The control section 10 also registers fee-charging-status-notification information in the user database 13 such that this fee-charging-status-notification information is associated with the purchase-identification information (which was already registered at step SP322). At this time, this fee-charging-status-notification information shows that the user who requests to purchase music has not been charged yet for the music. The control section 10 subsequently proceeds to next step SP326.

The control section 10 at step SP326 generates a file-request data. The generated file-request data requests the acquisition-utilization file 315 (including the content ID corresponding to content data (music) requested by the user), which is utilized by the user's client terminal 2 to acquire content data and content-attribute files 47. The control section 10 then transmits this file-request data to the acquisition utilization information provision server 5 via the data communication processing section 14.

The control section 20 of the acquisition utilization information provision server 5 at step SP341 receives the file-request data from the portal server 4 via the data communication processing section 24. Based on the file-request data, the control section 20 issues for example content-acquisition addresses and attribute-file-acquisition addresses. The control section 20 then generates the acquisition-utilization file 315 where the content-acquisition addresses and the attribute-file-acquisition addresses are disposed in a certain order such that the two kinds of addresses of each song (music) is associated with one another.

In this manner, the control section 20 of the acquisition utilization information provision server 5 issues the content-acquisition addresses and the attribute-file-acquisition addresses at step SP341. However, this embodiment is not limited to this. For example, the content provision server 6A could issue the content-acquisition addresses. The attribute information provision server 7 could issue the attribute-file-acquisition addresses. And then the control section 20 of the acquisition utilization information provision server 5 may generates the acquisition-utilization file 315 based on them.

After that, the control section 20 transmits the acquisition-utilization file 315 to the client terminal 2 via the data communication processing section 24 and the portal server 4. In this case, the control section 20 of the acquisition utilization information provision server 5 for example shares with the content provision server 6A and the attribute information provision server 7 the following information as data-provision-utilization information; the contents of the acquisition-utilization file 315; the content ID (provided from the portal server 4) corresponding to the content data (music) requested by the user; the purchase-identification information corresponding to the user; and the like.

The middleware 311 of the client terminal 2 at step SP305 receives the acquisition-utilization file 315 (transmitted from the acquisition utilization information provision server 5 via the portal server 4) via the network interface 115 and the communication processing section 114, and temporarily stores the received acquisition-utilization file 315 in for example the RAM 103.

The middleware 311 then follows the order of the content-acquisition addresses disposed in the acquisition-utilization file 315 to select one of them. Then the middleware 311 proceeds to next step SP306.

The middleware 311 at step SP306 generates a track-file name to identify a content data which will be downloaded by accessing the selected content-acquisition address. This track-file name is utilized when the content data is stored in the hard disk as "track" file. The middleware 311 subsequently proceeds to next step SP307.

The middleware 311 at step SP307 generates an attribute-information-file name to identify the content-attribute information included in the content-attribute file 47 which will be downloaded with the content data (which corresponds to the content-acquisition address selected at step SP306). This attribute-information-file name is utilized when the content-attribute information is stored in the hard disk as an attribute-information file. Then the middleware 311 proceeds to next step SP308.

As shown in FIG. 24, the middleware 311 at step SP308 for example temporarily stores in the hard disk of the hard disk drive 104 the track-file name (generated at step SP306) and the attribute-information-file name (generated at step SP307) as second process-status information. This second process-status information, showing the status of the acquisition process, will be referred to as a second log. The middleware 311 subsequently proceeds to next step SP309.

The middleware 311 at step SP309 accesses the content-acquisition address (which was selected at step SP305 from the acquisition-utilization file 315) to request the download of content data from the content provision server 6A.

In this case, by sharing the data-provision-utilization information with the acquisition utilization information provision server 5, the control section 30 of the content provision server 6A can recognize that the content-acquisition address (which is described in the acquisition-utilization file 315 provided to the user's client terminal 2) has been associated with the content ID corresponding to the content data (music) requested by the user.

Therefore, in response to the request for the download of content data from the client terminal 2, the control section 30 of the content provision server 6A at step SP351 retrieves the content data that corresponds to the content ID associated with the content-acquisition address where the client terminal 2 accesses this time, from among content data stored in the content database 33. The control section 30 then transmits the retrieved content data to the client terminal 2 via the data communication processing section 34.

The middleware 311 of the client terminal 2 at step SP310 receives the content data from the content provision server 6A via the network interface 115 and the communication processing section 114, and temporarily stores it in the hard disk as a track file which has the track-file name generated at above-noted step SP306. Then the middleware 311 proceeds to next step SP311.

By the way, the content data, provided from the content provision server 6A, for example includes purchase-manner-notification information as attribute information of the content data in its header portion. This purchase-manner-notification information shows whether the data is purchased in single unit or album unit.

Accordingly, the middleware 311 at step SP311 checks whether or not the content data temporarily stored in the hard disk is the first one that was downloaded by this acquisition process from the content provision server 6A.

Affirmative result at step SP311 means that this content data temporarily stored in the hard disk is the first one that was downloaded by this acquisition process from the content provision server 6A (regardless of whether the content data (music) is requested by the user in single unit or album unit). In this case, the middleware 311 proceeds to step SP312.

The middleware 311 at step SP312 confirms whether or not this content data temporarily stored in the hard disk is requested in album unit, based on the purchase-manner-notification information included in the content data.

Affirmative result at step SP312 means that a plurality of content data (a plurality of pieces of music) is requested in album unit by the user this time, which is to say a plurality of pieces of music stored in an album is collectively requested. In this case, the middleware 311 proceeds to step SP313.

The middleware 311 at step SP313 generates album-identification information that identifies: the "track" file, which corresponds to the content data currently acquired (this acquisition is executed in response to the request of requesting music in album unit); and the attribute-information file, which corresponds to the content-attribute file 47 that makes the content data available. This album-identification information also identifies an "album" directory managing the "track" file and the attribute-information file. This album-identification information for example is a path.

This album-identification information is generated such that it identifies only the content data and content-attribute files 47 acquired this time by the client terminal 2. That is to say, even if the client terminal 2 has already obtained (ripped) the same content data from for example CDs and stores it in the hard disk, this album-identification information just identifies the content data acquired from the content provision server 6A, not the one obtained from CDs.

As shown in FIG. 34, the middleware 311 then temporarily stores for example in the hard disk of the hard disk drive 104 the album-identification information as third process-status information. This third process-status information, showing the status of the acquisition process, will be referred to as a third log. The middleware 311 subsequently proceeds to next step SP314.

The middleware 311 at step SP314 generates in the hard disk a new "album" directory identified by the album-identification information generated at step SP313. The middleware 311 subsequently proceeds to next step SP315.

By the way, negative result at above-noted step SP311 means that the content data temporarily stored in the hard disk is not the first one that was downloaded by this acquisition process from the content provision server 6A (regardless of whether the content data (music) is requested by the user in single unit or album unit). That is to say, this negative result means that this content is second or subsequent one downloaded from the content provision server 6A. In this case, the middleware 311 proceeds to step SP315.

And, negative result at above-noted step SP312 means that one or more content data (one or more pieces of music) is this time requested by the user in single unit.

By the way, when a plurality of content data (plurality of pieces of music) is requested in album unit, the middleware 311 generates a new "album" directory in the hard disk in the same way as above-noted step SP313 and step SP314. However, the hard disk has already had directories to manage content data (music) in single unit and content-attribute files 47 that make these content data available.

By the way, the middleware 311 utilizes some of the "album" directories (that make up the above-noted hierarchical structure shown in FIG. 9) to manage the plurality of content data (music) acquired in a single unit and the content-attribute files 47 in lump.

Therefore, when negative result is obtained at step SP312 as one or more content data (one or more pieces of music) are requested in single unit by the user, the middleware 311 proceeds to step SP315 without generating any directories for managing these content data and corresponding content-attribute files 47.

The middleware 311 at step SP315 retrieves from the acquisition-utilization file 315 the attribute-file-acquisition address corresponding to the content-acquisition address selected at above-noted step SP305. The middleware 311 then accesses the retrieved attribute-file-acquisition address to request the download of content-attribute file 47 from the attribute information provision server 7.

In this case, the attribute information provision server 7 has memorized a list that lists: content IDs, which corresponds to content data provided to the client terminal 2; the attribute-file-acquisition addresses, which allows the client terminal 2 to acquire the content-attribute file 47 that make the content data available; and the like, because it shares the data-provision information with the acquisition utilization information provision server 5 and the content provision server 6A.

In addition, this list includes the purchase-identification information identifying the music-purchase process executed for the user who is about to acquire the content data and the content-attribute files 47. In this list, the content IDs, the attribute-file-acquisition addresses and the like are disposed in the order that the client terminal 2 downloads, and these items of each content data (each piece of music) is associated with one another.

And in the list that lists one or more attribute-file-acquisition addresses, only the top attribute-file-acquisition address is associated with a flag. This flag means that only when the top attribute-file-acquisition address is accessed by the client terminal 2 the user is charged. By the way, this top attribute-file-acquisition address is accessed first, when the client terminal 2 starts the acquisition process.

That is to say, this normal music purchase process charges the user a fee for all purchase-requested content data (music), when the first content-attribute file 47 is requested by the user's client terminal 2 (regardless of whether the user requests content data (music) in single unit or album unit).

Accordingly, when the client terminal 2 requests the download of content-attribute file 47, the control section 40 of the attribute information provision server 7 at step SP361 determines whether or not it should charge the user of the client terminal 2, based on that list.

Affirmative result at step SP361 means that the attribute-file-acquisition address currently accessed by the client terminal 2 is the one to acquire the first content-attribute file 47 in this normal music purchase process. In this case, the control section 40 proceeds to step SP362.

The control section 40 at step SP362 transmits a fee-charging-request data to the portal server 4 via the data communication processing section 44. This fee-charging-request data includes the purchase-identification information described in the list, and requests to charge the user of client terminal 2 (who now requests the download of content-attribute file 47) a fee for the purchase-requested music.

The control section 10 of the portal server 4 at step SP327 receives the fee-charging-request data from the attribute information provision server 7 via the data communication processing section 14. And then the control section 10 retrieves from the user database 13 the personal information of the user (who now requests to purchase music), based on the purchase-identification information stored in the fee-charging-request data.

The control section 10 then generates a fee-charging-process-execution-request data to request the fee-charging server 320 to perform a fee-charging process. This fee-charging-process-execution-request data includes the fee-charging ID (included in the retrieved personal information) corresponding to the user who is currently requesting to purchase music, and content IDs corresponding to all the purchase-requested content data (music). The control section 10 then transmits the fee-charging-process-execution-request data to the fee-charging server 320 via the data communication processing section 14.

The control section of the fee-charging server 320 at step SP333 receives the fee-charging-process-execution-request data from the portal server 4 via the data communication processing section. The control section identifies various kinds of information such as fee-charging information to charge the user who this time requests to purchase music, based on the fee-charging ID and content ID stored in the fee-charging-process-execution-request data. The control section then performs fee-charging process for the user based on the identified information such as fee-charging information. After the fee-charging process is done, the control section proceeds to next step SP334 to generate a fee-charging-completion-notification data, which includes the fee-charging ID and is utilized to notify that this fee-charging process is done. The control section subsequently transmits the fee-charging-completion-notification data to the portal server 4 via the data communication processing section.

The control section 10 of the portal server 4 at step SP328 receives the fee-charging-completion-notification data from the fee-charging server 320 via the data communication processing section 14. Based on the fee-charging ID stored in the fee-charging-completion-notification data, the control section 10 retrieves from the user database 13 the purchase-identification information corresponding to the user. The control section 10 then detects the fee-charging-status-notification information associated with this purchase-identification information, this fee-charging-status-notification information showing that the user has not been charged yet. The control section 10 subsequently updates this fee-charging-status-notification information such that it shows that the user has been charged, in dependence upon the fee-charging-completion-notification data. The control section 10 then generates a fee-charging-completion data showing that the fee-charging process for the user is done, and transmits it to the attribute information provision server 7 via the data communication processing section 14.

The control section 40 of the attribute information provision server 7 at step SP363 receives the fee-charging-completion data from the portal server 4 via the data communication processing section 44. In response to that, the control section 40 recognizes that the fee-charging process for the use is done. Then, the control section 40 generates the content-attribute file 47, based on the content ID associated with the attribute-file-acquisition address accessed by the client terminal 2 at step SP315, and the like. The control section 40 then transmits this content-attribute file 47 to the client terminal 2 via the data communication processing section 44.

By the way, negative result at above-noted step SP361 means that the attribute-file-acquisition address currently accessed by the client terminal 2 is the one to acquire the second or subsequent content-attribute file 47 in this normal music purchase process. That is to say, this negative result means that the fee-charging process for the user is already done. In this case, the control section 40 proceeds to step SP363.

The middleware 311 of the client terminal 2 at step SP316 receives the content-attribute file 47 from the attribute information provision server 7 via the network interface 115 and the communication processing section 114. And the middleware 311 temporarily stores in the hard disk the content-attribute information stored in this content-attribute file 47 as the attribute-information file that has the attribute-information-file name generated by above-noted step SP307. The middleware 311 subsequently proceeds to next step SP317.

The middleware 311 at step SP317 registers the album-identification information generated at above-noted step SP313, in the acquisition-information database disposed in the hard disk, when the user has requested to purchase music in album unit.

Also, the middleware 311 registers the following items in the acquisition-information database such that they belong to the album-identification information registered in this acquisition-information database: track-file names, which correspond to content data downloaded at above-noted step SP310; and attribute-information-file names, which correspond to the content-attribute files 47 downloaded at above-noted step SP316.

By the way, after the album-identification information is once registered in the acquisition-information database, the middleware 311 additionally registers only the track-file name and the attribute-information-file name in the acquisition-information database such that they belong to the album-identification information when it downloads the content data and the content-attribute files 47 again.

By contrast, when the user has requested to purchase music in single unit, the middleware 311 at step SP317 registers the following items in the acquisition-information database such that they belong to single-identification information registered in this acquisition-information database: track-file names, which correspond to content data downloaded at above-noted step SP310; and attribute-information-file names, which correspond to the content-attribute files 47 downloaded at above-noted step SP316. In this case, this single-identification information is unique to a directory, which has already been created in the acquisition-information database to manage single music (song).

In this manner, the middleware 311 manages the "track" files (which correspond to the content data downloaded from the content provision server 6A) and the attribute-information files (which correspond to the content-attribute files 47 downloaded from the attribute information provision server 7), using "album" directories (these are like the directory structure shown in FIG. 9) or directories dedicated to single music. As a result, these temporarily-stored content data and content-attribute files 47 are formally (permanently) stored.

After that, the middleware 311 identifies the content data downloaded from the content provision server 6A and the content-attribute files 47 downloaded from the attribute information provision server 7, using the album-identification information or the single-identification information. And then the middleware 311 makes the content data available, using corresponding content-attribute files 47. The middleware 311 subsequently proceeds to next step SP318.

The middleware 311 at step SP318 confirms whether or not it has downloaded all the content data and content-attribute files 47 requested this time. That is to say, the middleware 311 confirms whether or not it has purchased all the purchase-requested music.

Negative result at step SP318 means that it has not downloaded yet all the content data and content-attribute files 47 requested this time (i.e., the user has requested to purchase a plurality of pieces of music this time). In this case, the middleware 311 returns to step SP305. The middleware 311 then repeats the processes of step SP305 through SP318 until affirmative result is obtained at step SP318. In this manner, based on the contents of the acquisition-utilization file 315, the middleware 311 downloads all the content data and corresponding content-attribute files 47 that the user requested, from the content provision server 6A and the attribute information provision server 7.

Affirmative result at step SP318 means that it has already downloaded all the content data and content-attribute files 47 requested this time. In addition, it has already registered them in the acquisition-information database. In this case, the middleware 311 proceeds to step SP319.

The middleware 311 at step SP319 deletes the first, second and third log from the hard disk (they were temporarily stored in the hard disk by this acquisition process, for example), and ends the acquisition process.

(3-2) Retry Music Purchase Process

When the client terminal 2 is disconnected from the network 3 while performing the above-noted acquisition process, it stops this acquisition process halfway. The disconnection happens for example when the client terminal 2 is unplugged or its network cable is unplugged due to the user's carelessness.

Figure 32:
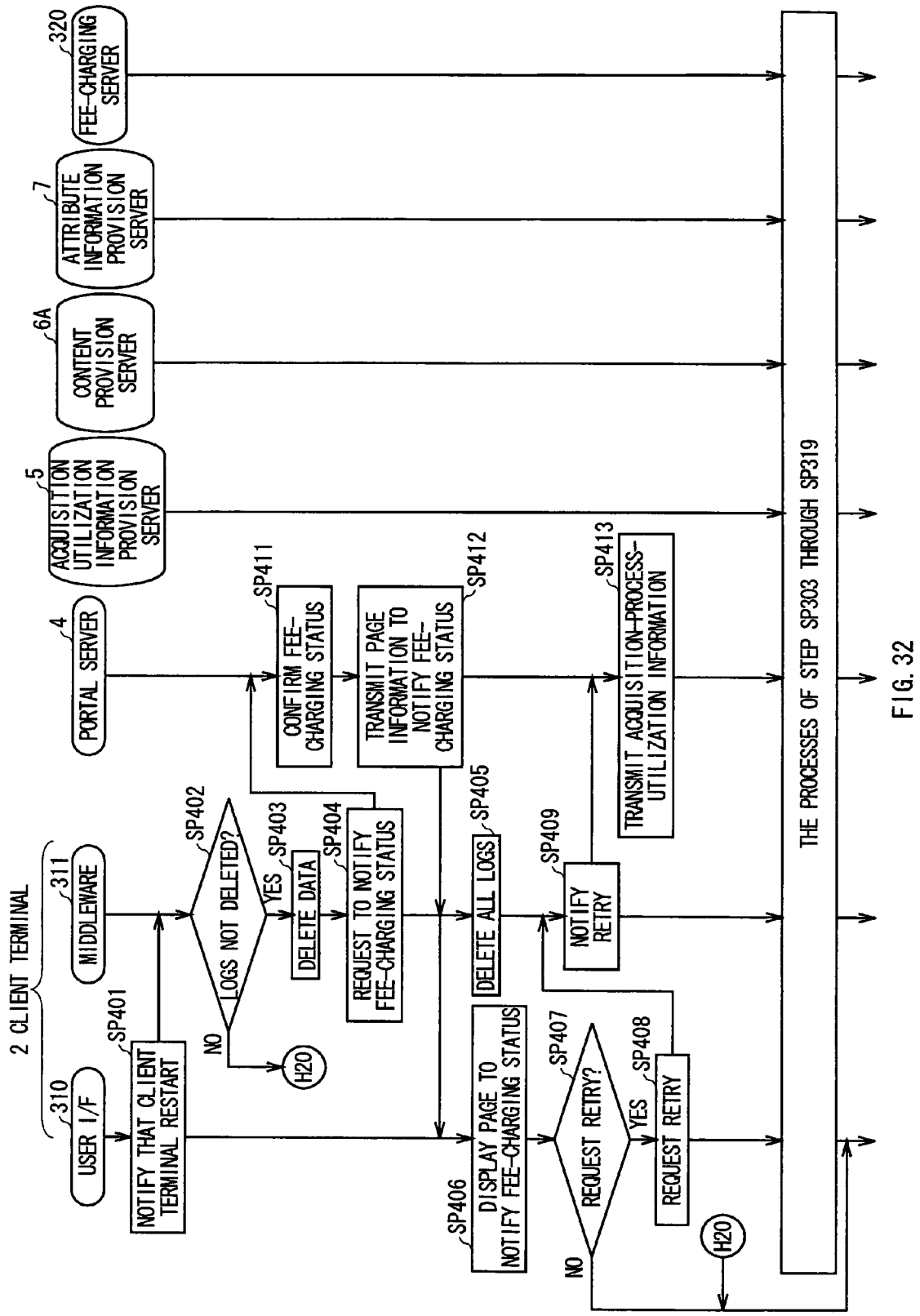
FIG. 32 is a sequence chart showing a retry music purchase process.

The retry music purchase process enables the client terminal 2 to retry the acquisition process, after it restarts communication through the network 3. Referring to FIG. 32 (FIG. 32 uses the same symbols and marks for the corresponding part of FIG. 29 through 31) this retry music purchase process will be described.

When the client terminal 2 restarts communication through the network 3, it starts re-acquisition process in the retry music purchase process (the communication was stopped because the client terminal 2 was powered off, or its network cable is disconnected, for example).

When the client terminal 2 starts the re-acquisition process, the user interface 310 at step SP401 notifies the middleware 311 that the client terminal 2 can use the network 3 again. And then the client terminal 2 proceeds to next step SP402.

The middleware 311 of the client terminal 2 at step SP402 confirms whether or not the first, second or third log are left in for example the hard disk by the previous acquisition process (this acquisition process had run before the client terminal 2 restarted the communication through the network 3).

Negative result at step SP402 means that none of them (the first, second and third log) are left in the hard disk, which is to say the communication between the client terminal 2 and the network 3 was stopped (because the client terminal 2 was powered off, for example) when not performing the acquisition process. In this case, the middleware 311 notifies the user interface 310 that the client terminal 2 was not performing the acquisition process when the communication was broken. The middleware 311 then ends the re-acquisition process of the retry music purchase process.

Affirmative result at step SP402 means that one or some of them (at least, the first log) are left in the hard disk, which is to say the communication between the client terminal 2 and the network 3 was stopped (because the client terminal 2 or its network cable was unplugged, for example) when performing the acquisition process of acquiring the purchase-requested music (i.e., the acquisition process stopped halfway). In this case, the middleware 311 proceeds to step SP403.

The middleware 311 at step SP403 searches in the hard disk for all the content data and content-attribute files 47 acquired by the stopped acquisition process, using the second log (the track file names and the attribute-information-file names) left in the hard disk and the third log (the album-identification information) left in the hard disk. The middleware 311 then deletes all the searched content data and content-attribute files 47 from the hard disk, and proceeds to next step SP404.

In response to a notification from the user interface 310, the middleware 311 at step SP404 accesses the retry address, which is included in the first log (the fee-charging-status-notification-request information) stored in the hard disk. While accessing the retry address, the middleware 311 transmits via the communication processing section 114 and the network interface 115 to the portal server 4 the purchase-identification information of the fee-charging-status-notification-request information, along with the post data, request code, and the like.

The control section 10 of the portal server 4 at step SP411 receives the purchase-identification information and the like from the client terminal 2 via the data communication processing section 14. The control section 10 then retrieves from the user database 13 the user's fee-charging-status-notification information based on the purchase-identification information. The control section 10 subsequently confirms the user's fee-charging status based on the retrieved fee-charging-status-notification information, and then proceeds to next step SP412.

The control section 10 at step SP412 transmits page information via the data communication processing section 14 to the client terminal 2 to notify the above-noted user's fee-charging status.

The middleware 311 of the client terminal 2 at step SP405 receives the page information from the portal server 4 via the network interface 115 and the communication processing section 114. After receiving the page information, the middleware 311 deletes all the logs left in the hard disk (the first, second and third log left by the previous acquisition process). The middleware 311 also supplies the received page information to the user interface 310.

The user interface 310 at step SP406 supplies via the display processing section 111 to the display 107 the page information, which was received from the portal server 4. The display 107 then displays page images based on the page information. The client terminal 2 subsequently proceeds to next step SP407.

The page being displayed on the display 107 includes the fee-charging-status-notification information (this information is embedded by the portal server 4, for example). Based on the fee-charging-status-notification information, the user interface 310 at step SP407 determines whether or not the user has been charged.

When the user interface 310 at step SP407 determines that the user has not been charged yet because the page (not shown) being displayed on the display 107 indicates it, the user interface 310 ends the re-acquisition process of the retry music purchase process.

When the user interface 310 at step SP407 determines that the user has already been charged because the page (not shown) being displayed on the display 107 indicates it, the user interface 310 proceeds to next step SP408.

The user interface 310 at step SP408 requests the middleware 311 to retry the data acquisition of acquiring the content data and content attribute files 47, which the client terminal 2 failed to acquire at the previous acquisition process.

The middleware 311 at step SP409 generates a retry-notification data to notify that it retries the stopped acquisition process. And then the middleware 311 accesses the retry address, which is included in the acquisition-process-utilization information acquired by the previous acquisition process. While accessing the retry address, the middleware 311 transmits the retry-notification data to the portal server 4 via the communication processing section 114 and the network interface 115.

The control section 10 of the portal server 4 at step SP413 receives the retry-notification data from the client terminal 2 via the data communication processing section 14. The control section 10 then generates the acquisition-process-utilization information in almost the same way as above-noted step SP323. The generated acquisition-process-utilization information includes the purchase-identification information issued by the previous acquisition process. The control section 10 subsequently transmits this acquisition-process-utilization information to the client terminal 2 via the data communication processing section 14. By the way, in the case in which the file-acquisition addresses (which are utilized to acquire the acquisition-utilization file 315) and other addresses (which are utilized to acquire various kinds of page information) have been updated, the control section 10 generates the acquisition-process-utilization information including the updated addresses, and provides it to the client terminal 2.

After that, the client terminal 2, the portal server 4, and other servers 5 through 320 sequentially performs the processes of step SP303 through SP319 in the same way as the above-noted normal music purchase process. Therefore, after acquiring the acquisition-utilization file 315 again through the portal server 4, the client terminal 2 (in association with the portal server 4 and other servers 5 through 320) acquires all the content data and content-attribute files 47 that it failed to acquire at the previous acquisition process. By the way, in this retry process, the fee-charging server 320 does not perform any process, because the user has been already charged by the previous acquisition process.

And then the user interface 310 of the client terminal 2 ends this re-acquisition process.

In the above-mentioned normal music purchase process and retry music purchase process, there is only one content provision server (one of the content provision server 6A through 6N). However, the present embodiment is not limited to this. The normal music purchase process and the retry music purchase process can be applied to the situation in which the client terminal 2 acquires each part of content data from different content provision server 6A through 6N (each of which is capable of providing the content data) in the same way as the above-noted normal music purchase process and restart music purchase process illustrated by FIG. 11 through FIG. 27.

(4) Operation and Effects

In the above-noted configuration, when starting the acquisition process in response to the user's request to purchase music, the client terminal 2 of the data delivery system 1 acquires from the acquisition utilization information provision server 5 the acquisition utilization file 25 that includes: the data size information, which corresponds to the acquisition-target content data; and the content-provision addresses, which are utilized to provide the content data.

The client terminal 2 then determines the division-start positions and division-end positions that divide the acquisition-target content data to generate division-part data, based on the number of content-provision addresses (i.e., the notified-address number) and data size information notified by the acquisition-utilization file 25. The client terminal 2 subsequently generates the division-part-request data that includes: the division-start positions; the division-end positions; and the content IDs corresponding to the acquisition-target content data. The client terminal 2 then transmits each division-part-request data to different content provision server 6A through 6N (each of which can provide the content data), which is to say the client terminal 2 requests each division-part data from different content provision server 6A though 6N.

Then, the client terminal 2 receives each division-part data from the content provision server 6A through 6N, and temporarily stores them in the hard disk. After having received all the division-part data of the content data, the client terminal 2 changes the temporarily-stored memory address of each division-part data on the hard disk to restore the content data.

According to the above-noted configuration, the client terminal 2 determines the division-start positions and division-end positions for the requested content data, based on the data size information which corresponds to the content data and is acquired from the acquisition utilization information provision server 5 in response to the request for the content data, and the number of the content provision addresses that are utilized to acquire the content data. The client terminal 2 then requests division-part data from the content provision server 6A through 6N (each of which can provide the acquisition-target content data) by notifying them of the content IDs corresponding to the content data, the division-start positions and the division-end positions. And then the client terminal 2 receives division-part data from the content provision servers 76A through 6N, and restores the content data from them. In this manner, the client terminal 2 requests the division-part data by notifying the division-start positions, the division-end positions, and which content data the client terminal 2 is requesting. This allows the content provision servers 6A through 6N to save and manage the content data without dividing them. Therefore, the content provision servers 6A through 6N do not have to retrieve the division-part data when the content data is requested. In addition, the content provision servers 6A through 6N can provide the division-part data whose data size is smaller than that of the content data. Therefore, there is provided the data delivery system 1 that reduces the processing load of the content provision servers 6A through 6N when providing content data.

When the first division-part-request method is selected to acquire content data, the client terminal 2 recognizes the number of content provision addresses notified by the acquisition-utilization file 25 as the content-division number, and based on this content-division number determines the division-start positions and the division-end positions. And then the client terminal 2 requests each division-part data from different content provision server 6A through 6N (each of which can provide the content data). In this manner, the client terminal 2 requests them from each content provision server 6A through 6N (each of which can provide the same content data) evenly. Therefore, the client terminal 2 acquires them efficiently. Each content provision server 6A through 6N is requested by the client terminal 2 just one piece of content data (division-part data). This evens out the processing loads of content provision servers 6A through 6N when providing the division-part data.

In the case in which: the second division-part-request method is selected; and the chosen-address number is less than the notified-address number when acquiring the content data, the client terminal 2 recognizes the chosen-address number as the content-division number, and based on this content-division number determines the division-start positions and the division-end positions. Therefore, the number of the division-part data being requested this time by the client terminal 2 is less than the number of the content provision servers 6A through 6N capable of providing the content data. Therefore, the client terminal 2 excludes the content provision server 6D having heavy processing load or low processing performance, and requests each division-part data from the rest of them (i.e., from the content provision server 6A through 6C). Accordingly, the client terminal 2 can efficiently acquire the acquisition-target content data, even if the number of the content provision servers that provide the content data this time has been reduced.

In the case in which; the second division-part-request method is selected; and the chosen-address number is greater than the notified-address number when acquiring content data, the client terminal 2 recognizes the chosen-address number as the content-division number, and based on this content-division number determines the division-start positions and the division-end positions. And then the client terminal 2 requests some of division-part data from each content provision server 6A through 6C (each of which can provide the content data). Next, the client terminal 2 requests the rest of them from the content provision servers which has already completed the first time request from the client terminal 2 (i.e., the client terminal 2 follows the order that it has received each division-part data at the first time request). In this manner, the client terminal 2 does not request the division-part data many times from the content provision servers having heavy processing load or low processing performance to control the increase of processing load. By contrast, the client terminal 2 positively requests the division-part data from the content provision servers (6A and 6B, for example) that can swiftly respond the request from the client terminal 2 with a high processing ability or low processing load. As a result, the client terminal 2 can efficiently acquire the content data in dependence upon the processing ability of each content provision server 6A through 6N.

In addition, when performing the acquisition process, the client terminal 2 records the process-status information at each processing stage. The process-status information shows how much the client terminal 2 has completed the acquisition process. When restarting the stopped acquisition process, the client terminal 2 based on the recorded process-status information requests the division-part data that it has not requested yet and the rest of the division-part data that the client terminal 2 could not receive at the previous acquisition process because it suddenly stopped halfway. That is to say, the client terminal 2 does not request the division-part data that it has already acquired at the previous acquisition process. When the client terminal 2 had already acquired the whole content data, the client terminal 2 restarts the acquisition process to acquire the corresponding content-attribute file 47 without requesting that content data again. In this manner, when restarts the acquisition process, the client terminal 2 does not repeat the same process that it has already completed at previous acquisition process.

If the client terminal 2 has not received a part of the division-part data because the previous acquisition process stopped halfway, the client terminal 2 requests that part (i.e., reception-left-part data) from the content provision server 6A through 6N when restarting the stopped acquisition process. In this case, the data size of the reception-left-part data is less than that of the division-part data. That reduces the processing load of the content provision server from which the client terminal 2 requests the reception-left-part data, in comparison with the content provision server which transmits the whole division-part data.

If the client terminal 2 requests the whole content data from one of the content provision servers 6A through 6N, the requested content provision server transmits it to the client terminal 2 in packet form at a certain interval of time. This periodically causes the period of time where the client terminal 2 is not receiving any packet.

By contrast, the client terminal 2 according to the present embodiment requests from the content provision servers 6A through 6N the division-part data whose data size is less than the content data, at almost the same time. And then the client terminal 2 receives the division-part data from each content provision server 6A through 6N. That decreases the period of time where the client terminal 2 is not receiving anything, in comparison with the situation in which the client terminal 2 requests the content data at a time without dividing it. Therefore, the client terminal 2 can acquire the content data more quickly.

When restarting the acquisition process in the above-noted other music purchase processes, the client terminal 2 confirms whether or not the first and second logs are left. When the first and second are left, the client terminal 2 based on the second log deletes all the content data and content-attribute files 47 acquired by the previous acquisition process, and retries the acquisition process of acquiring all the content data and content-attribute files 47 that must have been acquired by the previous acquisition process. In this manner, the client terminal 2 prevents the same content data and content-attribute files 47 from being stored in the hard disk again when retrying the acquisition process, in the same way as the above-noted restart music purchase process. Therefore, the client terminal 2 can use the space of the hard disk efficiently. Accordingly, the hard disk can save all the content data and content-attribute files 47, because the hard disk does not run out of space when retrying the acquisition process. As a result, the client terminal 2 certainly acquires all the content data and content-attribute files 47.

When the music (content data) are requested in album unit, the client terminal 2 generates the album-identification information that identifies the content data and content-attribute files 47 to be downloaded, and temporarily stores it as the third log while performing the acquisition process. Each time the client terminal 2 downloads the content data and the content-attribute file 47, it registers the track-file name and the attribute-information-file name in the acquisition-information database such that they belong to the album-identification information. When having registered all the track-file names and the attribute-information-file names in the acquisition-information database after downloading all the acquisition-target content data and content-attribute files 47, the client terminal 2 deletes all the logs. Therefore, in the case in which the album-identification information (i.e., the third log) is still left when restarting the acquisition process, the client terminal 2 deletes this album-identification information from the acquisition-information database. That allows the client terminal 2 to easily delete the content data and content-attribute files 47 identified by that album-identification information. Accordingly, the hard disk of the client terminal 2 can easily go back to the situation before the client terminal 2 started to acquire the content data and the content-attribute files 47. As a result, the client terminal 2 can efficiently acquire the content data and the content-attribute files 47 at the retry process.

(5) Other Embodiments

In the above-noted embodiments, in response to the request for the content data, the client terminal 2 acquires from the acquisition utilization information provision server 5 the acquisition-utilization file 25 including the data size information of the content data and the content-provision addresses that are utilized to provide the content data. However, the present invention is not limited to this. For example, the client terminal 2 memorizes identification information of each content provision server 6A through 6N. And then when the user requests content data, the client terminal 2 inquires each content provision server 6A through 6N whether they can provide the requested content data. And then, the client terminal 2 receives the data size information and the content-provision addresses from the content provision server that can provide the content data. Alternatively, the client terminal 2 receives the data size information and the content-provision addresses from other management server or the like.

In the above-noted embodiments, the client terminal 2 recognizes the notified-address number or the chose-address numbers as the content-division number, and then determines the division-start positions and the division-end positions for the content data. However, the present invention is not limited to this. For example, when the user requests the content data, the client terminal 2 accesses the content-provision homepages based on the content-provision addresses. Then the client terminal 2 checks how busy each line (connected to each server 6A through 6N) is, and based on the check result selects some of content provision servers 6A through 6N from which the client terminal 2 will request the division-part data. The client terminal 2 subsequently recognizes the number of selected servers as the content-division number, and determines the division-start positions and division-end positions for the content data. In this manner, when the user requests the content data, the client terminal 2 requests the division-part data only from the content provision servers not being accessed by many devices. Therefore, the client terminal 2 can efficiently acquire the content data.

In the above-noted embodiments, when the third division-part-request method is selected to perform the acquisition process, the client terminal 2 recognizes the notified-address number as the content-division number, and then determines the division-start positions and division-end positions for the content data. However, the present invention is not limited to this. For example, when the third division-part-request method is selected to perform the acquisition process, the client terminal 2 recognizes the chosen-address number as the content-division number, and then determines the division-start positions and division-end positions for the content data. Alternatively, the client terminal 2 may recognize the notified-address number as the content-division number when the notified-address number is less than the previously-chosen maximum chosen-address number, and determine the division-start positions and division-end positions for the content data. Or the client terminal 2 may recognize the maximum chosen-address number as the content-division number when the notified-address number is greater or equal to the maximum chosen-address number, and determine the division-start positions and division-end positions for the content data.

In the above-noted embodiments, the client terminal 2 determines the division-start positions and the division-end positions to divide the content data such that each divided data (division-part data) has the same size. However, the present invention is not limited to this. For example, the client terminal 2 determines the division-start positions and the division-end positions such that they divide the content data in dependence upon the data size previously decided by the user (or, in dependence upon the data size decided at the time). And then, the client terminal 2 requests smaller division-part data from the content provision servers that have heavy processing load or low processing ability. By contrast, the client terminal 2 requests larger division-part data (than the one requested from the content provision servers that have heavy processing load or low processing ability) from the content provision servers that have light processing load or high processing ability. In this manner, the client terminal 2 efficiently uses the content provision servers that have heavy processing load or low processing ability, while positively using the content provision servers that have light processing load or high processing ability. Therefore, the client terminal 2 can use more content provision servers 6A through 6N efficiently to acquire the division-part data, in dependence upon their processing capability. Accordingly the client terminal 2 can efficiently acquire the content data.

In the above-noted embodiments, while performing the acquisition process, the client terminal 2 first generates the track-file name and then generates the attribute-information-file name. However, the present invention is not limited to this. The client terminal 2 may generate the attribute-information-file name at any timing, and then generate the track-file name.

In the above-noted embodiments, the system allows the user to request to purchase music in album or single unit. However, the present invention is not limited to this. For example, the system could allow the user to request to purchase a plurality of pieces of music in album and single unit at one time. In this case, for example, each time the client terminal 2 downloads the content data, the client terminal 2 confirms whether it requested this content data in album or single unit. And then the client terminal 2 registers its track-file name and attribute-information-file name in the acquisition-information database accordingly.

In the above-noted embodiments, when downloading the content data and content-attribute file 47 in single unit, the client terminal 2 registers its track-file name and attribute-information-file name such that they are associated with the single-identification information already registered. However, the present invention is not limited to this. The client terminal 2 may generate single-identification information that can be deleted as a log, when downloading the content data and content-attribute file 47 in single unit.

In this case, when retrying the acquisition process, the client terminal 2 can easily delete all the content data and content-attribute file 47 corresponding to single music by deleting the single-identification information from the acquisition-information database in the same way as the client terminal 2 uses the above-noted album-identification information. By the way, the album-identification information and the single-identification information are applied as identification information that can identify the content data downloaded from the content provision servers 6A through 6N and the content-attribute files 47 downloaded from the attribute information provision server 7. However, the present invention is not limited to this. The client terminal 2 can generate the similar identification information for a group of content data requested by one-time request, or for a certain unit of content data (certain pieces of music, for example).

In the above-noted embodiments, the client terminal 2 (illustrated by FIG. 1 through FIG. 34) is applied as a content acquisition apparatus. However, the present invention is not limited to this. Other devices (i.e., information processing apparatus such as personal computers, mobile phones and Personal Digital Assistance (PDA), or CD players, Digital Versatile Disc (DVD) players, game machines or the like) that can acquire the content data can be applied to as the content acquisition apparatus.

In the above-noted embodiments, the above-mentioned hardware circuit blocks and program modules are applied to the client terminal 2. However, the present invention is not limited to this. They can be applied to other devices such as mobile phones and personal computers. The devices equipped with the hardware circuit blocks and program modules can perform the same process as the client terminal 2.

In the above-noted embodiments, the data delivery system 1 (illustrated by FIG. 1 through FIG. 34) is applied as a content acquisition system. However, the present invention is not limited to this. Various kinds of system can be applied as the content acquisition system, such as a content acquisition system where content provision apparatus and content acquisition apparatus are connected through wireless or wired Local Area Network (LAN).

In the above-noted embodiments, the content provision servers 6A through 6N with computer configuration (illustrated by FIG. 1 through FIG. 34) are applied as the content provision apparatus. However, the present invention is not limited to this. Other devices (i.e., information processing apparatus such as personal computers, mobile phones and PDA) that can provide the content data can be applied to as the content provision apparatus.

In the above-noted embodiments, the above-mentioned hardware circuit blocks and the content provision program are applied to the content provision servers 6A through 6N. However, the present invention is not limited to this. The hardware circuit blocks and the content provision program can be applied to other devices such as mobile phones. The device equipped with the hardware circuit blocks and the content provision program can perform the same process as the content provision servers 6A through 6N.

In the above-noted embodiments, some of program modules (i.e., the HTTP message program 130, the communicator program 131, the copyright protection information management module 133, the music purchase/reproduction module 135, the XML browser 136, the hard disk content controller 137, the database access module 139 and the content data access module 140) stored in the ROM 102 of the client terminal 2 are applied to as a content acquisition program. And the CPU 100 of the client terminal 2 follows the content acquisition program to perform the acquisition process of the above-noted music purchase process (illustrated by FIG. 11 through FIG. 13, FIG. 15 through FIG. 18, FIG. 21 through FIG. 23, and FIG. 25 through FIG. 32). However, the present invention is not limited to this. The program having other configuration can be applied to as the content acquisition program. And the client terminal 2 may have the content acquisition program installed from a program storage medium storing this program to perform the acquisition process.

In the above-noted embodiments, as shown in FIG. 1 through FIG. 34, music is applied as the content data. And the content acquisition apparatus acquires the content data. However, the present invention is not limited to this. The following items can be applied as the content data: video data such as photographs and motion picture; program data such as game program; content data broadcast from satellite radio stations; and the like.

In the above-noted embodiments, the CPU 100, communication processing section 114 and network interface 115 of the client terminal 2 (illustrated by FIG. 1 through FIG. 34) are applied to as a request information transmission means that in response to a request for a content data transmits to an external section request information that requests: address information for a plurality of content provision apparatus that can provide the requested content data; and data size information of the content data. However, this invention is not limited to this. Foe example, a request information transmission circuit that has a hardware configuration to transmit the request information to the external section, a wireless communication interface, and the like can be applied to as the request information transmission means.

In the above-noted embodiments, the CPU 100, communication processing section 114 and network interface 115 of the client terminal 2 (illustrated by FIG. 1 through FIG. 34) are applied as an information reception means that receives: the address information for the plurality of content provision apparatus that can provide the content data, the address information transmitted from the external section after the request information transmission means transmits the request information; and the data size information of the content data. However, the present invention is not limited to this. For example, an information reception circuit that has a hardware configuration to receive the address information (for the plurality of content provision apparatus that can provide the content data) and the data size information (of the content data), a wireless communication interface, and the like can be applied to as the information reception means.

In the above-noted embodiments, the CPU 100 of the client terminal 2 (illustrated by FIG. 1 through FIG. 34) is applied to as a division position determination means that determines; division start positions and division end positions that specify division positions of the content data to request the content data in divided form from the plurality of the content provision apparatus, based on the number of pieces of the address information received by the information reception means and the data size information. Specifically, the CPU 100 of the client terminal 2 determines the division-start positions and division-end positions in one of the following manners: the CPU 100 recognizes the notified-address number as the content-division number, and then determines the division-start positions and division-end positions; the CPU 100 recognizes the notified-address number as the content-division number when the notified-address number is equal to the chosen-address number, and then determines the division-start positions and division-end positions; or, the CPU 100 recognizes the chosen-address number as the content-division number when the notified-address number is different from the chosen-address number, and then determines the division-start positions and division-end positions. However, the present invention is not limited to this. A division position determination circuit that has a hardware configuration and the like can be applied to as the division position determination means that determines the division-start positions and division-end positions for the content data. In this case, the division position determination circuit for example determines the division-start positions and the division-end positions in one of the following manners: the division position determination circuit recognizes the notified-address number as the content-division number when the notified-address number is less than the previously-chosen maximum chosen-address number, and then determines the division-start positions and the division-end positions; or, the division position determination circuit recognizes the maximum chosen-address number as the content-division number when the notified-address number is greater than the maximum chosen-address number, and then determines the division-start positions and the division-end positions.

In the above-noted embodiments, the CPU 100, communication processing section 114 and network interface 115 of the client terminal 2 (illustrated by FIG. 1 through FIG. 34) are applied to as a division part request information transmission means that transmits division part request information including content identification information of the content data, the division start positions and division end positions of division parts of the content data such that it requests each division part from different content provision apparatus. However, the present invention is not limited to this. A division part request information transmission circuit that has a hardware configuration, a wireless communication interface, and the like can be applied to the division part request information transmission means. In this case, the division part request information transmission circuit transmits the division part request information such that it requests each division part from different content provision apparatus.

In the above-noted embodiments, the CPU 100, communication processing section 114 and network interface 115 of the client terminal 2 (illustrated by FIG. 1 through FIG. 34) are applied to as a division part reception means that receives the division parts from the plurality of content provision apparatus after the division part request information transmission means transmits the division part request information. However, the present invention is not limited to this. A division part reception circuit that has a hardware configuration to receive the division parts from the plurality of content provision apparatus, a wireless communication interface, and the like can be applied to as the division part reception means.

In the above-noted embodiments, the CPU 100 and hard disk drive 104 of the client terminal 2 (illustrated by FIG. 1 through FIG. 34) are applied to as a temporarily storing means that temporarily stores the division parts received by the division part reception means. However, the present invention is not limited to this. A temporarily storing circuit that has a hardware configuration to temporarily store the division parts in a storage medium, and the like can be applied to as the temporarily storing means. For example, the temporarily storing circuit is equivalent to a driver circuit which writes data in a storage medium such as magnetic optical disk and semiconductor memory.

In the above-noted embodiments, the hard disk drive 104 and CPU 100 of the client terminal 2 (illustrated by FIG. 1 through FIG. 34) are applied to as a data restoring means that combines the division parts temporarily stored by the temporarily storing means to restore the content data. In this case, the hard disk drive 104 temporarily stores the division-part data in the hard disk, and the CPU 100 changes the temporarily-stored memory addresses of the division-part data to restore the content data from the division-part data on the hard disk. However, the present invention is not limited to this. A data restoring circuit that has a hardware configuration and the like can be applied to as the data restoring means. For example, the data restoring circuit copies the division part data from the storage medium (hard disk, for example) that temporarily stores them to other medium to restore the content data.

In the above-noted embodiments, the CPU 100 of the client terminal 2 (illustrated by FIG. 1 through FIG. 34) is applied to as a measurement means that measures for each content provision apparatus the period of reception-completion time between the transmission of the division part request information and the reception of the division parts from each content provision apparatus. However, the present invention is not limited to this. A measurement circuit that has a hardware configuration to measure for each content provision apparatus the period of reception-completion time between the transmission of the division part request information and the reception of the division parts from each content provision apparatus, and the like can be applied to as the measurement means.

In the above-noted embodiments, the CPU 100, communication processing section 114 and network interface 115 of the client terminal 2 (illustrated by FIG. 1 through FIG. 34) are applied to as a reception stop means that stops to receive the division part from the content provision apparatus when the division part has not been received at the time a certain period of time has passed since the start of measuring the period of reception-completion time. However, the present invention is not limited to this. A reception stop circuit that has a hardware configuration, the CPU 100, a wireless communication interface, and the like can be applied to as the reception stop means. In this case, the reception stop circuit stops to receive the division part from the content provision apparatus when the division part has not been received at the time a certain period of time has passed since the start of measuring the period of reception-completion time.

In the above-noted embodiments, the CPU 100 of the client terminal 2 (illustrated by FIG. 1 through FIG. 34) is applied to as a division part request apparatus switch means that switches from the content provision server from which it stopped to receive the division part to different content provision server to request the division part. However, the present invention is not limited to this. A division part request apparatus switch circuit that has a hardware configuration, and the like can be applied to as the division part request apparatus switch means. In this case, the division part request apparatus switch circuit switches from the content provision server from which it stopped to receive the division part to different content provision server to request the division part.

In the above-noted embodiments, the hard disk drive 104 and CPU 100 of the client terminal 2 (illustrated by FIG. 1 through FIG. 34) are applied to as a reception status update means that sequentially updates a reception end position of the division part as reception status while receiving the division part from the plurality of content provision apparatus. However, the present invention is not limited to this. A reception status update circuit that has a hardware configuration, storage media (semiconductor memories, for example), the CPU 100 and the like can be applied to as the reception status update means. In this case, the reception status update circuit sequentially updates a reception end position of the division part as reception status while receiving the division part from the plurality of content provision apparatus.

In the above-noted embodiments, the CPU 100, communication processing section 114 and network interface 115 of the client terminal 2 (illustrated by FIG. 1 through FIG. 34) are applied to as a reception remnant part request information transmission means that transmits reception remnant part request information to the content provision server that is different from the content provision server from which it stopped halfway to receive the division part to request a reception remnant part that is a part of division part that has not received, the reception remnant part request information including reception end position information, division end position information and content identification information of the division part that it stopped halfway to receive. However, the present invention is not limited to this. A reception remnant part request information transmission circuit that has a hardware configuration, the CPU 100, a wireless communication interface and the like can be applied to as a reception remnant part request information transmission means. In this case, the reception remnant part request information transmission circuit transmits reception remnant part request information to the content provision server that is different from the content provision server from which it stopped to receive the division part halfway to request a reception remnant part that is a part of division part that has not received, the reception remnant part request information including reception end position information, division end position information and content identification information of the division part that it stopped to receive halfway.

In the above-noted embodiments, the control section 30 and data communication processing section 34 of the content provision server 6A through 6N (illustrated by FIG. 1 through FIG. 34) are applied to as a division part request information reception means that receives the division part request information from the content acquisition apparatus. However, the present invention is not limited to this. A division part request information reception circuit that has a hardware configuration to receive the division part request information, a control section, a wireless communication interface and the like can be applied to as the division part request information reception means.

In the above-noted embodiments, the control section 30 of the content provision server 6A through 6N (illustrated by FIG. 1 through FIG. 34) is applied to as a division means that divide a content data corresponding to the content identification information to extract a division part from between the division start position and division end position of the content data in response to the division part request information received by the division part request information reception means, the content identification information, the division start position and the division end position being shown in the division part request information. However, the present invention is not limited to this. A division circuit that has a hardware configuration, a storage medium storing the content data, a reproduction circuit can be applied to as the division means. In this case, the reproduction circuit extracts the division part from the content data stored in the storage medium and reproduces it. And the division circuit divides a content data corresponding to the content identification information to extract a division part from between the division start position and division end position of the content data in response to the division part request information received by the division part request information reception means, the content identification information, the division start position and the division end position being shown in the division part request information.

In the above-noted embodiments, the control section 30 and data communication processing section 34 of the content provision servers 6A through 6N (illustrated by FIG. 1 through FIG. 34) are applied to as a division part transmission means that transmits to the content acquisition apparatus the division part divided from the content data by the division means. However, the present invention is not limited to this. A division part transmission circuit that has a hardware configuration to transmit to the content acquisition apparatus the division part divided from the content data, a control section, a wireless communication interface and the like can be applied to as the division part transmission means.

INDUSTRIAL APPLICABILITY

The present invention can be utilized for a data delivery system including personal computers and content provision servers equipped with computer configuration, each of which is connected with one another through the Internet or wireless Local Area Network (LAN).

The invention claimed is:

1. A content acquisition method of a content acquisition apparatus, comprising:

transmitting request information from the content acquisition apparatus to an external section in response to a request for content data, said request information requesting address information of a plurality of content provision apparatus which provide providing said content data, and data size information of said content data;

receiving, at the content acquisition apparatus from said external section said address information of said plurality of content provision apparatus which provide providing said content data, and said data size information of said content data, after transmitting said request information;

determining, at the content acquisition apparatus division start positions and division end positions specifying division parts of said content data to request said content data in divided form from said plurality of content provision apparatus, based on the number of pieces of said address information and said data size information received by said information reception;

transmitting, from the content acquisition apparatus division part request information including content identification information of said content data, and said division start positions and division end positions of said division parts of said content data, such that each said division part is requested from different said content provision apparatus;

receiving, at the content acquisition apparatus said division parts from said plurality of content provision apparatus after transmitting said division part request information;

temporarily storing said division parts received by said division part reception; and combining said division parts temporarily stored by said temporarily storing to restore said content data.

2. The content acquisition method according to claim 1, further comprising:
- measuring a reception completion period of time for each said content provision apparatus, said reception completion period of time representing a period between transmission of said division part request information and reception of said division parts from each said content provision apparatus;
- stopping to receive said division part from said content provision apparatus when said division part has not been received yet from said content provision apparatus at a time a certain period of time has passed since the start of measuring said reception completion period of time; and
- switching from said content provision apparatus from which said reception stop stopped halfway to receive said division part to different said content provision apparatus to request said division part therefrom.

3. The content acquisition method according to claim 2, further comprising:
- sequentially updating a reception end position of each said division part as reception status, while receiving said division parts from said plurality of content provision apparatus; and
- transmitting reception remnant part request information to the content provision apparatus different from said content provision apparatus from which said reception stop stopped halfway to receive said division part to request a reception remnant part which is a part of said division part not received completely, said reception remnant part request information including said content identification information, and said reception end position and division end position of said division part not received completely.

4. A content acquisition apparatus comprising:
- request information transmission means for transmitting request information to an external section in response to a request for content data, said request information requesting address information of a plurality of content provision apparatus which provide providing said content data, and data size information of said content data;
- information reception means for receiving from said external section said address information of said plurality of content provision apparatus which provide providing said content data, and said data size information of said content data, after said request information transmission means transmits said request information;
- division position determination means for determining division start positions and division end positions specifying division parts of said content data to request said content data in divided form from said plurality of content provision apparatus, based on the number of pieces of said address information and said data size information received by said information reception means;
- division part request information transmission means for transmitting division part request information including content identification information of said content data, and said division start positions and division end positions of said division parts of said content data, such that each said division part is requested from different said content provision apparatus;
- division part reception means for receiving said division parts from said plurality of content provision apparatus after said division part request information transmission means transmits said division part request information;
- temporarily storing means for temporarily storing said division parts received by said division part reception means; and
- data restoring means for combining said division parts temporarily stored by said temporarily storing means to restore said content data.

5. The content acquisition apparatus according to claim 4, further comprising:
- measurement means for measuring a reception completion period of time for each said content provision apparatus, said reception completion period of time representing a period between transmission of said division part request information and reception of said division parts from each said content provision apparatus;
- reception stop means for stopping to receive said division part from said content provision apparatus when said division part has not been received yet from said content provision apparatus at a time a certain period of time has passed since the start of measuring said reception completion period of time; and
- division part request apparatus switch means for switching from said content provision apparatus from which said reception stop means stopped halfway to receive said division part to different said content provision apparatus to request said division part therefrom.

6. The content acquisition apparatus according to claim 5, further comprising:
- a reception status update means for sequentially updating a reception end position of each said division part as reception status, while receiving said division parts from said plurality of content provision apparatus; and
- a reception remnant part request information transmission means for transmitting reception remnant part request information to the content provision apparatus different from said content provision apparatus from which said reception stop means stopped halfway to receive said division part to request a reception remnant part which is a part of said division part not received completely, said reception remnant part request information including said content identification information, and said reception end position and division end position of said division part not received completely.

7. A computer readable storage medium, encoded with computer program instructions, executable by a computer and operative to cause the computer to implement a method of content acquisition, comprising:
- transmitting request information to an external section in response to a request for content data, said request information requesting address information of a plurality of content provision apparatus which provide providing said content data, and data size information of said content data;
- receiving from said external section said address information of said plurality of content provision apparatus which provide providing said content data, and said data size information of said content data, after transmitting said request information;
- determining division start positions and division end positions specifying division parts of said content data to request said content data in divided form from said plurality of content provision apparatus, based on the number of pieces of said address information and said data size information received;
- transmitting division part request information including content identification information of said content data, and said division start positions and division end positions of said division parts of said content data, such that each said division part is requested from different said content provision apparatus;

receiving said division parts from said plurality of content provision apparatus after transmitting said division part request information;

temporarily storing said division parts received by said division part reception; and combining said division parts temporarily stored by said temporarily storing to restore said content data.

8. A content acquisition system including a plurality of content provision apparatus providing content data and content acquisition apparatus acquiring said content data from said plurality of content provision apparatus, the content acquisition system wherein:

said content acquisition apparatus includes:

request information transmission means for transmitting request information to an external section in response to a request for said content data, said request information requesting address information of said plurality of content provision apparatus which provide providing said content data, and data size information of said content data;

information reception means for receiving from said external section said address information of said plurality of content provision apparatus which provide providing said content data, and said data size information of said content data, after said request information transmission means transmits said request information;

division position determination means for determining division start positions and division end positions specifying division parts of said content data to request said content data in divided form from said plurality of content provision apparatus, based on the number of pieces of said address information and said data size information received by said information reception means;

division part request information transmission means for transmitting division part request information including content identification information of said content data, and said division start positions and division end positions of said division parts of said content data, such that each said division part is requested from different said content provision apparatus;

division part reception means for receiving said division parts from said plurality of content provision apparatus after said division part request information transmission means transmits said division part request information;

temporarily storing means for temporarily storing said division parts received by said division part reception means; and data restoring means for combining said division parts temporarily stored by said temporarily storing means to restore said content data; and said content provision apparatus includes:

division part request information reception means for receiving said division part request information from said content acquisition apparatus;

division means for dividing said content data corresponding to said content identification information to extract said division part from between said division start position and division end position of said content data in response to said division part request information received by said division part request information reception means, said content identification information, said division start position, and said division end position being shown in said division part request information; and division part transmission means for transmitting to said content acquisition apparatus said division part divided from said content data by said division means.

* * * * *